(12) United States Patent
Takahama et al.

(10) Patent No.: US 7,084,888 B2
(45) Date of Patent: Aug. 1, 2006

(54) ORIENTATION DETECTION MARKER, ORIENTATION DETECTION DEVICE AND VIDEO GAME DEVICE

(75) Inventors: Hajime Takahama, Kobe (JP); Hiroki Honda, Kobe (JP)

(73) Assignee: Konami Corporation, Tokyo (JP)

( * ) Notice: Subject to any disclaimer, the term of this patent is extended or adjusted under 35 U.S.C. 154(b) by 489 days.

(21) Appl. No.: 10/213,248

(22) Filed: Aug. 5, 2002

(65) Prior Publication Data

US 2003/0032478 A1 Feb. 13, 2003

(30) Foreign Application Priority Data

Aug. 9, 2001 (JP) ............................. 2001-242819
Feb. 14, 2002 (JP) ............................. 2002-036791

(51) Int. Cl.
*G09G 5/00* (2006.01)

(52) U.S. Cl. ..................... 345/649; 345/653; 463/30

(58) Field of Classification Search ................ 463/30, 463/8, 34, 31, 32, 33; 345/2.3, 6, 649, 650, 345/653, 659, 5; 720/679; 359/241, 630; 348/583, 584

See application file for complete search history.

(56) References Cited

U.S. PATENT DOCUMENTS

| | | | |
|---|---|---|---|
| 4,910,503 A * | 3/1990 | Brodsky | ...................... 345/161 |
| 5,366,229 A | 11/1994 | Suzuki | |
| 5,616,078 A * | 4/1997 | Oh | ................................. 463/8 |
| 5,936,619 A * | 8/1999 | Nagasaki et al. | ........... 345/205 |
| 5,995,112 A | 11/1999 | Goff et al. | |
| 6,110,039 A | 8/2000 | Oh | |
| 6,670,952 B1 * | 12/2003 | Jaeger et al. | ................ 345/179 |

FOREIGN PATENT DOCUMENTS

| | | |
|---|---|---|
| EP | 0 848 226 | 6/1998 |
| EP | 0 848 972 | 6/1998 |
| EP | 0 852 961 | 7/1998 |
| GB | 2 354 580 | 3/2001 |
| JP | 8-071252 | 3/1996 |
| JP | 2961097 | 7/1999 |
| JP | 11-305935 | 11/1999 |
| JP | 2000 189671 | 7/2000 |
| JP | 2001-189671 | 7/2000 |
| JP | 2000-353248 | 12/2000 |
| JP | 2001-1009154 | 1/2001 |
| JP | 2001-208511 | 8/2001 |
| JP | 2001-511275 | 8/2001 |
| JP | 2002-306846 | 10/2002 |
| WO | 98/35336 | 8/1998 |

* cited by examiner

Primary Examiner—Richard Hjerpe
Assistant Examiner—Abbas Abdulselam
(74) Attorney, Agent, or Firm—Jordan and Hamburg LLP

(57) ABSTRACT

The invention provides an orientation detection marker having a simple structure and capable of providing information enabling the remote measurement of the orientation of a controller. Light source unit 13 (orientation detection marker) provides so-called biaxial direction information composed of one axis on which dotted light sources 131 to 133 are disposed at equal intervals and another axis on which dotted light sources 131, 134 and 135 are disposed at the same interval as the above intervals and which intersects with the aforementioned one axis at the dotted light source 131 or the like.

32 Claims, 48 Drawing Sheets

123

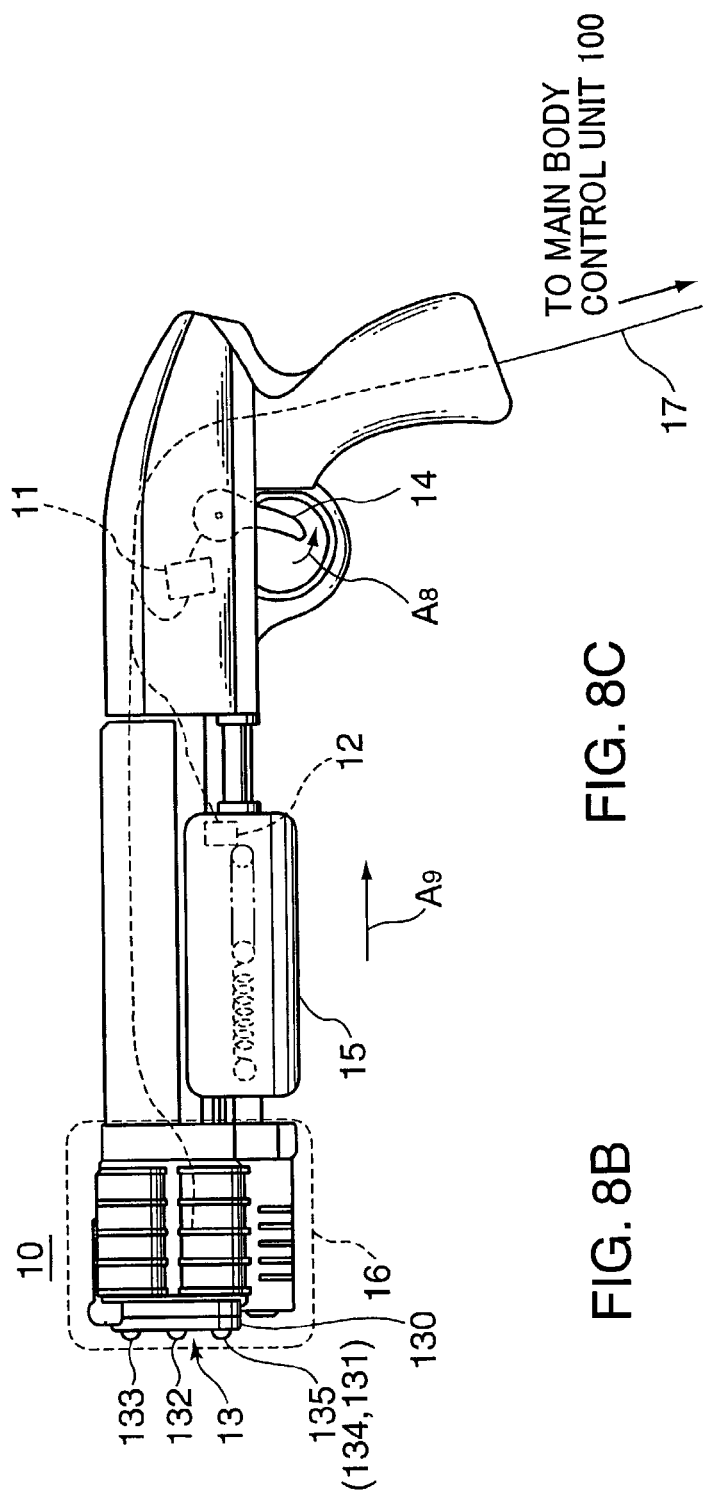
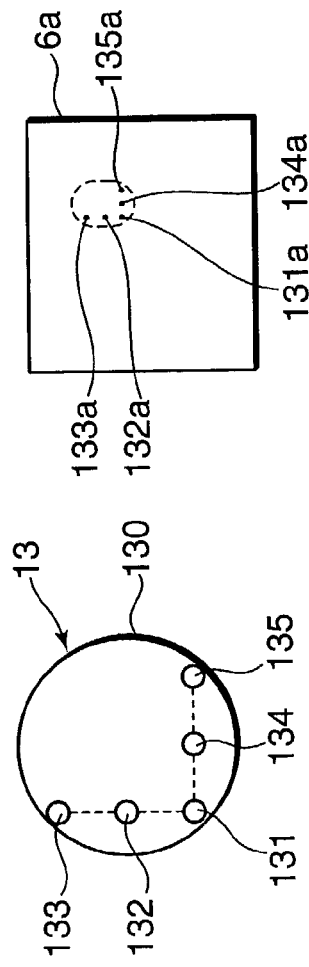

| Lout | Lin | CONDITION |
|------|-----|-----------|
| OFF | ON | NORMAL |
| ON | OFF | MOVE TO LEFT SIDE OF DINOSAUR |
| OFF | OFF | NOBODY IS PLAYING |
| ON | ON | ERRONEOUS RECOGNITION OF GALLERY OTHER THAN PLAYER |

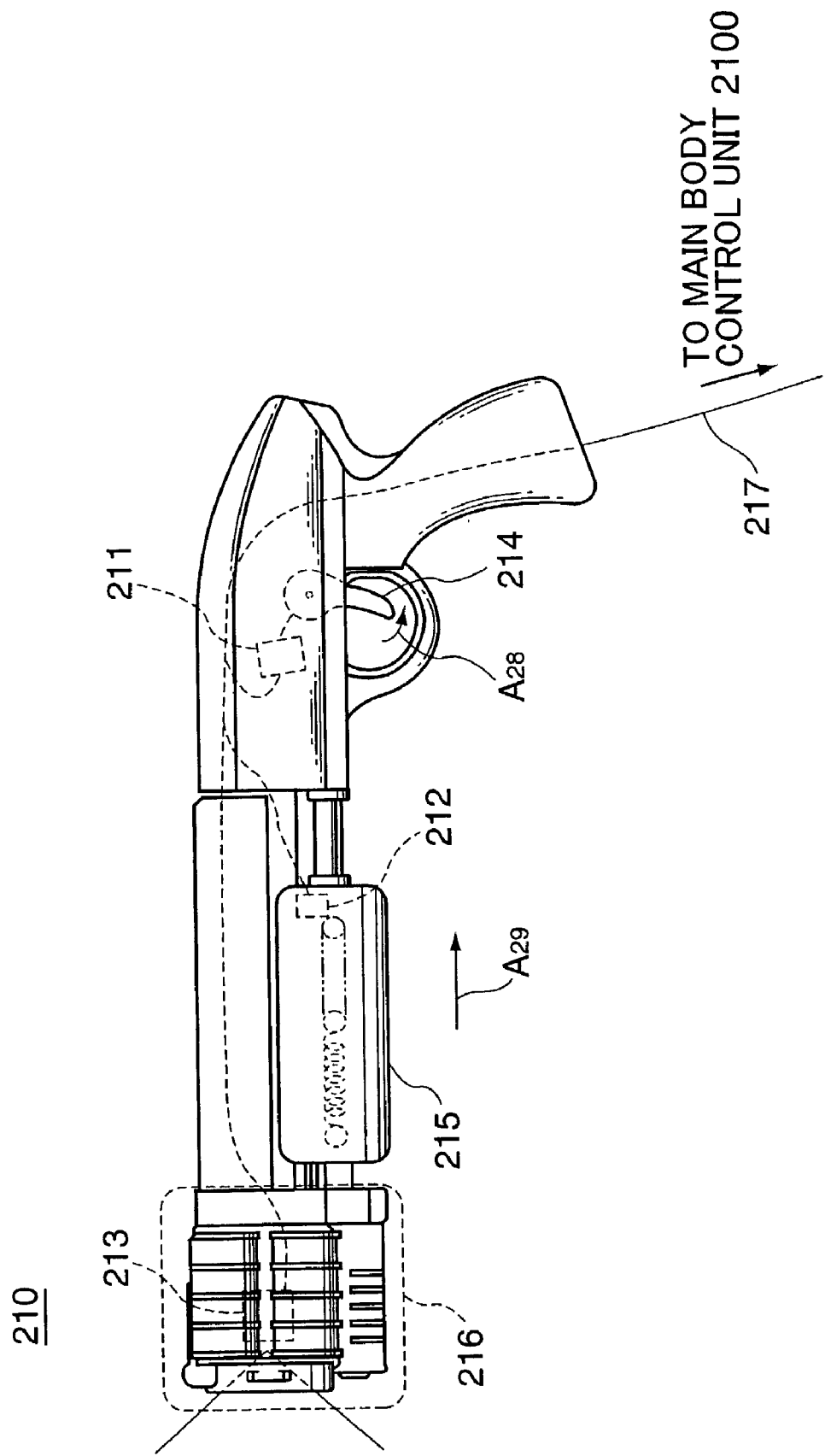

| Lout | Lin | CONDITION |
|---|---|---|
| OFF | ON | NORMAL |
| ON | OFF | MOVE TO LEFT SIDE OF DINOSAUR |
| OFF | OFF | NOBODY IS PLAYING |
| ON | ON | ERRONEOUS RECOGNITION OF GALLERY OTHER THAN PLAYER |

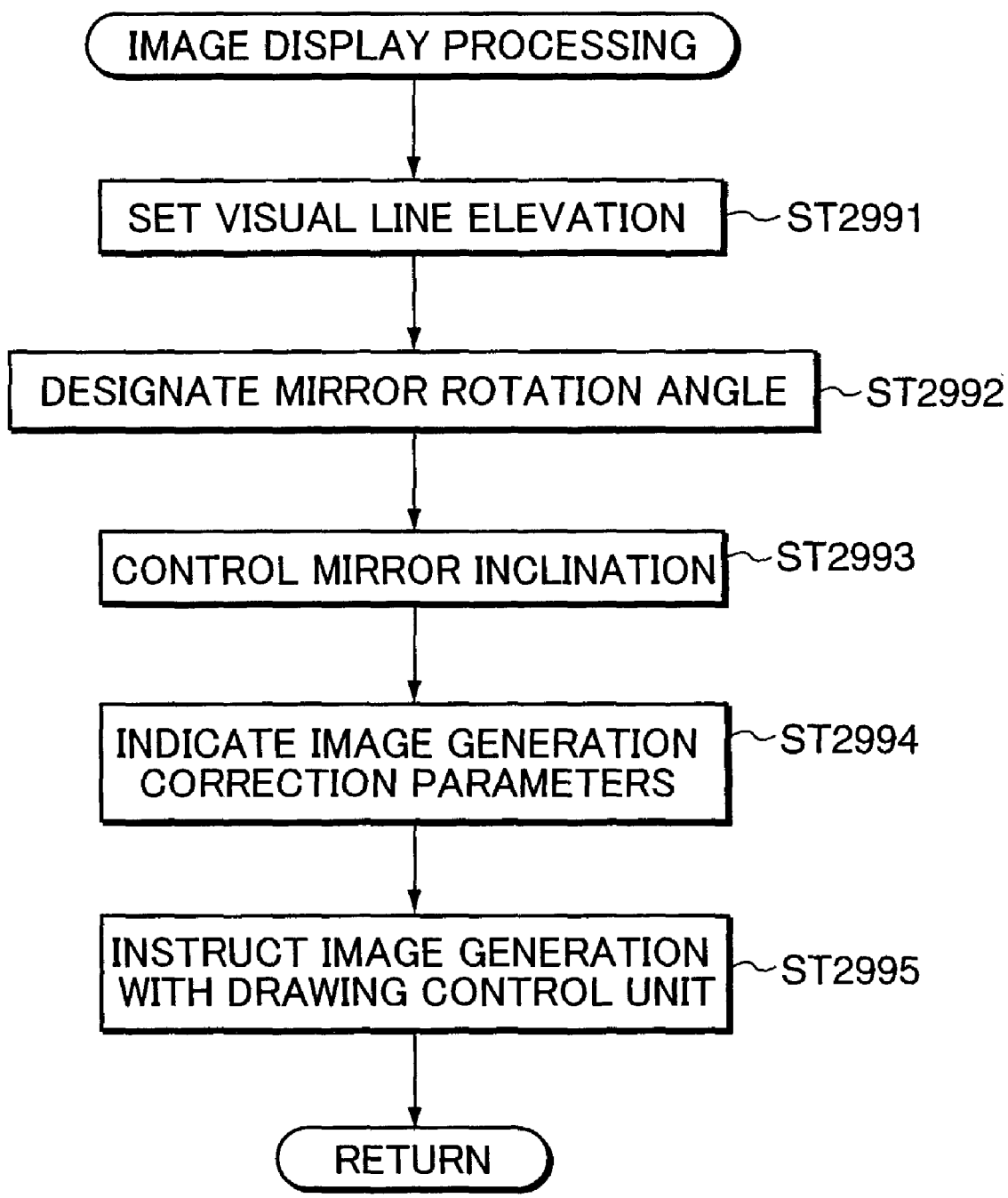

ORIENTATION DETECTION MARKER, ORIENTATION DETECTION DEVICE AND VIDEO GAME DEVICE

BACKGROUND OF THE INVENTION

1. Field of the Invention

The present invention relates to an orientation detection device and orientation detection marker for detecting the orientation of a controller for performing input operations by orienting the screen of the display unit for displaying images.

2. Description of the Related Art

Conventionally known is a video game machine wherein a game image (picture) is displayed on the screen in front of the player, and the player experiences virtual reality by using a simulated gun controller and shooting at the displayed target object (game character).

As an example of such foregoing video game machine, there is the shooting video game machine described in Japanese Patent Publication No. 2961097, which images the two infrared emitting LEDs disposed at prescribed positions on the screen with the CCD camera provided near the muzzle of the simulated gun, and detects the center of the imaged range; that is, muzzle direction with respect to the center of the imaged range, from the positional relationship of the image of the two infrared emitting LEDs in within the CCD image.

Also known is a type comprising a CCD camera on the game device side and which makes the player wear a plurality of detection subjects. By imaging the movement of the respective detection subjects with the CCD camera, the movement of the player; for instance, the extension of the arm, is detected and reflected in the game progress in the likes of a hand-to-hand combat game.

SUMMARY OF THE INVENTION

Nevertheless, with the shooting video game machine employing the two infrared emitting LEDs for detection in the former, since the play area has a prescribed wideness on the horizontal surface, there is a limit in accurately detecting the muzzle direction when the simulated gun as the controller is able to move, or when the simulated gun may be rotationally operated. Further, with the later game device, there is a limit in versatility in terms of having to impose a complicated action of wearing a plurality of detection subjects, and, since the detection of the movement of the detection subjects can only be made to a degree of understanding the change in position, there is a limit in applying this to a more sophisticated game with such amount of information.

The present invention was devised in view of the foregoing problems, and the object thereof is to provide an orientation marker capable of remotely measuring the movement, particularly the orientation, of a controller having a simple structure, which may be employed in a more sophisticated game, and which is highly versatile; an orientation detection device for remotely measuring the orientation (posture) of the controller with such orientation detection marker; and a video game device employing the above.

In order to achieve the foregoing object, the orientation detection marker according to the present invention is provided in either one of the device main body and a controller for performing input operations as being pointed to a screen of a display unit provided to the device main body for displaying images, for detecting the orientation of the controller with respect to the screen, and which supplies information for computing said orientation to a picture image generated by imaging means provided in the other of the device main body and the controller, wherein said orientation detection marker comprises a light source having a mode including biaxial direction information.

According to the foregoing structure, a picture image is generated with the imaging means provided to the device main body side and one of the controllers. An image of the orientation detection markers is contained in the picture image. Since the orientation detection marker includes biaxial direction information, in addition to the position information of the controller, and (rotation) inclination centered around the axis of orientation of the controller; that is, rotation angle information is also included in the picture image. Thus, the orientation of the controller with respect to the screen may be computed from this position information and rotation angle information.

These and other objects, features, and advantages of the present invention will become more apparent upon reading the following detailed description along with the accompanying drawings

BRIEF DESCRIPTION OF THE DRAWINGS

FIGS. 8A, 8B and 8C are diagrams showing the structure of the gun unit, and FIG. 8A is a partial cross section of the side view; FIG. 8B is the front view of the marker substrate; and FIG. 8C is a diagram showing an example of the marker image;

FIG. 29A is the front view, FIG. 29B is the side view, and FIG. 29C is the rear view;

FIG. 32 is a diagram showing the structure of the gun unit;

FIG. 46 is a flowchart showing the detailed procedure of the image display processing at ST299;

DESCRIPTION OF THE PREFERRED EMBODIMENTS

First Embodiment

Figure 1A:
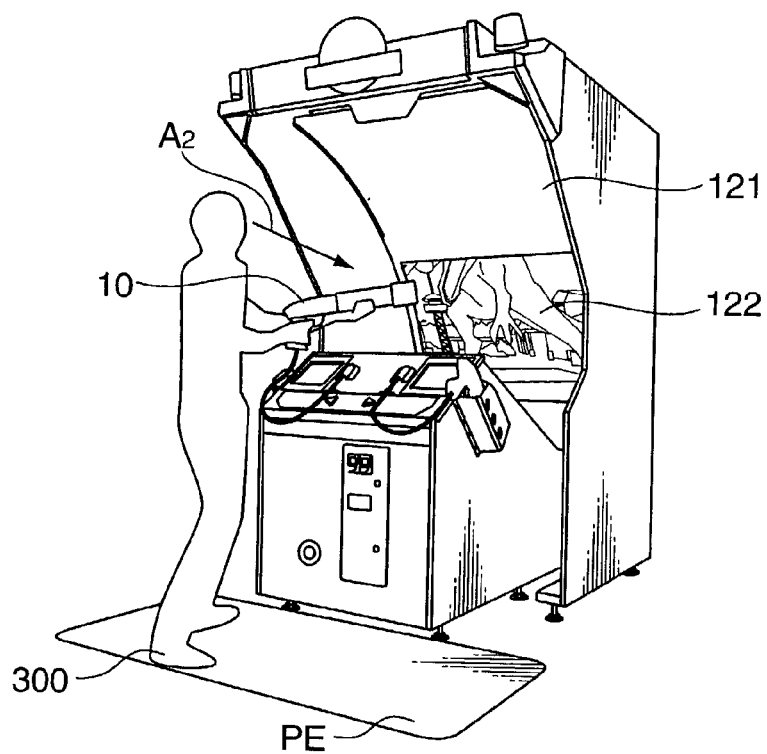
FIGS. 1A and 1B are diagrams showing the shifting of the projected image on the screen of the shooting video game machine pertaining to the first and second embodiments of the present invention.
Figure 1B:
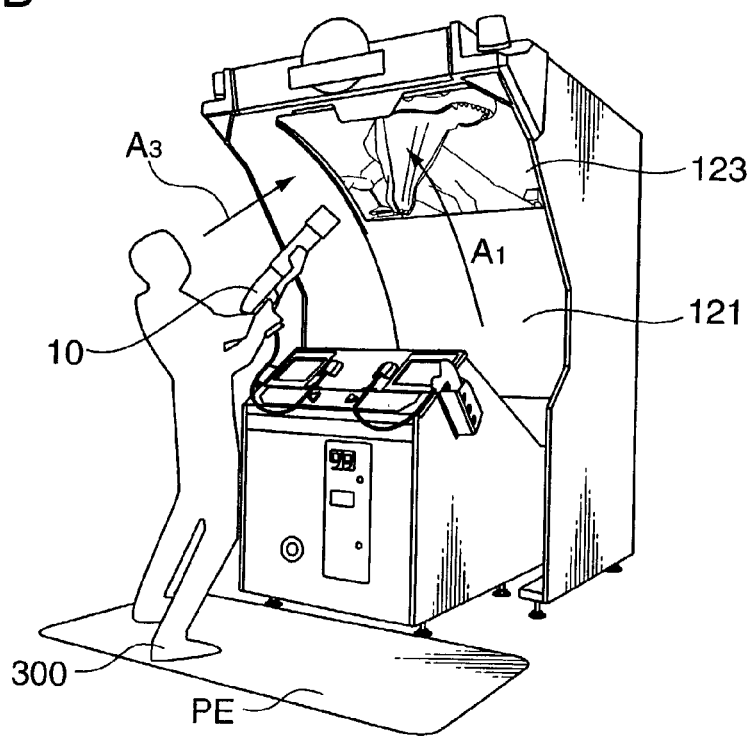
Figure 2:
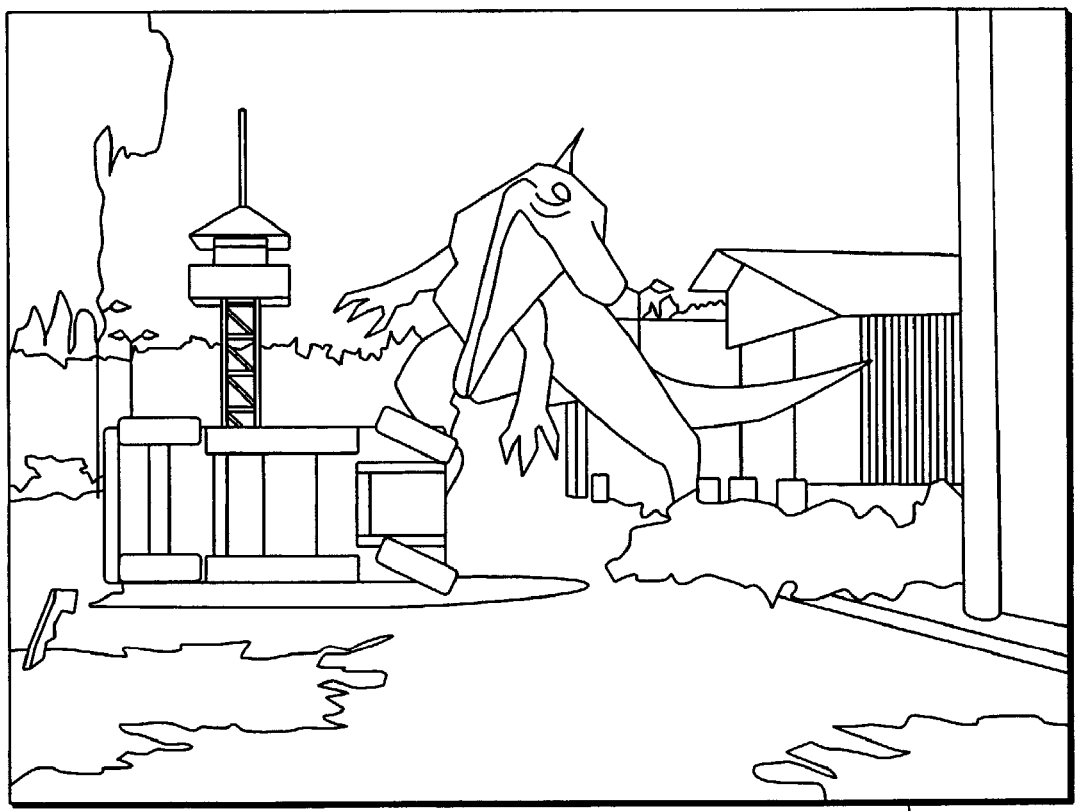
FIG. 2 is a diagram showing the first example of the foregoing projected image.

The shooting video game machine pertaining to the first embodiment of the present invention is explained below. FIG. 1 is a diagram showing the shifting of the projected image on the screen 121 of the shooting video game machine. FIG. 1A shows the display of the projected image 122 at the lower part of the screen 121, and FIG. 1B shows the display of the projected image 123 at the upper part of the screen 121. FIG. 5 is a diagram showing the change in the displayed image accompanying the movement of the player 300 to the left and right. FIG. 2 and FIG. 4 are diagrams showing an example of the projected image 122 at the lower part and FIG. 3 is a diagram showing an example of the projected image 123 at the upper part.

As shown in FIG. 1A and FIG. 1B, the player 300 standing in the play area PE of a prescribed area set in front of the game machine operates the gun unit 10 and virtually shoots the dinosaur as the game character displayed in the projected images 122, 123 on the screen 121. The dinosaur having a 3D shape and which moves and shifts with the elapse in time within the game space (virtual three-dimensional space) is displayed in the projected image 122 as shown in FIG. 2 when existing afar as an image captured from the virtual viewpoint (which corresponds to the position of the reference viewpoint of the player 300 set in advance), and is displayed in the projected image 123 as shown in FIG. 3 or in the projected image 122 as shown in FIG. 4 when nearby.

Particularly, with the present game machine, the displayed contents of the projected image 122 (FIG. 1A) displayed at the lower part of the screen 121 changes to the projected image 123 (FIG. 1B) in accordance with the virtual viewpoint moving within the game space and position of the dinosaur while shifting continuously toward the arrow $A_1$, and, pursuant to this type of shifting of the projected image on the screen 121, the visual line of the player 300 changes naturally from the lower part of the screen 121 to the upper part of the screen 121 (from the direction of arrow $A_2$ of FIG. 1A to the direction of arrow $A_3$ of FIG. 1B).

Figure 3:
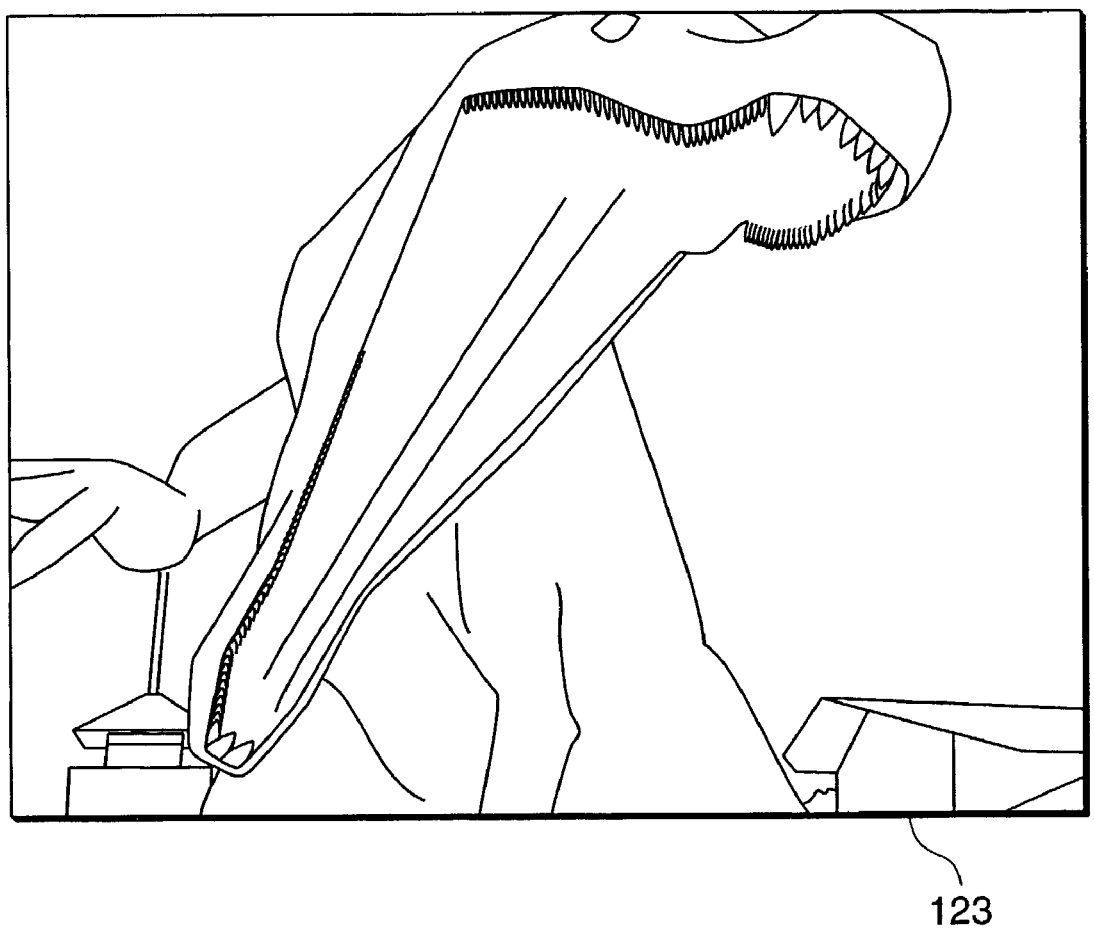
FIG. 3 is a diagram showing another example of the foregoing projected image.
Figure 4:
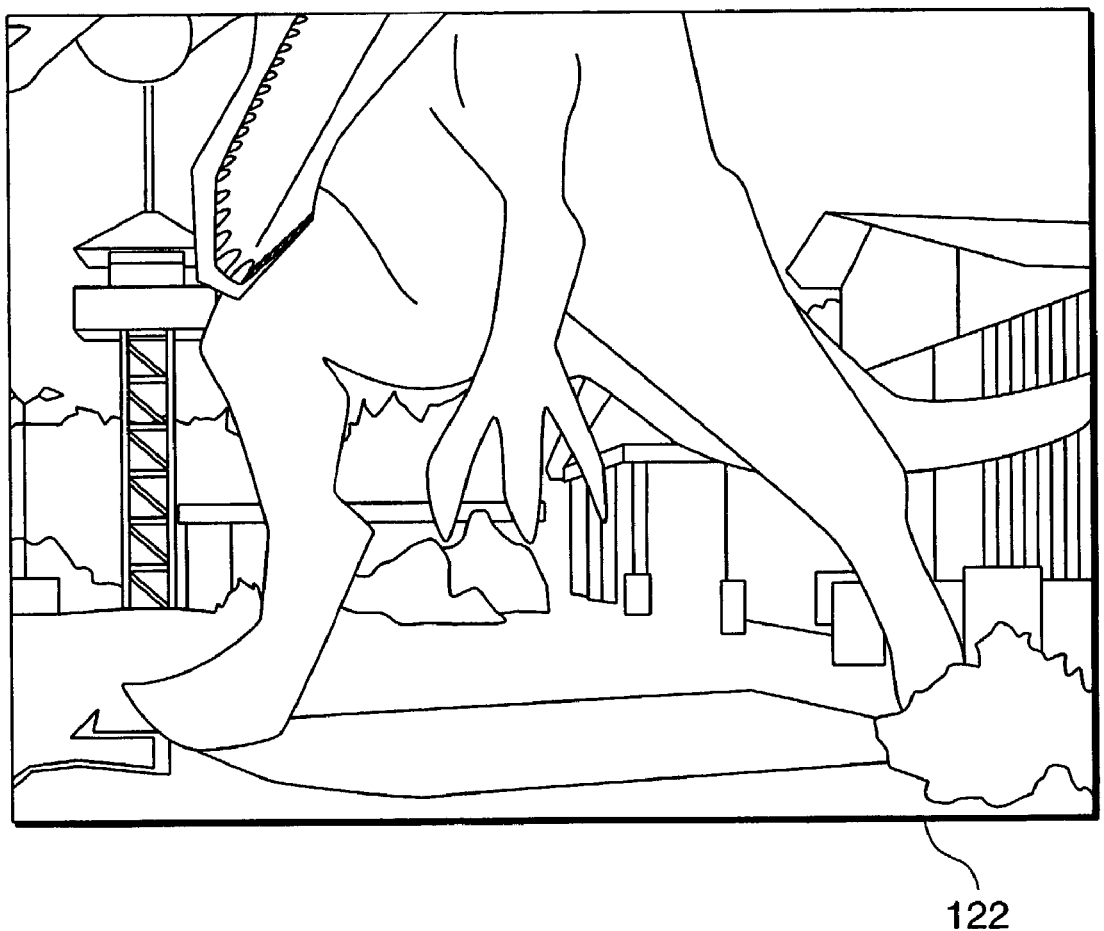
FIG. 4 is a diagram showing the second example of the foregoing projected image.
Figure 5:
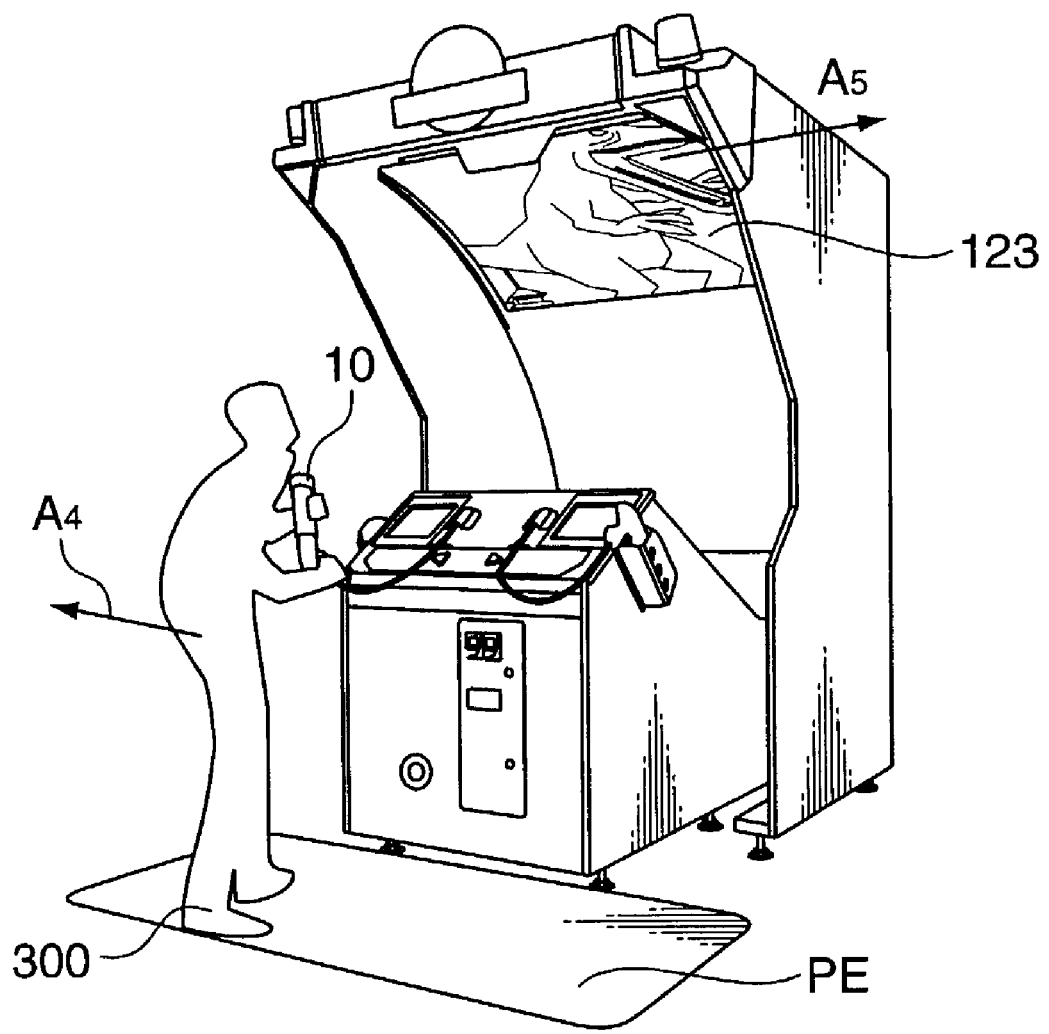
FIG. 5 is a diagram showing the change in the displayed image accompanying the player's movement to the left and right.

Further, with the present game machine, it is envisioned that the dinosaur within the game space is to attack the player, and displayed on the upper part of the screen 121 is an image where the dinosaur is trying to bite the player on the play area PE from the state within the projected image 123 of FIG. 3, and an image where the dinosaur is trying to kick (or whipping its tail against) the player is displayed on the lower part of the screen 121 from the state within the projected image 122 of FIG. 4.

The player 300 may avoid these attacks by the dinosaur by moving to the left and right on the play area PE. When the player 300 who is shooting toward the head of the dinosaur as shown in FIG. 1B moves to the left and right (direction of arrow $A_4$) on the play area as shown in FIG. 5 upon sensing that the dinosaur will begin its attack, with the present game machine, this movement is detected, the coordinates are set such that the virtual player (virtual viewpoint) moves away from the dinosaur within the game space, and a projected image 123 showing the player 300 moving away from the dinosaur (the dinosaur moves outward toward the direction of arrow $A_5$) is displayed.

Although the upper and lower parts of the enormous dinosaur approaching the virtual viewpoint are displayed on the upper and lower parts of the screen 121 in FIG. 3 and FIG. 4, a flying dinosaur (pterosaur) afar from the virtual viewpoint may be displayed on the lower part of the screen 121, the displayed contents thereof may be continuously changed and continuously shifted in accordance with the flying dinosaur with respect to the virtual viewpoint in order to display the flying dinosaur approaching the virtual viewpoint on the upper part of the screen 121.

Figure 6:
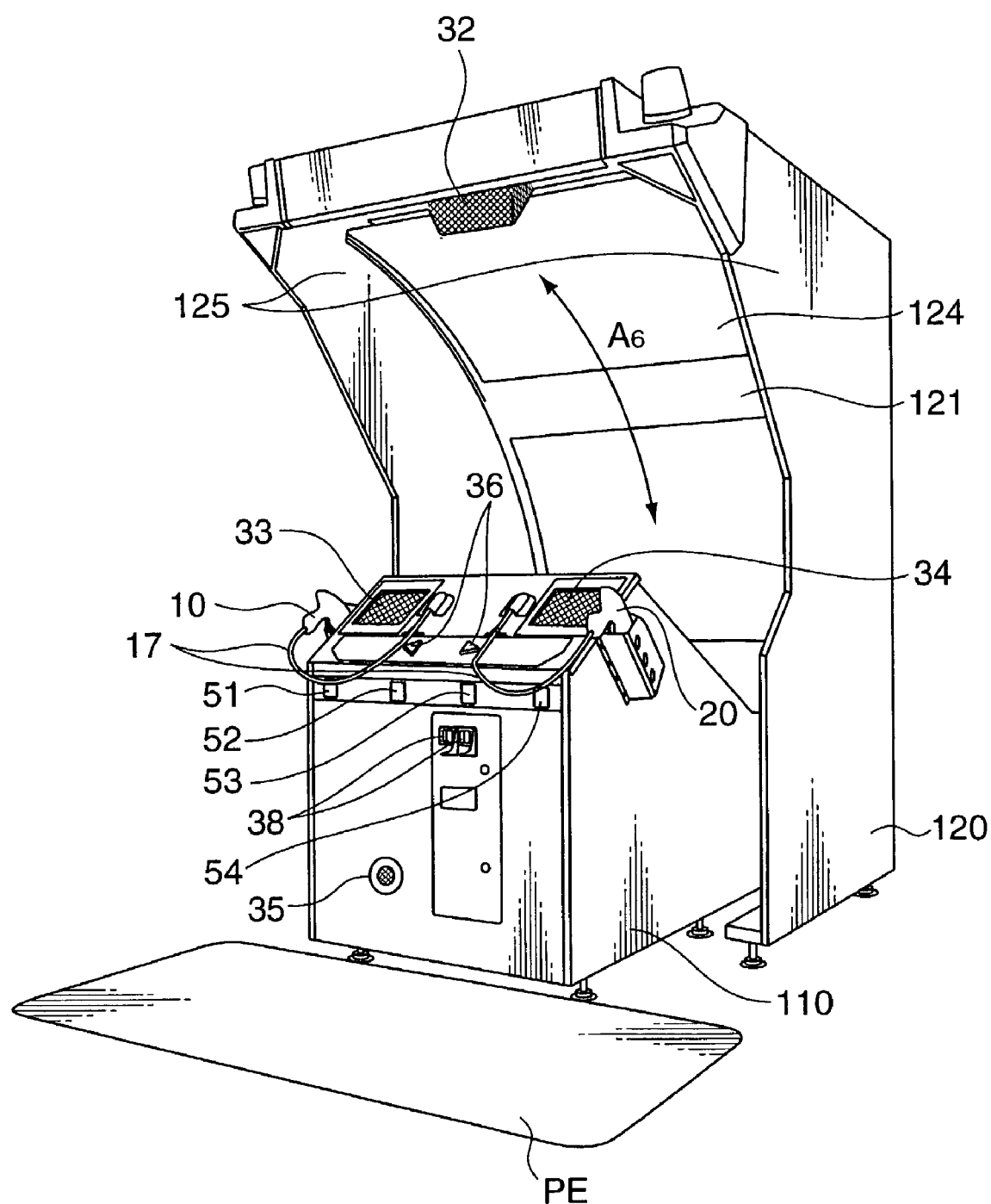
FIG. 6 is a diagram showing the appearance of the foregoing video game machine.
Figure 7:
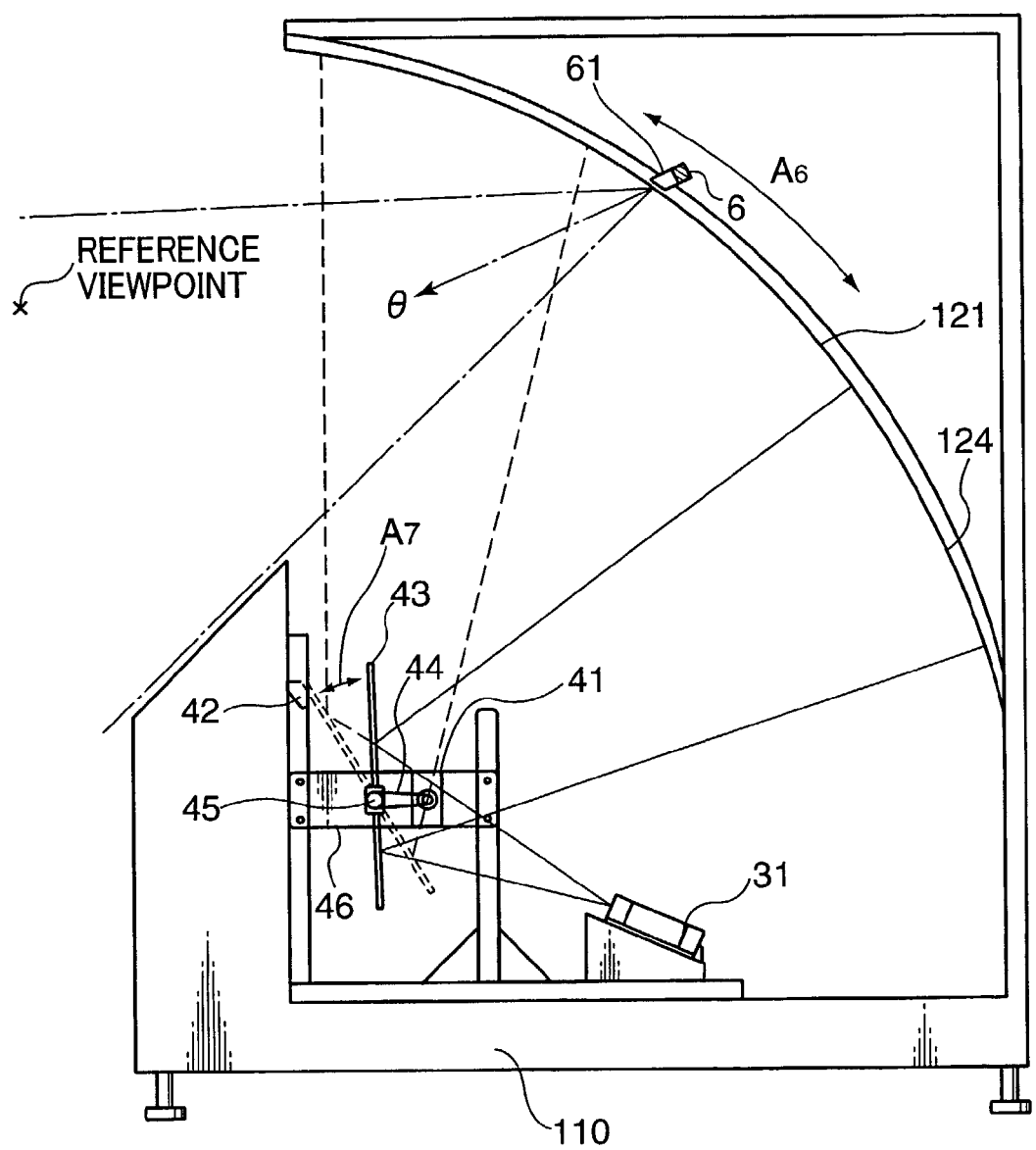
FIG. 7 is a typical cross section for explaining the shifting of the projected image on the screen.
Figure 9:
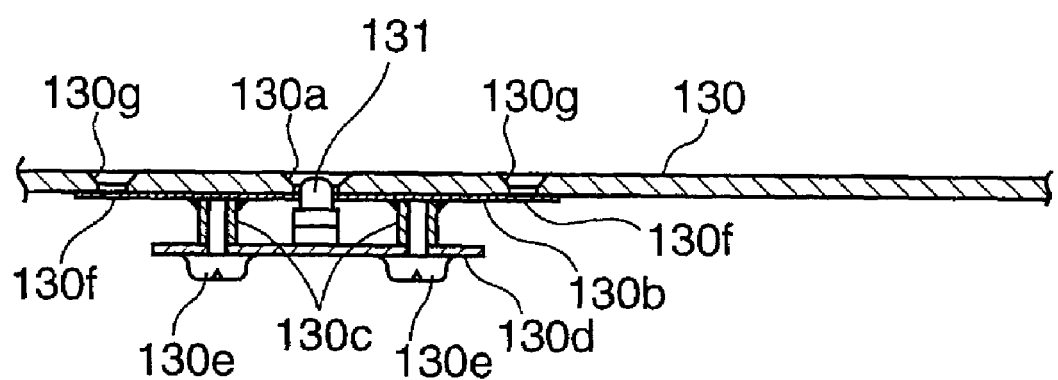
FIG. 9 is a cross section showing an example of the marker mounting structure.
Figure 10:
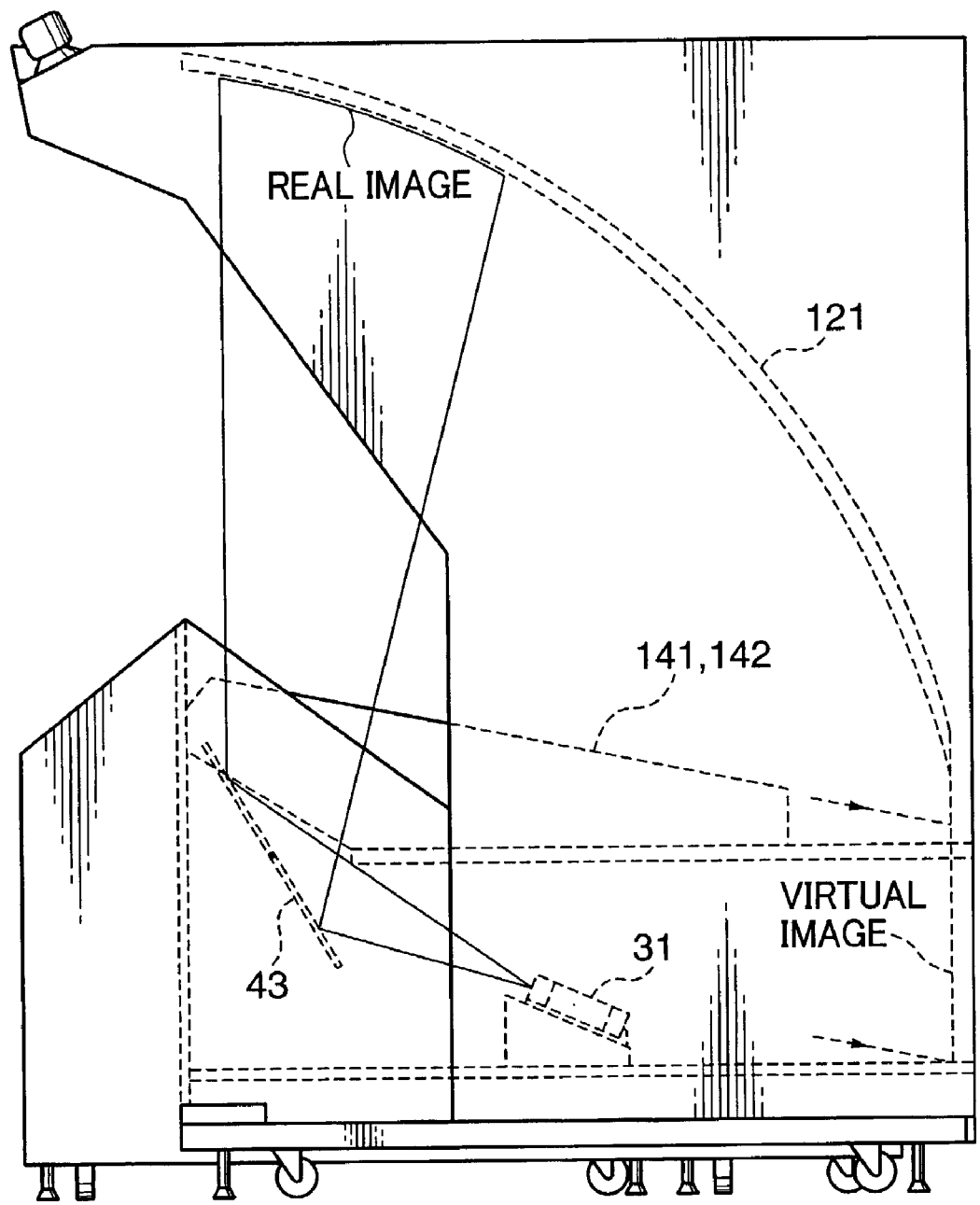
FIG. 10 is a typical cross section showing the acrylic plate disposed for protecting the rotation of the mirror and projection of the image from the projector.

FIGS. 6 to 11 will now be explained in this order regarding the structure of the present game machine for performing the overall operation described above. FIG. 6 and FIG. 7 are diagrams relating to the structure for projecting images and performing imaging with the gun unit 10, FIG. 8 and FIG. 9 are diagrams relating to the structure of the light source unit (marker) which is the detection subject for detecting the muzzle 16 direction, and FIG. 10 and FIG. 11 are diagrams relating to the structure for protecting the rotation and the like of the mirror 43.

The structure for projecting images is now explained. FIG. 6 is a diagram showing the appearance of the present game machine, and FIG. 7 is a typical cross section for explaining the shifting of the projected image on the screen 121.

With the present game machine, as shown in FIG. 6, the projected image 124 projected from the projector 31 (FIG. 7) on the screen 121 retained with the screen retention table 120 shifts in the arrow $A_6$ direction, and the gun unit 10 and gun unit 20 are connected to the main body control unit 100 (explained later at FIG. 13) via the gun cable 17. The projected image 124 contains a shooting target such as a dinosaur as described above, and the 1P player standing on the play area PE operates the gun unit 10 (or the 2P player operates the gun unit 20) to virtually shoot the shooting target, and points are scored in accordance with the skill of shooting such as the shooting position and shooting timing.

The four player detection sensors 51 to 54 mounted on the front face of the base 110 are for detecting the movement of the 1P player when it is a one player game (or 1P player and 2P player when it is a two player game) in the left and right directions, and side plates 125 are provided for preventing the disturbance and the like upon detecting the muzzle direction (described later) with respect to the screen 121 and displaying images on the screen 121.

Further, with the present game machine, music and the like is played in order to yield vigor, and a speaker (top) 32, speaker (left) 33 and speaker (right) 34 for outputting sounds in the middle and high ranges, and a woofer speaker 35 for outputting sounds in the low ranges are provided in order to output such sounds during the game. The speaker (top) 32 and speaker (left) 33 form one pair and the speaker (top) 32 and speaker (right) 34 form one pair in order to playback in stereo sound.

A coin of a prescribed amount is inserted into the coin insertion slot 38, the start button 36 is suitably pressed in accordance with the display on the screen 121, and a one player game with only the 1P player or a two player game with both the 1P player and 2P player is selectively started.

The rectangular flat mirror 43, as shown in FIG. 7, has a mirror axis 45 extending in the perpendicular direction in the diagram, and both ends of the mirror axis 45 are rotatably retained with the mirror retention member 46. The rotation of the stepping motor 41 connected to the control unit described later is transmitted to the mirror with the timing belt 44, and the projected image 124 shifts in the arrow $A_6$ direction on the screen by the mirror 43 being rotated in the direction of arrow $A_7$.

The reference viewpoint set at a prescribed height and position at the front of the present game machine is associated with the virtual viewpoint within the game space, and it is envisioned that a player (of an average height) is able to view the screen 121 from this reference viewpoint position.

Next, explained is the structure for detecting the direction of the muzzle 16. Preferably a color CCD camera 6 as the imaging means is mounted in forward orientation at a prescribed height and position at the left, right and center of the screen 121 shown in FIG. 7. The CCD camera 6 is directed in the direction of θ so as to at least include the muzzle position in the game of the gun unit 10 operated by the player, and adopted are those which have a prescribed visual field width (solid angle of the range shown with the chain line). It is preferable that the CCD camera 6 be built in the likes of a housing 61 for blocking light such that it will not receive the projected light from the projector 31 to the screen 121.

FIG. 8 is a diagram showing the structure of the gun unit 10 (similar with the gun unit 20) as an example of the controller for accepting input operations from the player, and FIG. 9 is a diagram showing an example of the mounting structure of the marker provided to the gun unit 10 for detecting the direction of the muzzle 16 with respect to the screen 121.

The gun unit 10, as shown in FIG. 8A, simulates a pump action gun, and has a trigger switch 11 as the micro switch that is turned on when the player pulls the trigger 14 in the direction of arrow $A_8$, a pump trigger switch 12 as the micro switch that is turned on when the player slides the sliding unit 15 in the direction of arrow $A_9$, and a marker 13 for detecting the point where the direction of the muzzle with respect to the screen 121; that is, the direction of the muzzle 16 (visual line vector) intersects with the screen 121. Signals from the trigger switch 11 and the pump trigger switch 12 are transmitted to the main body control unit 100 via the gun cable 17, virtual shooting is designated by the trigger switch 11 being turned on, and the loading of a prescribed number of virtual bullets is designated to the gun unit 10 when the pump trigger switch 12 is turned on. When the marker 13 is not of a reflective type and is rather a self-illuminating type, a power source supply line is included in the gun cable.

As shown in FIG. 8B, the marker 13 mounted on the tip (marker mounting section) of the muzzle 16 of the gun unit 10 comprises a plate shaped substrate 130, and, for example, LEDs 131 to 135 as the five dotted light sources for emitting prescribed colors having the same shape in the present embodiment are disposed on such plate surface in prescribed intervals, preferably in prescribed equal intervals in the vertical and horizontal directions. LEDs 131 to 135 are structured such that LED 131 is at the intersecting point position of the vertical and horizontal axes in the present embodiment, LEDs 132 and 133 are disposed in equal intervals in the vertical axis direction (LED 131 and LED 132 structure the first light source unit, LED 132 and LED 133 structure the second light source unit, and LED 132 is shared in the present embodiment), and LEDs 134 and 135 are disposed in equal intervals in the horizontal direction (LED 131 and LED 134 structure the third light source unit, LED 134 and LED 135 structure the fourth light source unit, and LED 134 is shared in the present embodiment). Mounting position information on the respective plate surfaces of LEDs 131 to 135 is, for example, stored in the likes of a ROM 105 of the main body control unit 100 shown in FIG. 12 as position information with LED 131 as the reference. It is preferable that an illuminator capable of emitting infrared light be used as the LEDs 131 to 135 for preventing the erroneous detection by outside light. In a mode where the LED 131 is not shared and respectively divided in the vertical and horizontal directions, the number of LEDs will become six. LED 132 and LED 134 do not have to be shared either. Further, the color of the substrate 130 is adopted upon being colored to a color capable of being identified with the CCD camera 6 against the luminescent color of the LED, and, as described later, enabled is the measurement of the vertical and horizontal dimension of the substrate 130; that is, dimension of the distance to the CCD camera 6. Needless to say, a CCD camera capable of only receiving infrared light may also be used.

FIG. 8C is a diagram showing an example of the image imaged with the CCD camera 6 and incorporated in the image memory, and, as illustrated therein, obtained are images of the luminescent spots 131*a* to 135*a* corresponding to the LEDs 131 to 135. Moreover, as shown in the diagram, the image is imaged in an oval as shown with the chain line around the substrate; that is, in a posture facing the oblique direction, and it is evident that the luminescent spots 131*a* to 135*a* are compress and mapped in the left and right directions.

FIG. 9 is a diagram showing an example of the mounting structure of the dotted light source. The LEDs 131 to 135 as the dotted light source are mounted, for example, in an upright posture on the substrate 130 of a prescribed size to which is mounted an LED illuminating drive circuit or the like. Pores 130*a* from which the illumination unit 6 of the LEDs 131 to 135 is exposed are provided at prescribed positions on the substrate 130.

When providing a description with LED 131 as the example, the pore 130*a* is formed in a conical shape (cone shape) broadening toward the front of the of the substrate 130, and the light emitted from the respective LEDs may be irradiated at a broad angle. A stud nut 130*c* having a prescribed height is welded at two places at the left and right sides of the thin metal plate 130*b*, or established by pressurization (to the pore not shown formed on the thin metal plate 130*c*), and the mounting plate 130*d* and the thin metal plate 130*b* are integrally formed by mounting a mounting plate 130*d* on these nuts 130*c* and tightening this with a bolt 130*e* from the opposite face. The thin metal plate 130*b* to the bolt 130*e* form the LED supporting unit. A pore 130*f* is further formed at both end positions of the thin metal plate 130*b*, and, although not shown, a triangular screw penetrates the cone shaped pore formed on the substrate 130 in order to integrally form the substrate 130 and muzzle 16 by tightening the bolt via the LED supporting unit.

Figure 11A:
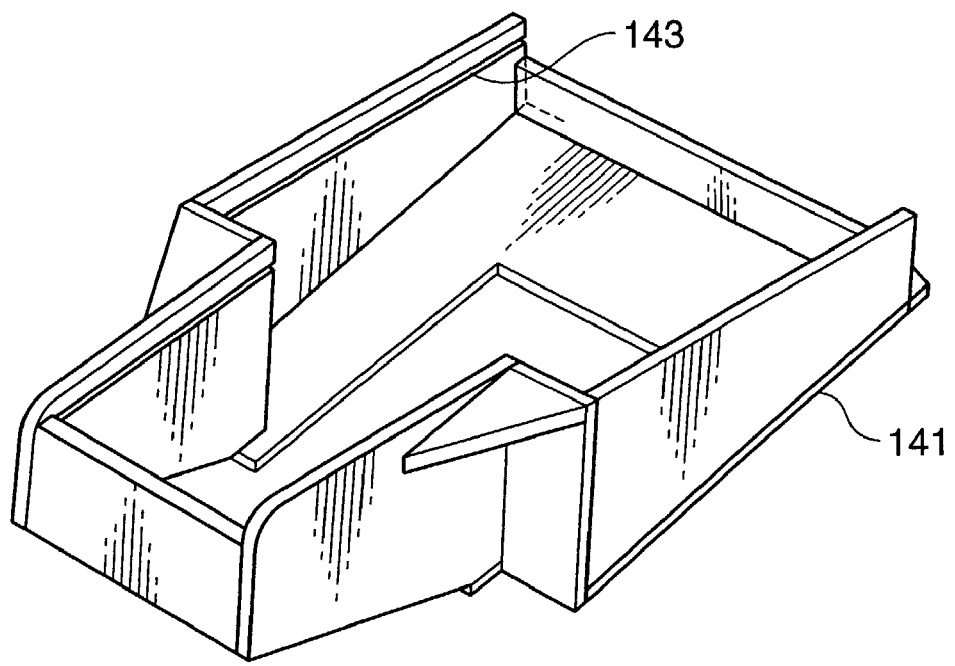
FIG. 11A is a diagram showing the structure of the acrylic plate retention member and FIG. 11B is a diagram showing the structure of the acrylic plate.
Figure 11B:
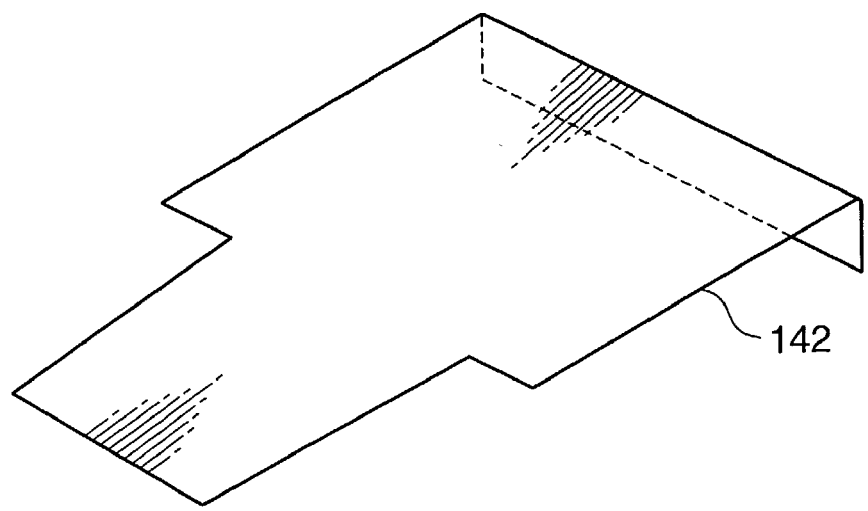

Next, explained is the structure for protecting the rotation and the like of the mirror 43. FIG. 10 is a typical cross section showing the acrylic plate 142 established for protecting the projection of the image form the projector 31, and FIG. 11 is a diagram showing the structure of the acrylic plate retention member 141 (FIG. 11A) and the acrylic plate 142 (FIG. 11B).

The acrylic plate 142 (FIG. 11B) established so as to cover the mirror 43, projector 31 and the like in a state of where the end thereof is passing through the acrylic plate guide groove 143 (FIG. 11A), as shown in FIG. 10, transmits the images from the projector 31, and protects the inside which houses the likes of the mirror 43 and projector 31 from outside sources. Further, when the real image is projected on the upper part of the screen 121, an inclination of roughly 10° is provided from the horizontal direction such that the virtual image is connected to the outside of the screen 121 with the light reflected from the likes of the acrylic plate 143 and mirror 43.

Figure 12:
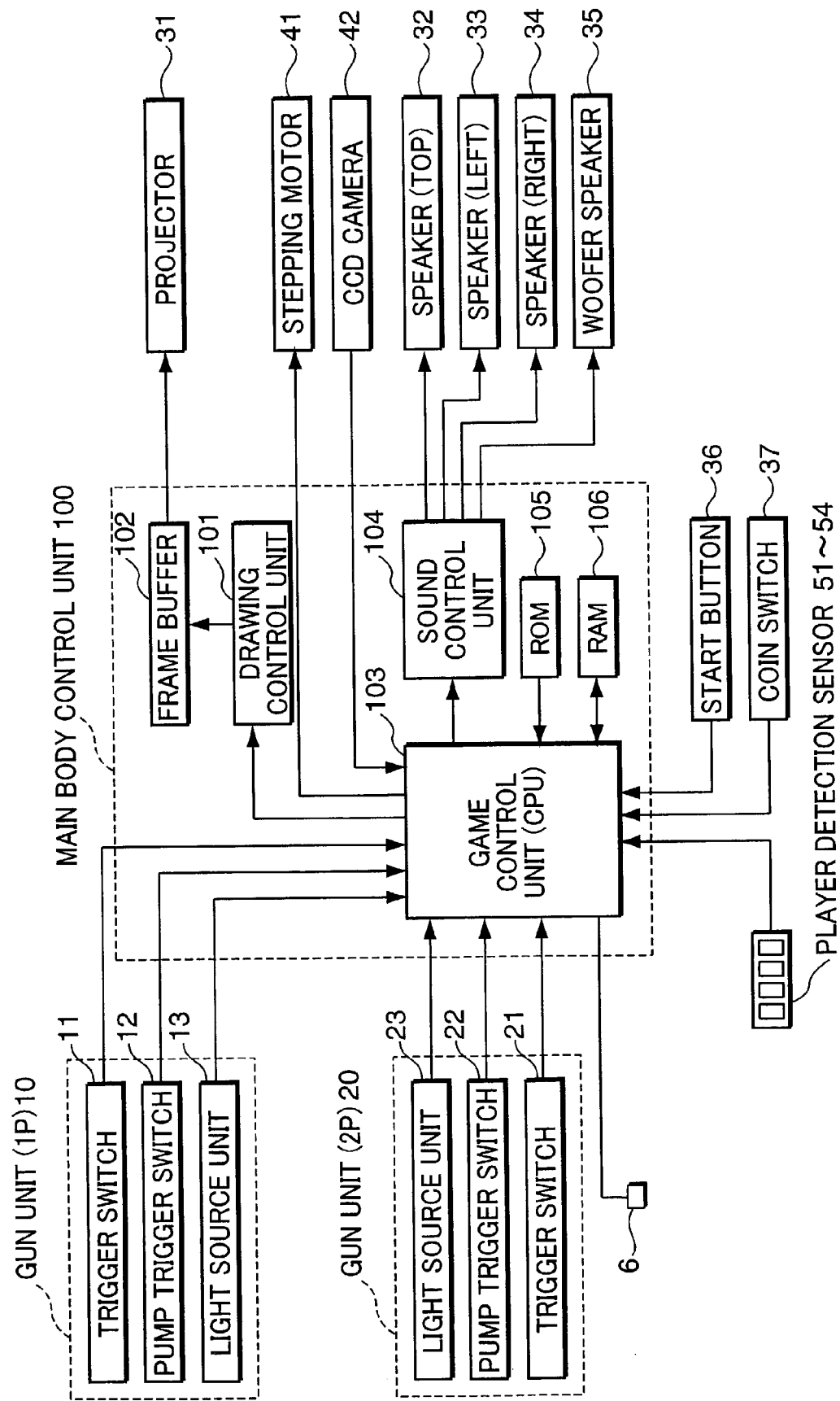
FIG. 12 is a block diagram showing the hardware structure of the control unit of the shooting video game machine pertaining to the first embodiment.

The control of the present game machine structured as above is now explained with reference to FIGS. 12 onward. FIG. 12 is a block diagram showing the hardware structure of the control unit of the present game machine, and FIG. 13 is a flowchart showing the procedure of the shooting game processing (shooting video game program) executed with the game control unit (CPU) 103.

As shown in FIG. 12, connected to the (game control unit 103 of the) main body control unit 100 set within the base 110 (FIG. 6) are the aforementioned CCD camera 6; trigger switches 11, 21; pump trigger switches 12, 22; player detection sensors 51 to 54; start button 36; projector 31; stepping motor 41; speakers 32 to 35; coin switch 37 for detecting the insertion of the coin from the coin insertion slot 38; and position sensor 42 for determining the rotational reference position of the mirror with the semicircular plate mounted on the mirror axis (upon turning on the power), and the display position of the projected image 124 on the screen 121 (FIG. 7) is continuously designated by the game control unit 103 designating the rotation angle from the rotational reference position.

Provided to the main body control unit 100 are a ROM 105 storing the program, image data and sound data for the shooting video game processing described later; a RAM 106 for temporarily storing the program read from the ROM 105 and data used in the program; a game control unit 103 for controlling the overall progress of the game based on the program loaded on the RAM 106; a drawing control unit (image drawing processor) 101 for writing image data corresponding to the projected image of the projector 31 in the frame buffer 102 while performing processing unique to the image such as polygon drawing and texture mapping in accordance with the coordinates of the object having a 3D shape within the game space; and a sound control unit (sound control processor) 104 comprising an ADPCM sound source for reproducing sounds from the sound data.

Figure 13:
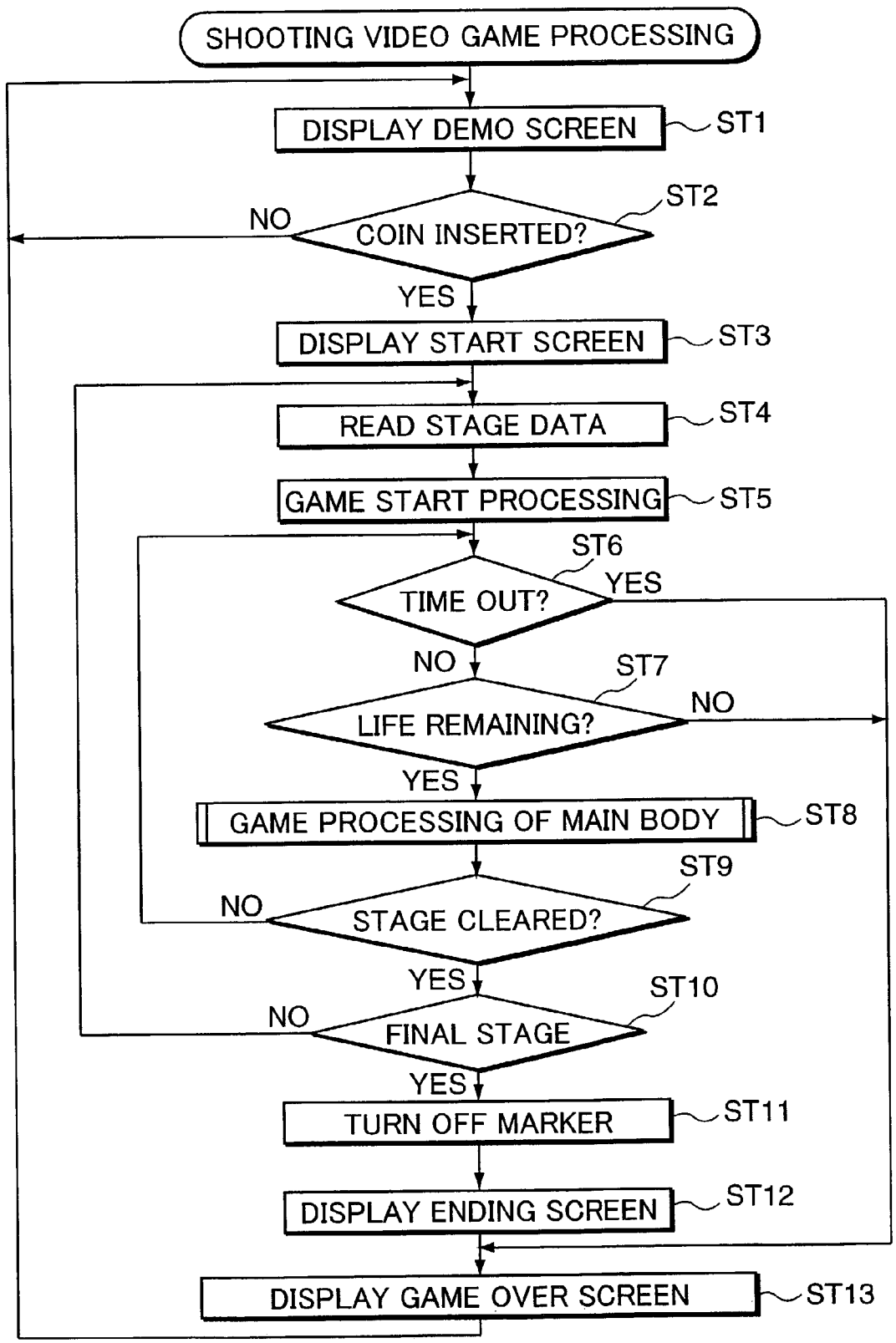
FIG. 13 is a flowchart showing the procedure for the shooting video game processing executed with the game control unit (CPU)

With the shooting video game processing to be executed at the game control unit 103, as shown in FIG. 13, if the coin insertion is not detected with the coin switch 37 (NO at ST2), demo image data is read and a demo screen is displayed (ST1).

When the insertion of the coin is detected (YES at ST2), the start screen is displayed (ST3), (and when the pressing of the start button 36 is further detected) the game start processing is executed (ST5) and the game is started after other game data is read (ST4) which characterizes the image data and sound data differing per stage, and the attack or movement of the enemy character (foregoing dinosaur or other shooting targets) and the movement of the player.

With the present game machine, similar to conventional hand-to-hand combat game machines, a virtual life of the player is set and reduced in accordance with the time limit of the game and the attack by the enemy character, and the game is ended when the time is up during the game progress (YES at ST6) or when the life runs out (NO at ST7), and a screen indicated game over is displayed (ST13). If time still remains (NO at ST6) and the life still remains (YES at ST7), the game is continued at the game processing main body (ST8, to be described in detail later with reference to FIG. 15 and the like).

When a stage is cleared (YES at ST9) by defeating the enormous dinosaur shown in FIGS. 2 to 4, and the cleared stage is not the final stage (NO at ST10), processing from ST4 is repeated for the new stage.

When the cleared stage is the final stage (YES at ST10), the markers 13, 23 are turned off thereafter (ST11), the ending screen and game over screen are displayed (ST12, ST13), and the routine returns to the processing of ST1.

Figure 14:
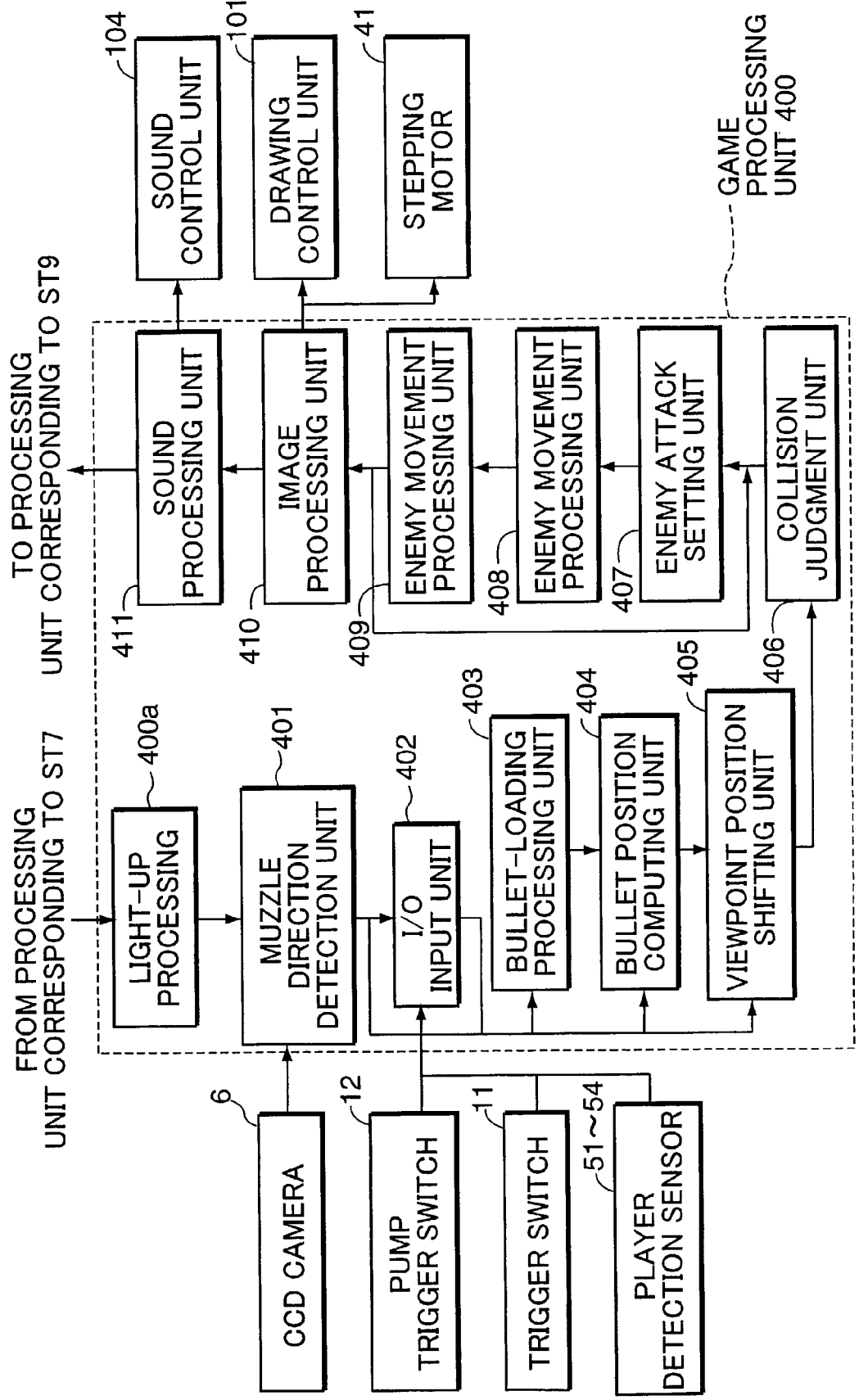
FIG. 14 is a block diagram showing the structure of the principal parts of the game processing unit for performing the processing with the game processing main body.
Figure 15:
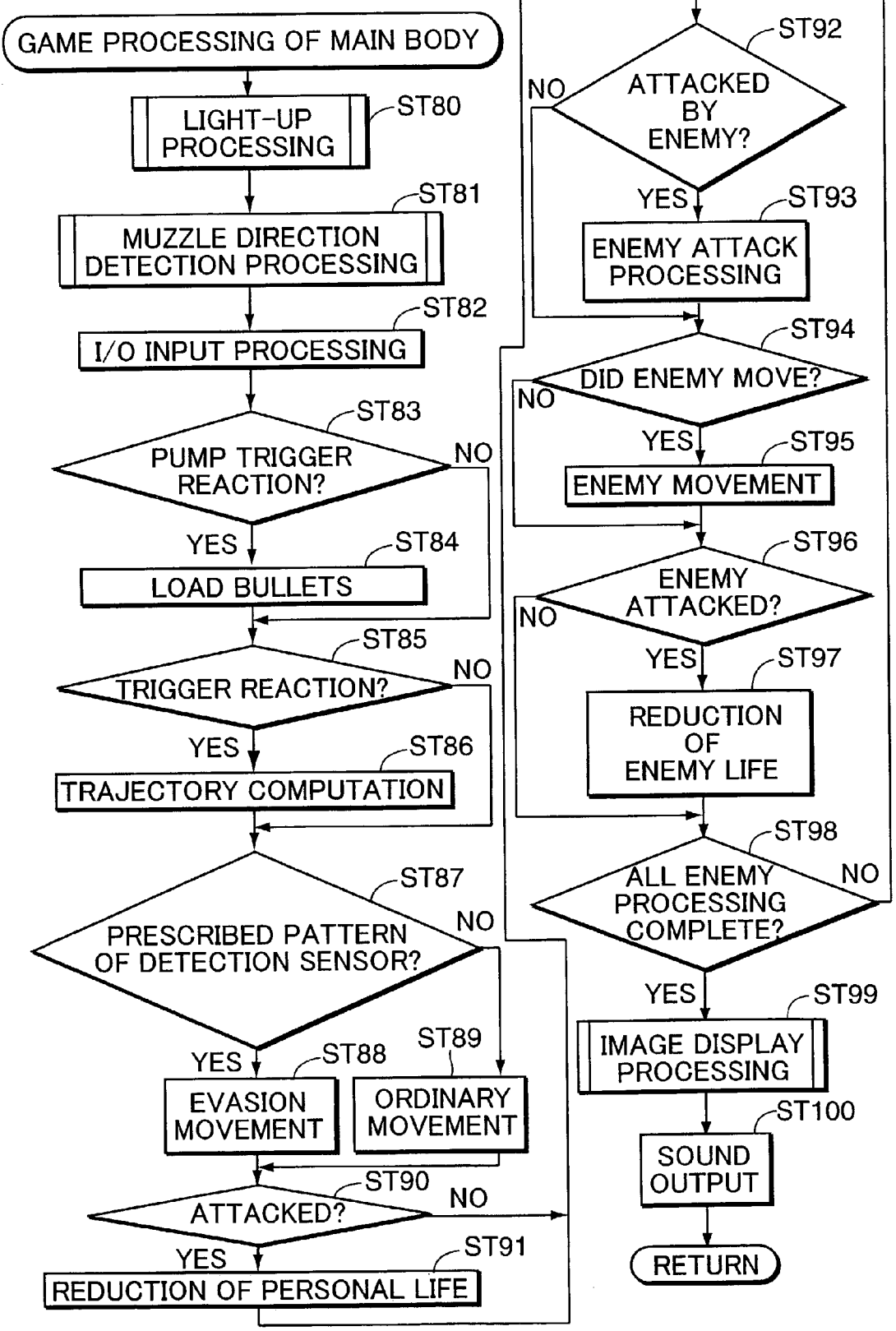
FIG. 15 is a flowchart showing the detailed procedure of the processing with the game processing main body.
Figures 16, 17:
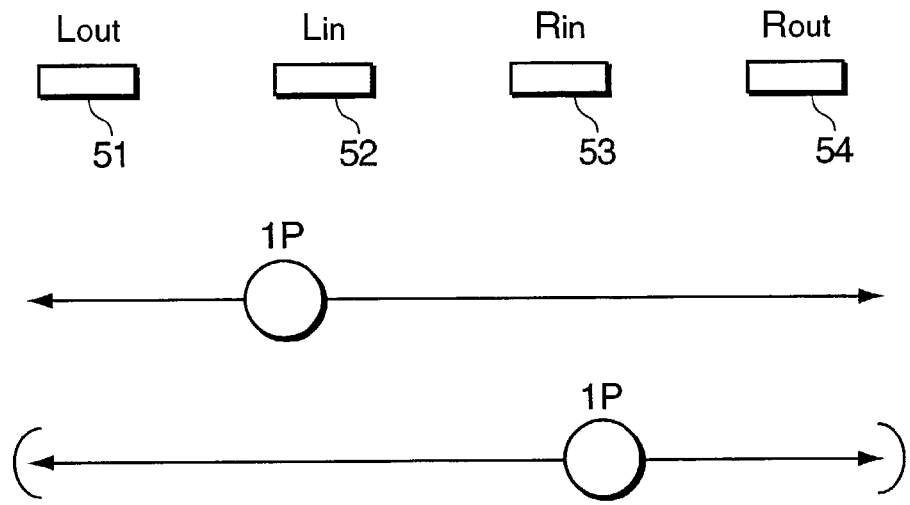
FIG. 16 is the first diagram for explaining the detection of the player's position on the play area with the player detection sensor.
FIG. 17 is the second diagram for explaining the detection of the player's position on the play area with the player detection sensor.

FIG. 14 is a block diagram showing the structure of the principal parts of the game processing unit 400 (part of the shooting video game program) for performing the processing with the game processing main body at ST8 of FIG. 13, and FIG. 15 is a flowchart showing the detailed procedure of the processing with the game processing main body at ST8. FIG. 16 and FIG. 17 are diagrams for explaining the detection of the position of the player 300 on the play area PE with the player detection sensors 51 to 54 (in a one player game with only 1P player).

As shown in FIG. 14, when taking the gun unit 10 as an example as the processing unit for performing processing in relation to the player (virtual viewpoint, or virtual player within the game space), the game processing unit 400 has a light-up processing unit 400a for lighting the marker during the game; a muzzle direction detection unit 401 for detecting the position on the screen 121 to which the muzzle is facing based on the image captured with the CCD camera 6; an I/O input unit 402 for inputting the on-state of the pump trigger switch 12 and trigger switch 11 and the detection status of the player detection sensors 51 to 54; a bullet-loading processing unit 403 for processing the loading of a prescribed number of virtual bullets when the pump trigger switch 12 is turned on; a bullet position computation unit 404 for setting the coordinates so as to move the bullets in a direction according to the direction of the muzzle 16 from the vicinity of the virtual viewpoint within the game space when the trigger switch 11 is turned on; a viewpoint position shifting unit 405 for ordinarily shifting the virtual viewpoint within the game space (at a shifting width designated in advance) and shifting the virtual viewpoint so as to avoid the dinosaur when the player detection sensors 51 to 54 detect the movement of the player on the player area PE; and a collision judgment unit 406 for judging whether the virtual attack from the enemy hit the player.

Further, as the processing unit for performing processing relating to the enemy character, the game processing unit 400 has an enemy attack setting unit 407 for generating the attack to the player when the enemy character is sufficiently close to the player (using random numbers, etc.); an enemy movement processing unit 408 for moving the enemy character upon setting the enemy character coordinates so as to chase the player within the game space; and an enemy collision judgment unit 409 for judging whether the virtual attack from the player hit the enemy. The game processing unit 400 further has an image processing unit 410 for setting data which designates the drawing control unit 101 so as to draw based on the setting of the enemy character coordinates and rotating the stepping motor 41 in accordance with where to display the projected image of the projector 31 on the screen 121, for example, whether to display the projected image on the upper part or lower part; and a sound processing unit 411 for setting data which designates the sound control unit 104 to selectively reproduce sounds (including music) according to the game progress.

With the game processing main body executed at the game processing unit 400 including each of the foregoing processing units, as shown in FIG. 15, light-up processing of the marker 13 is foremost conducted (ST80), the muzzle direction detection processing is then conducted with the muzzle direction detection unit 401 (ST81, described later in details with reference to FIG. 18 and the like), and the response status of the pump trigger switch 12, trigger switch 11 and player detection sensors 51 to 54 is obtained with the I/O input unit 402 (ST82).

If the pump trigger switch 12 is responding (YES at ST83), the bullets are virtually loaded at the bullet-loading processing unit 403 (ST84). If the trigger switch 11 is responding (YES at ST85), the coordinates representing the trajectory of the bullets within the game space are computed (ST86) in accordance with the direction of the muzzle 16 with respect to the screed detected with the muzzle direction detection unit 401.

If the response state of the player detection sensors 51 to 54 is of a prescribed pattern showing the movement of the player 300 on the play area PE (YES at ST87), the avoidance movement of the virtual viewpoint is set with the viewpoint position shifting unit 405 (ST88), and, if the response status of the player detection sensors 51 to 54 is not of a prescribed pattern (NO at ST87), the normal movement of the virtual viewpoint is set (ST89).

In further detail, the player detection sensors 51 to 54 are range sensors for detecting the distance to the obstacle with supersonic waves or infrared rays, and turning on the signal when the distance to the obstacles is less than a prescribed distance (distance corresponding to the player 300 on the play area PE) (it is not necessary to measure the distance accurately). As shown in FIG. 16 and FIG. 17, when it is detected that 1P player shifted from the reference position in front of the player detection sensor 52 on the inner left side to the front of the player detection sensor 51 on the outer left side during an ordinary case, the virtual viewpoint coordinates are set within the game space deeming that the player has moved around to the left side of the dinosaur.

Particularly, here, since the movement to the left side is detected with a combination of two player detection sensors, as shown in FIG. 17, it is possible to detect "a state where nobody is playing" and "a state of erroneously recognizing the gallery other than the player" in addition to the movement itself, and it is possible to detect the movement of the player with further accuracy.

Further, regarding the 1P player's movement to the right side (FIG. 16), when it is detected that the player moved to the front of the player detection sensor 53 on the inner right side (or the player detection sensor 54 on the outer right side), the virtual viewpoint coordinates are set within the game space deeming that the player has moved around to the right side of the dinosaur.

Moreover, the reference position may be moved to the front of the player detection sensor 53 on the inner right side. Here, when it is detected that the player moved to the front of the player detection sensor 54 on the outer right side, the virtual viewpoint coordinates may be set within the game space deeming that the player has moved around to the right side of the dinosaur, and when it is detected that the player moved to the front of the player detection sensor 52 on the inner left side (or the player detection sensor 51 on the outer left side), the virtual viewpoint coordinates may be set within the game space deeming that the player has moved around to the left side of the dinosaur.

When the collision judgment unit 406 judges that the attack from the enemy character hit the player (YES at ST90 of FIG. 15), the player's life is reduced, and the player's life gauge display (which represents the player's life value on the screen in a pole shape) is renewed (ST91).

When an attack from the enemy character to the player is generated in the enemy attack setting unit 407 (YES at ST92), coordinates within the game space of the respective portions are set (ST93) such that the attack against the player is generated from the portions which the enemy character generates attacks such as the mouth, arms, legs and tail. When the enemy character movement is set in the enemy movement processing unit 408 (YES at ST94), enemy character coordinates within the game space are moved (ST95). Next, when the enemy collision judgment unit 409 judges that the attack from the player hit the enemy character (YES at ST96), the enemy's life is reduced, and the enemy life gauge display is renewed (ST97).

It is possible to assume that one or two or more enemy characters exist in the game space, and while the target enemy character is being renewed, processing of ST92 to ST97 for all enemy characters is repeated (NO at ST98). When all processing of ST92 to ST 97 for all enemy characters is completed (YES at ST98), image display processing with the image processing unit 410 (ST99) and the sound output processing with the sound processing unit 411 (ST100) are conducted, and the processing of the game processing main body returns to the beginning.

Figure 18:
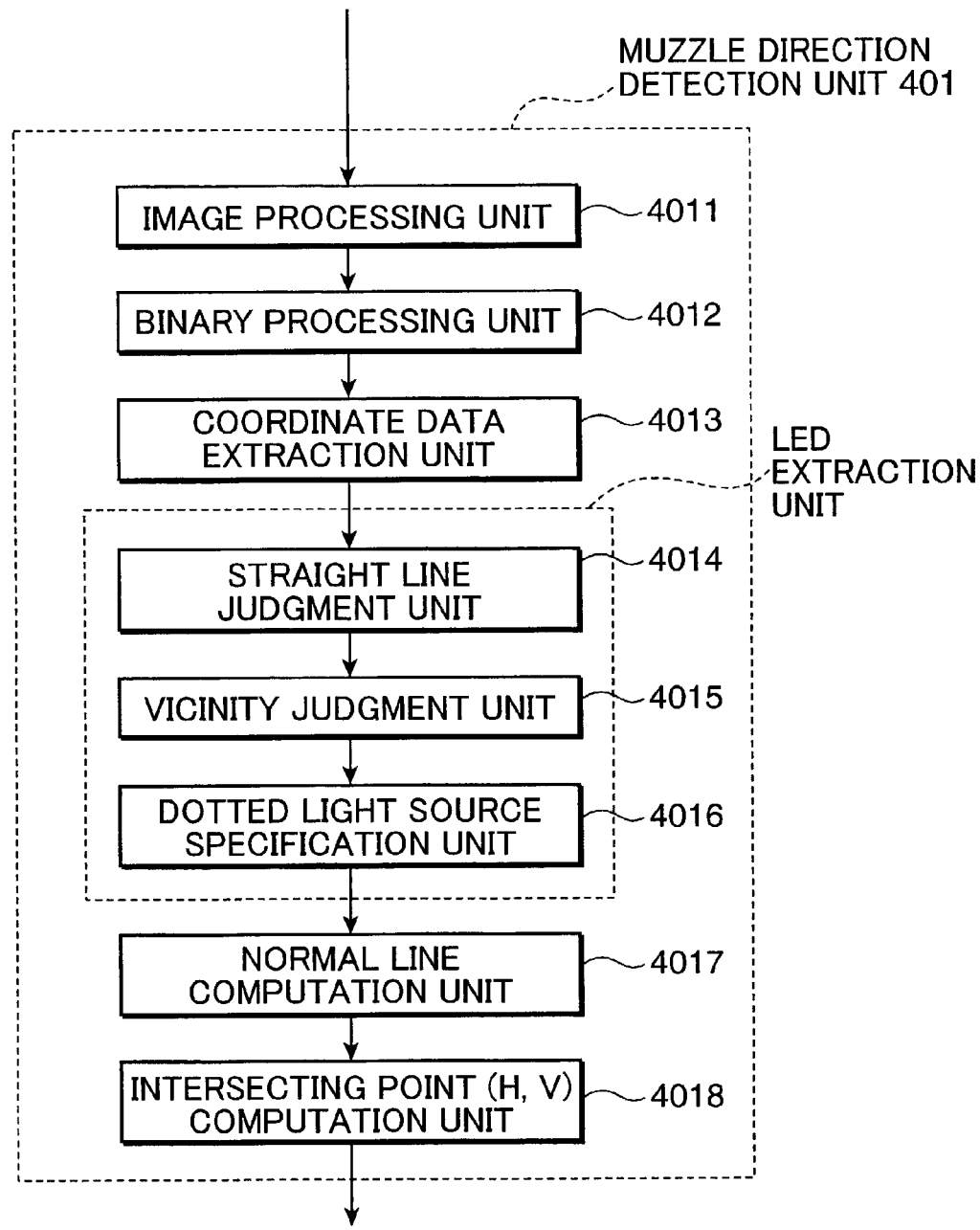
FIG. 18 is a block diagram showing the structure of the principal parts of the muzzle direction detection unit for performing the muzzle direction detection processing at ST81.
Figure 19:
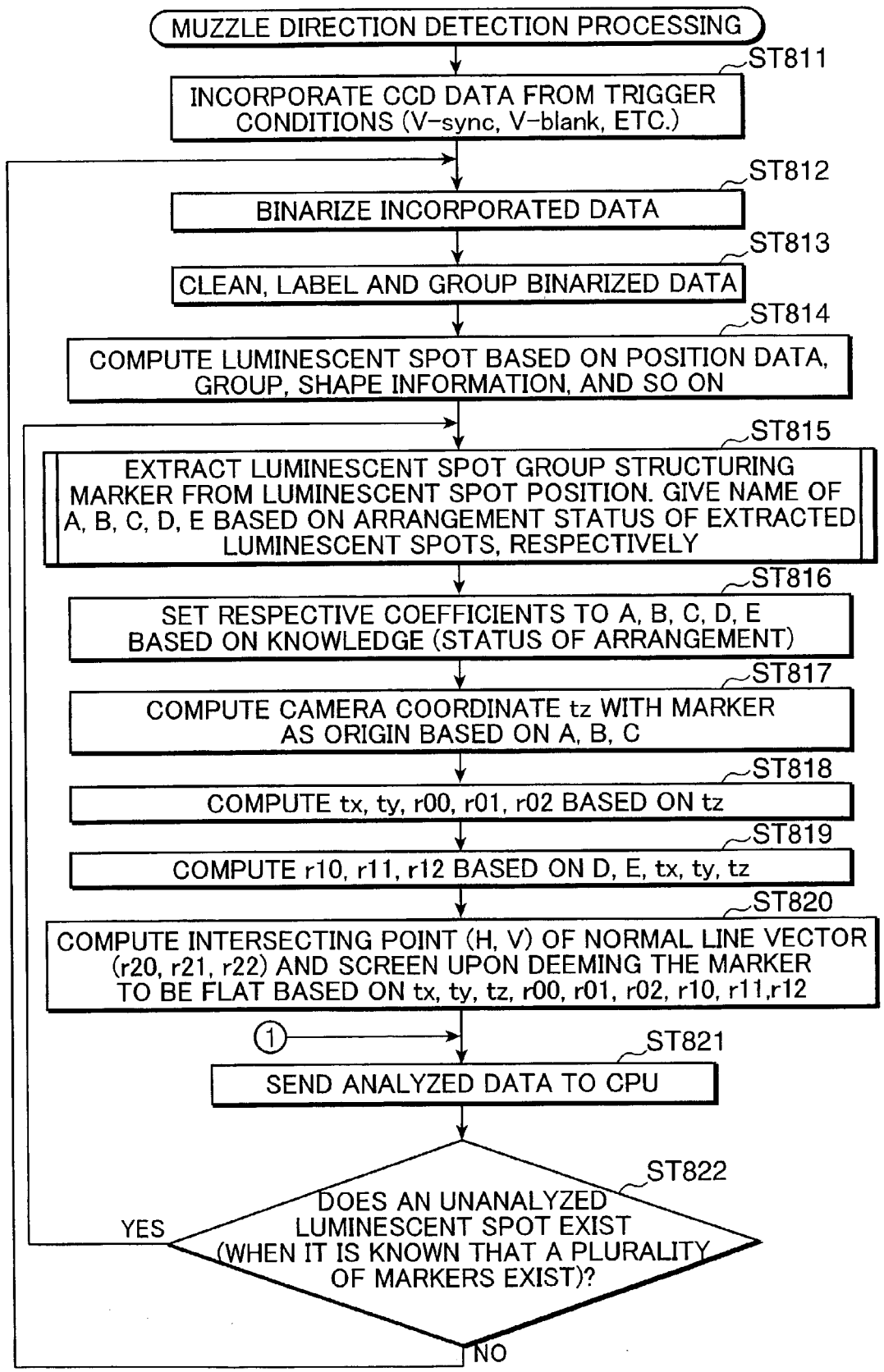
FIG. 19 is a flowchart showing the detailed procedure of the muzzle direction detection processing at ST81.
Figure 20:
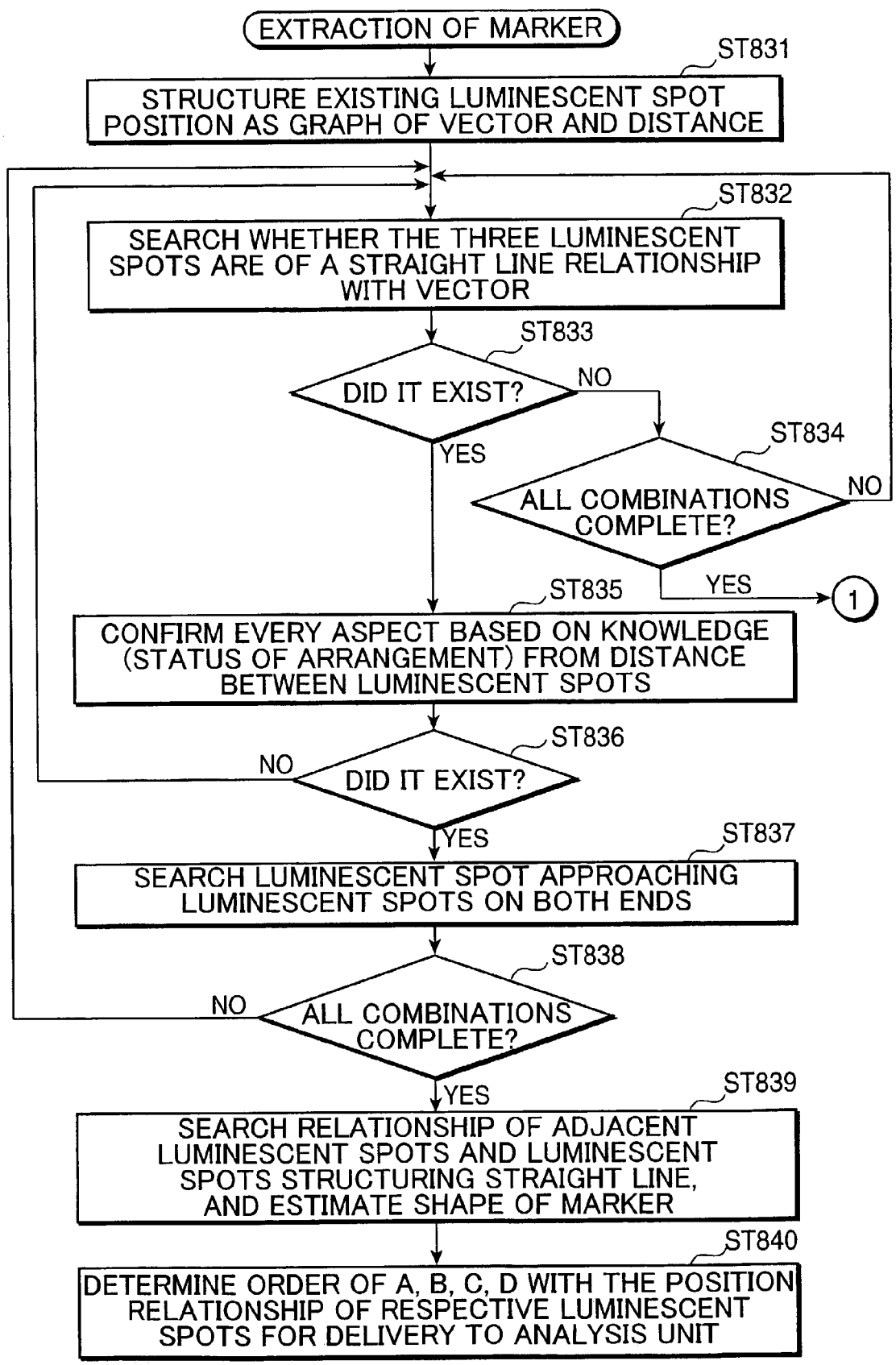
FIG. 20 is a diagram showing the detailed subroutine of ST815.

FIG. 18 is a block diagram showing the structure of the principal parts of the muzzle direction detection unit 401 for performing the muzzle direction detection processing at ST81 of FIG. 15; FIG. 19 is a flowchart showing the detailed procedure of the muzzle direction detection processing at ST81; and FIG. 20 is a diagram showing the detailed procedure of the extraction processing of the dotted light source at ST815.

As shown in FIG. 18, the muzzle direction detection unit 401 has an image processing unit 4011 for repeatedly incorporating in prescribed cycles the CCD image (data per pixel is stored in a prescribed area on the RAM 106) which is the picture image of the CCD camera 6; a binary processing unit 4012 for binarizing data per imaged pixel as a prescribed threshold and storing this in a prescribed area on the RAM 106 as luminescent spot data, or performing binary processing after temporarily storing the same; a coordinate data extraction unit 4013 for extracting coordinate data in which the binarized luminescent spot data exists and performing prescribed data arrangement; a straight line judgment unit 4014 for successively selecting the combination of the three spots from the extracted luminescent spot data and judging whether such three spots exist on the straight line and whether they are of equal intervals; a vicinity judgment unit 4015 for judging whether another luminescent spot exists in the vicinity of a luminescent spot on one end with respect to the three spots existing on the straight line (main axis); a dotted light source specification unit 4016 for associating the luminescent spot and the dotted light source with the judgment of both judgment units; a normal line computation unit 4017 for computing the direction of the muzzle 16 of the gun unit 10 (normal line direction of the substrate 130) from the position information of the associated luminescent spot and the dotted light source thereof; and an intersecting point (H, V) computation unit 4018 for computing the intersecting point (impact position) with the screen 121 of the computed normal line direction of the substrate 130. The CCD image includes luminescent spots other than the LED; that is, noise, caused by infrared rays contained in the natural light and infrared rays contained in the fluorescent lights and discharge lamps. Therefore, the straight line judgment unit 4014 and the vicinity judgment unit 4015 endeavor to eliminate the noise by performing judgment processing for all combinations.

Here, the normal line computation unit 4017 and intersecting point (H, V) computation unit 4018 will be explained in further detail. The positions of the LEDs 131 to 135 of the marker when the substrate 130 is flat is Pa (0, 0), Pb (1, 0), Pc (2, 0), Pd (0, 1), Pe (0, 2), and when these are defined upon expanding to the three-dimensional space, the positions will become 0a (0, 0, 0), 0b (1, 0, 0), 0c (2, 0, 0), 0d (0, 1, 0), 0e (0, 2, 0). Meanwhile, when these defined coordinates of the respective points are viewed from the CCD camera 6 (with the CCD camera 6 as the origin), the coordinates will be represented as a value enjoining three-dimensional matrix such as Ca (tx, ty, tz), Cb (tx+r00, ty+r01, tz+r02), Cc (tx+2×r00, ty+2×r01, tz+2×r02), Cd (tx+r10, ty+r11, tz+r12), Ce (tx+2×r10, ty+2×r11, tz+2×r12). Meanwhile, the dimension ratio ph, pv in the vertical and horizontal directions of the visual field of the CCD camera and the actual substrate 130 (may also be obtained from the imaging dimension of the substrate 130 with respect to the actual dimension) and the coordinates Ga (Ah, Av), Gb (Bh, Bv), Gc (Ch, Cv), Gd (Dh, Dv), Ge (Eh, Ev) of the respective points in the CCD image are all publicly known. Thus, variables tx, ty, tz, r00 to r12 can be computed from these publicly known data and the coordinates of the respective points viewed from the CDD camera 6, and the components (r20, r21, r22) of the normal line direction of the substrate 130 are thereby determined. Moreover, the reason why the value contained in the two items of coordinates Cc and Ce was made to be double value against r00, r01, r02, r10, r11, r12; that is, to be in proportion is because the substrate 130 is represented as a plane (as a simulation). In reality, when considering that the substrate 130 is of a curved surface, a three-dimensional matrix should be defined in consideration of the curvature of such curved surface with respect to the respective coordinates. By conducting the foregoing computation, although there may be cases where either the LED 131 or LED 133 is near or undefined in the CCD camera 6 depending the direction of the muzzle 16, it becomes possible to specify the direction by employing the dimension information of LED 131, LED 132, LED 133 and the dimension information of LED 131, LED 134, LED 135; that is, by employing the relationship of the dimension when the muzzle 16 is in the correct position and the ratio thereof.

The intersecting point (H, V) on the screen 121 of the normal line of the substrate 130 is sought with (tx+tz·(r20/r22), ty+tz·(r21/r22)) from the obtained position of the marker 13, normal line direction information (r20, r21, r22) of the substrate 130, and surface position information of the screen with the preset (predefined) CCD camera 6 as the origin. Further, during this computation, since the position of the marker 13 has been computed, this position information may be adopted as necessary, and, for instance, a desired dynamic detection of the controller 10 becomes possible with continuous computation, and it will no longer be necessary to adopt the conventional structure such as the triangular ranging method.

Moreover, as described above, although LED 131, LED 132, LED 133, LED 131, LED 134, LED 135 are not limited to being a fixed pitch, in this case also, they may be computed so as long as they have each pitch information. In addition, the game control unit 103 further has a trajectory computation unit for computing the trajectory of bullets flying within the game space from impact position on the screen 121 based on the information obtained with the intersecting point (H, V) computation unit 4018 and the information obtained with the normal line computation unit 4017 and the intersecting point (H, V) computation unit 4018.

In FIG. 19, image (CCD) data is foremost incorporated by activating the CCD camera 6 under trigger conditions such as vertical synchronization (V-sync, V-blank) at a prescribed cycle, 1/60 seconds for example (ST811), and then the incorporated data is binarized with the binary processing unit 4012 in order to extract luminescent spots (ST812). Here, coordinates of the binary data to be treated as luminescent spots are incorporated, an identification symbol is added thereto (labeling), and appropriate grouping processing is performed (ST813) in a mode where the coordinate data exist dispersedly. Then, the rough specification of the luminescent spots is conducted (ST814) based on the position data of luminescent spots, group information, and shape information (prepared as necessary). Next, each luminescent spot specified at ST 814 is named A to E (ST815).

Thereafter, the coefficient of the dimension ratio ph, pv is multiplied against the position data of luminescent spots A to E (ST816). Next, coordinates tz of the z component are computed with the marker 13 of the CCD camera 6 as the origin regarding the coordinate data of luminescent spots A, B, C (ST817), x component tx, y component ty, r00, r01, r02 are then computed from the camera coordinates tz (ST818), r10, r11, r12 are thereafter computed based on the coordinate data of luminescent spots D, E and tx, ty, tz (ST819), and the normal line vector (r20, r21, r22) of the substrate 130; that is, the intersecting point (H, V) of the gun unit 13 direction and the screen 121 is then computed as described above (ST820). When the computation is complete, the intersecting point (H, V) which is the computation result is forwarded to the CPU 103 side, and utilized in the collision judgment processing of the shooting against the enemy character (may also be considered for impact presentation) and the like. Moreover, in a case where a plurality of markers are lit up for a two player game, the intersecting point (H, V) of the other markers is similarly computed, and the suitable intersecting point data may be utilized.

FIG. 20 is a detailed subroutine of ST815, and the existing luminescent spot positions are foremost structured (formed) into a graph composed of the vector and distance (ST831). The luminescent spot position data within the graph is organized in accordance with the foregoing grouping or in a somewhat sorted state, thereby facilitating the data analysis. Next, the vector is utilized to research whether the three luminescent spots are of a straight line relationship be operating the inner product of the adjacent two points for example (ST832). When a straight line relationship does not exist (NO at ST833), it is judged whether processing for all combinations has been completed (ST834), and the routine returns to ST832 when in the middle, and skips to ST821 when it has been completed. Meanwhile, if a straight line relationship exists at ST833, knowledge from the distance between the luminescent spots (arranged status) is confirmed; that is, whether the three spots on the main axis are aligned in approximately equal intervals is confirmed (ST835). If a combination of a substantially equal interval does not exist, the routine returns to ST832, and if it exists, the routine researches the luminescent spot in the vicinity of both ends of the three spots (distance in which the LED 134 structuring the marker is deemed to exist) (ST837). Here, if a luminescent spot does not exist in the vicinity (NO at ST838), the routine returns to ST832, and if it exists, the routine researches the relationship of the luminescent spot in the vicinity and the luminescent structuring the main axis, and the shape of the marker is estimated thereby (ST839). The reason such luminescent spot is treated as D depending on the conditions of the existence in the vicinity is because the relationship of the intersection and equal distance with the LED.A will not be established depending on the direction of the camera. Next, A, B, C, D are encoded from the positional relationship of the respective luminescent spots in order to determine the arrangement thereof (ST840).

According to the muzzle 16 direction detection processing as described above, to which part of the screen 121 the muzzle 16 is ultimately facing, and the virtual trajectory position of the bullets fired toward the target object from the muzzle 16 within the game space from a position on the screen may be computed with the characteristics of the positional relationship of the image of the marker within the CCD image.

Figure 21:
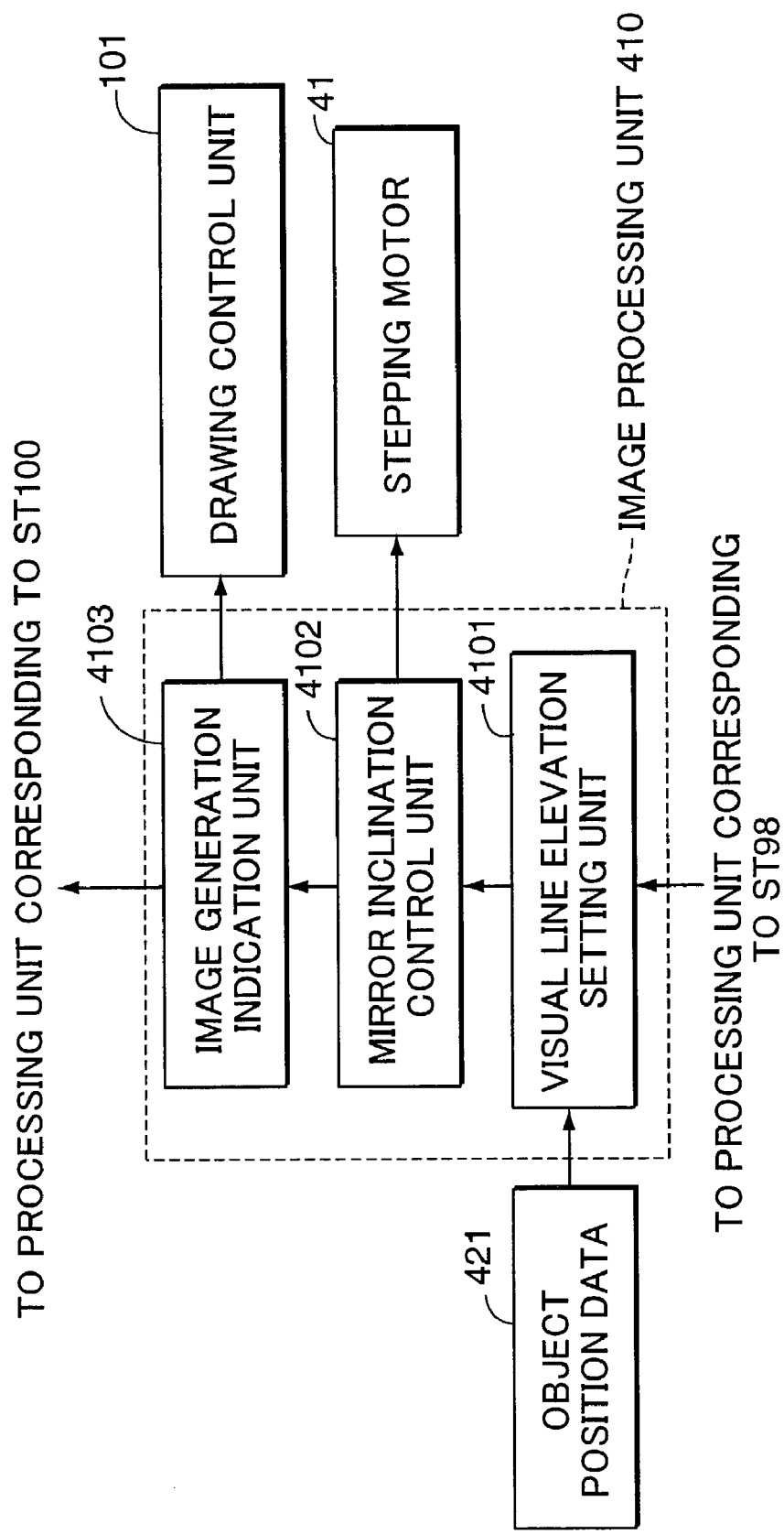
FIG. 21 is a block diagram showing the structure of the principal parts of the image processing unit for performing the image display processing at ST99.
Figure 22:
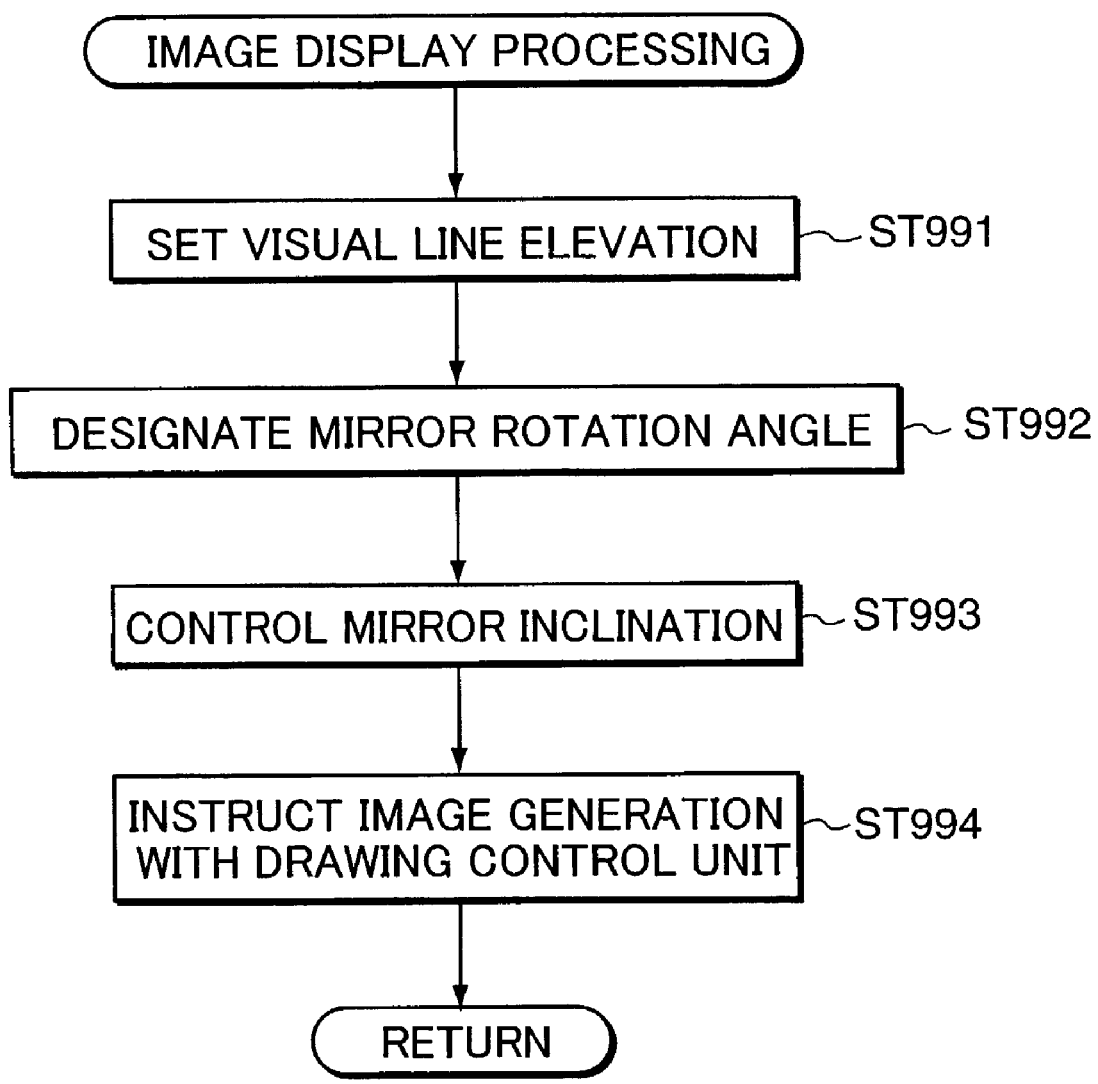
FIG. 22 is a flowchart showing the detailed procedure of the image display processing at ST99.

FIG. 21 is a block diagram showing the structure of the principal parts of the image processing unit for performing the image display processing at ST99 of FIG. 15, and FIG. 22 is a flowchart showing the detailed procedure of the image display processing at ST99.

The image processing unit 410 for displaying images while performing such correction, as shown in FIG. 21, has a visual line elevation setting unit 4101 for setting the visual line elevation (angle inclining the visual line upward against the level surface) in accordance with the object position data 421 (data representing the position of the shooting target object within the game space); a mirror inclination control unit 4102 for designating the rotation angle of the mirror in accordance with the visual line elevation and controlling the stepping motor 41; and an image generation indication unit 4103 for designating the generation of images to the drawing control unit 101.

With the image display processing, as shown in FIG. 22, the visual line elevation is set with the visual line elevation setting unit 4101 (in accordance with the dinosaur position or the parts of the dinosaur which generate attacks during the approach) (ST991), the mirror rotation angle according to this visual line elevation is designated with the mirror inclination control unit 4102 (ST992), and the mirror 43 rotates as a result of the stepping motor 41 being controlled (ST993). Next, drawing of the image captured from the prescribed virtual viewpoint is indicated with the drawing control unit 101 against the set visual line elevation with the image generation indication unit 4104 (ST994), and this processing is returned to the beginning. In accordance with the indication of drawing, with the drawing control unit 101, image data is generated upon operating data relating to polygons within the (three-dimensional) game space, this image data is written in the frame buffer 102, and images are projected on the screen 121 in accordance with the image data on the frame buffer 102.

Figure 23:
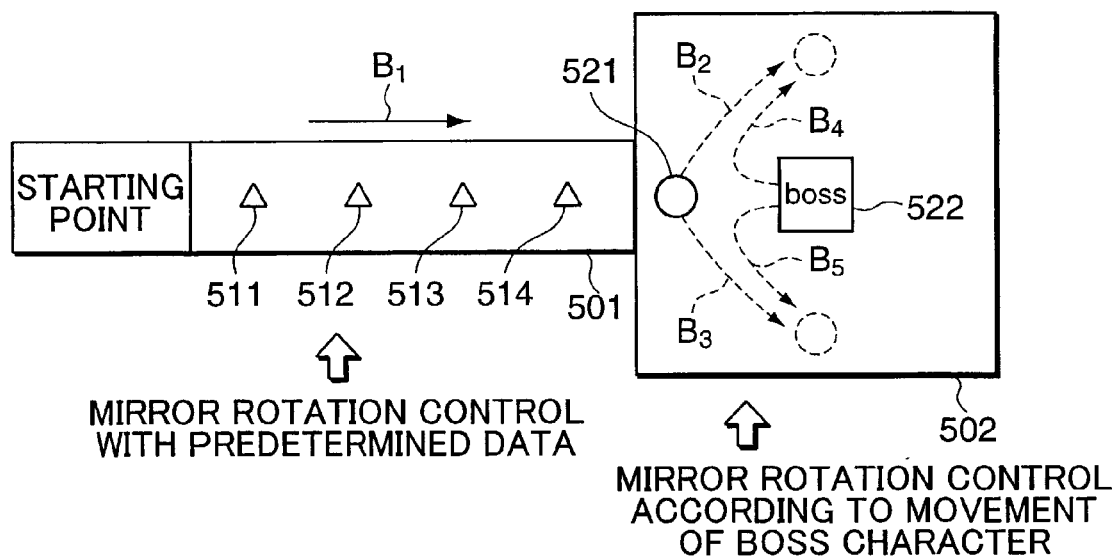
FIG. 23 is a diagram for explaining the rotation control of the mirrors corresponding respectively to the two areas in which one stage is divided with the first modified example of the shooting video game machine.

FIG. 23 is a diagram for explaining the rotation control of the mirrors corresponding respectively to the two areas in which one stage is divided with the first modified example of the shooting video game machine.

With the game machine in the present modified example, an area 501 corresponding to the first half of the first stage and an area 502 corresponding to the second half are assumed, and the player shoots small dinosaurs and flying dinosaurs (ordinary enemy characters) in the first half area 501 and shoots the foregoing enormous dinosaurs (enemy character corresponding to the boss character) in the second half area 502. In the area 501 within the game space, the virtual player (virtual viewpoint) will move in the direction of arrow $B_1$ at a speed designated in advance. An enemy character appears when the virtual player passes through prescribed positions 511 to 514, and the player virtually shoots at the display of such enemy character with the gun unit 10. When the player detection sensors 51 to 54 respond, the player is made to move a relatively small distance to the left or right within the game space just enough to avoid the attack from the enemy character, and the mirror for determining the position of the projected image on the screen is rotated based on the data designated in advance.

In the area 502 within the game space, the player avoids the attack of the boss character 522 approaching the virtual player 521 within the game space by making the player detection sensors 51 to 54 respond and moving in the arrow $B_2$ or arrow $B_3$ direction, and the player shoots at the display of the boss character by operating the gun unit. The boss character 522 will move in the arrow $B_4$ or arrow $B_5$ direction so as to follow the moving virtual player 521.

Here, the player is made to move a relatively large distance upon the response of the player detection sensors 51 to 54 (movement so as to move around the left or right side of the dinosaur, and the a different distance range such as 5 meters, 20 meters, etc. is set in accordance with the stage), and the mirror is rotated in accordance with the distance between the boss character and the virtual viewpoint as described above, or in accordance with the portion in the boss character is to make the attack.

With the game machine of the present modified example, since the distance of movement upon the player detection sensors 51 to 54 responding and the method of mirror rotation control is differed, the player is able to enjoy a shooting game abundant in changes and unwearying.

Figure 24:
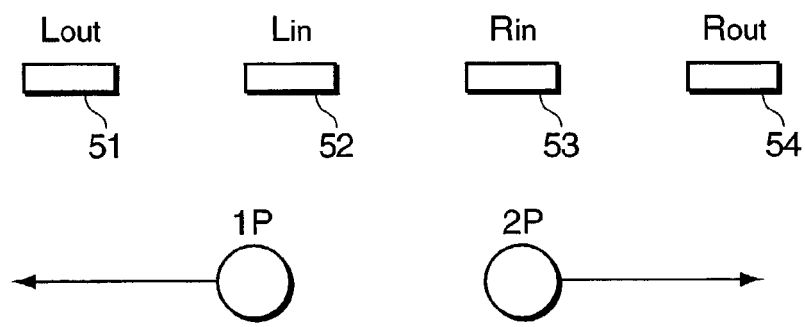
FIG. 24 is a diagram for explaining the detection of the player's position with the player detection sensor with the second modified example of the shooting video game machine.

FIG. 24 is a diagram for explaining the detection of the position of player 300 (during the two player game with 1P player and 2P player) with the player detection sensors 51 to 54 with the second modified example of the shooting video game machine.

With the game machine of the present modified example, during a two player game, the two virtual players within the game space share the same fate, and move in the same direction. When it is detected that 1P player (left side player) moved from the reference position in front of the player detection sensor 52 on the inner left side to the front of the player detection sensor 52 on the outer left side, this is deemed as the player moving around to the left side of the dinosaur, and the coordinates of the two virtual players are set within the game space. Moreover, when it is detected that 2P player (right side player) moved from the reference position in front of the player detection sensor 53 on the inner right side to the front of the player detection sensor 54 on the outer right side, this is deemed as the player moving around to the right side of the dinosaur, and the coordinates of the two virtual players are set within the game space.

With the shooting video game machine of the present modified example, since the coordinates of the virtual players are set in accordance with the movement of the two players, unique amusement in the game progress may be yielded upon the mutual cooperation of the players.

Here, the video game device, which is a modified mode of the foregoing shooting video game machine, is explained.

Figure 25:
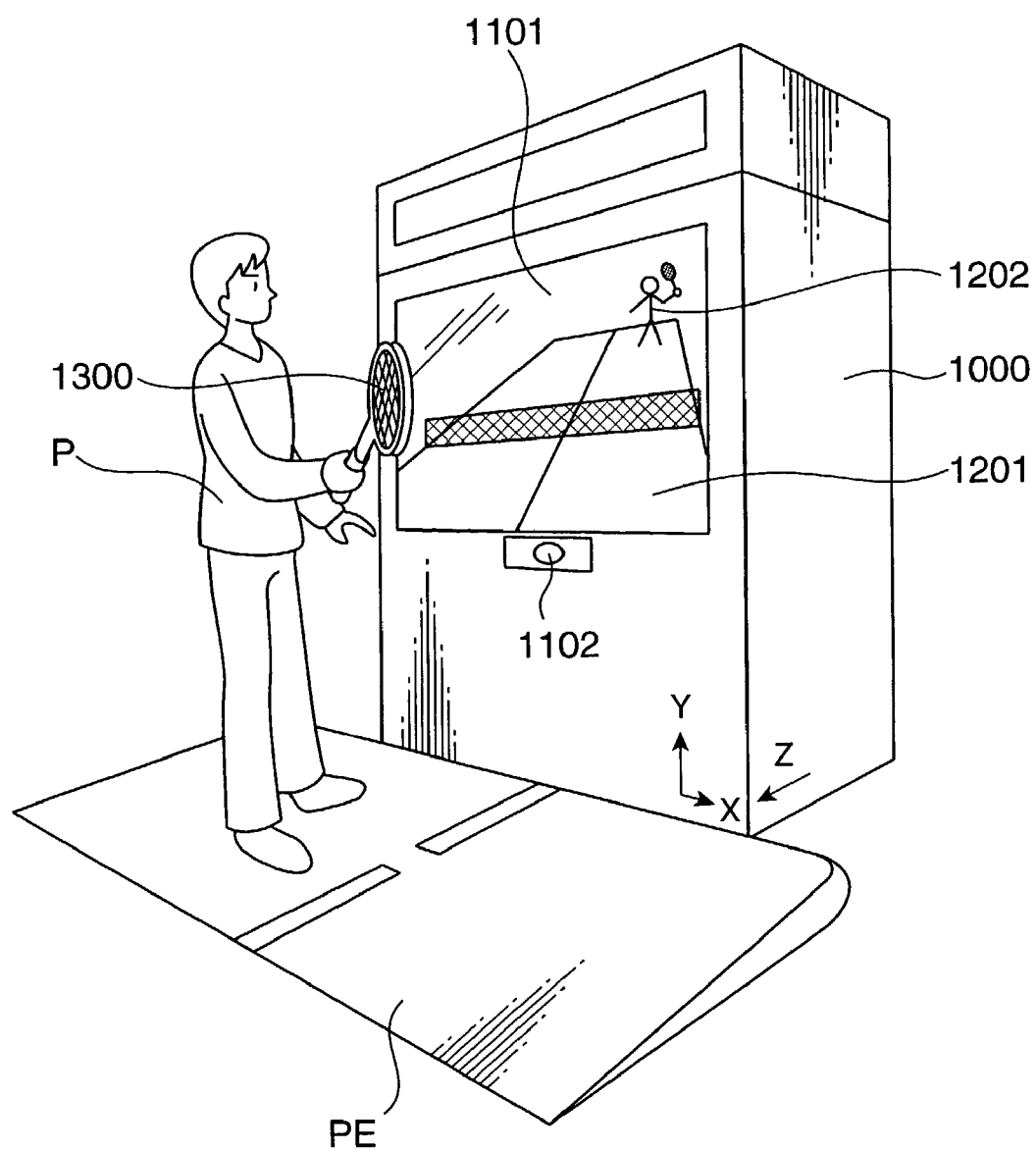
FIG. 25 is the overall perspective view for explaining the video game device, which is a modified mode of the shooting video game machine pertaining to the first embodiment.

FIG. 25 is an overall perspective view of the video game device. As shown in FIG. 25, the video game device comprises a console type game housing 1000 having a rectangular parallelepiped shape for example, a display unit 1101 is disposed at the front upper part thereof, a CCD camera 1102 is provided to the front lower part thereof, and, although not shown, a speaker 1103 (c.f. FIG. 27) for yielding sound effects is provided to a suitable position in the housing, and a start button 1001 (c.f. FIG. 27) for indicating game start is provided to the approximately center right or left, for example. The display unit 1101 is formed of a CRT, LCD or the like, and an image of a sports stadium including a tennis court 1201 for example is displayed thereon, and an opponent character 1202 is displayed on the opponent's court side. The player P to play the game upon standing in the play area PE prepared in front of the game housing 1000 will play the competition game upon holding the controller 1300 simulating a tennis racket. The CCD camera 1102 corresponds to the CCD camera 6 in the previous embodiments, and is set to at least include the visual field of the controller 1300 to be swung by the player positioned in the play area PE. The setup position of the CCD camera 1102 is not limited to the position shown in FIG. 26, and may be immediately above the display unit 1102, or the left or right side; in other words, it will suffice so as long as the position is able to observe the changes in the direction of the face of the simulated net of the simulated tennis racket to be swung by the player. In some cases, the mounting position may be separate from the game housing 1000, and, in such a case, it should be considered that the CCD camera 1102 is established on the game housing side from the relationship of signal processing. The purpose of this game is to repeat the motion of returning the tennis ball hit from the opponent back to the opponent's court via a game medium of a tennis ball (not shown in FIG. 26) with the opponent character (competition with the computer for example) within the game screen, and the game is played in accordance with the rules of a tennis game.

Figure 26:
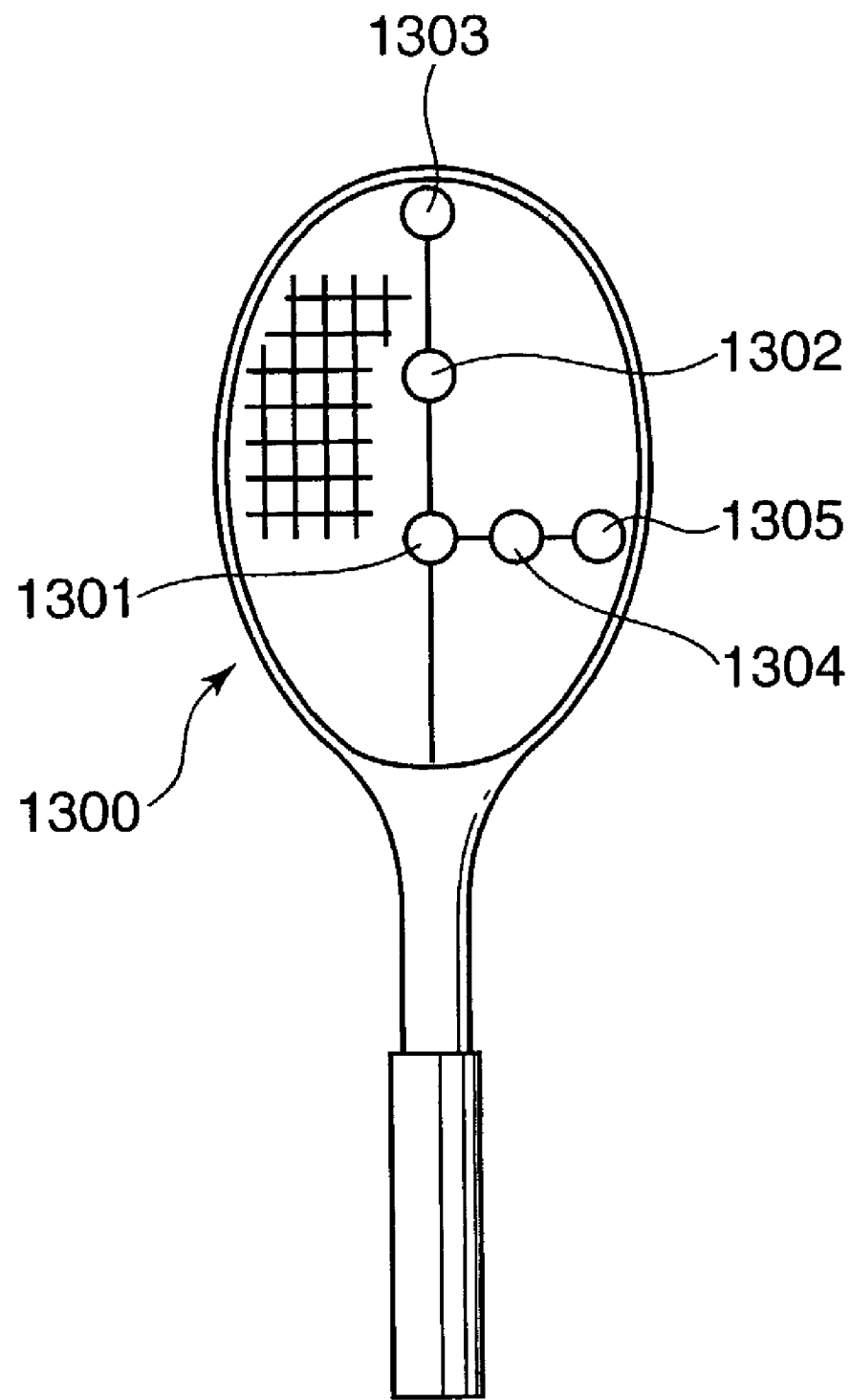
FIG. 26 is a front view of the controller simulating a tennis racket.
Figure 27:
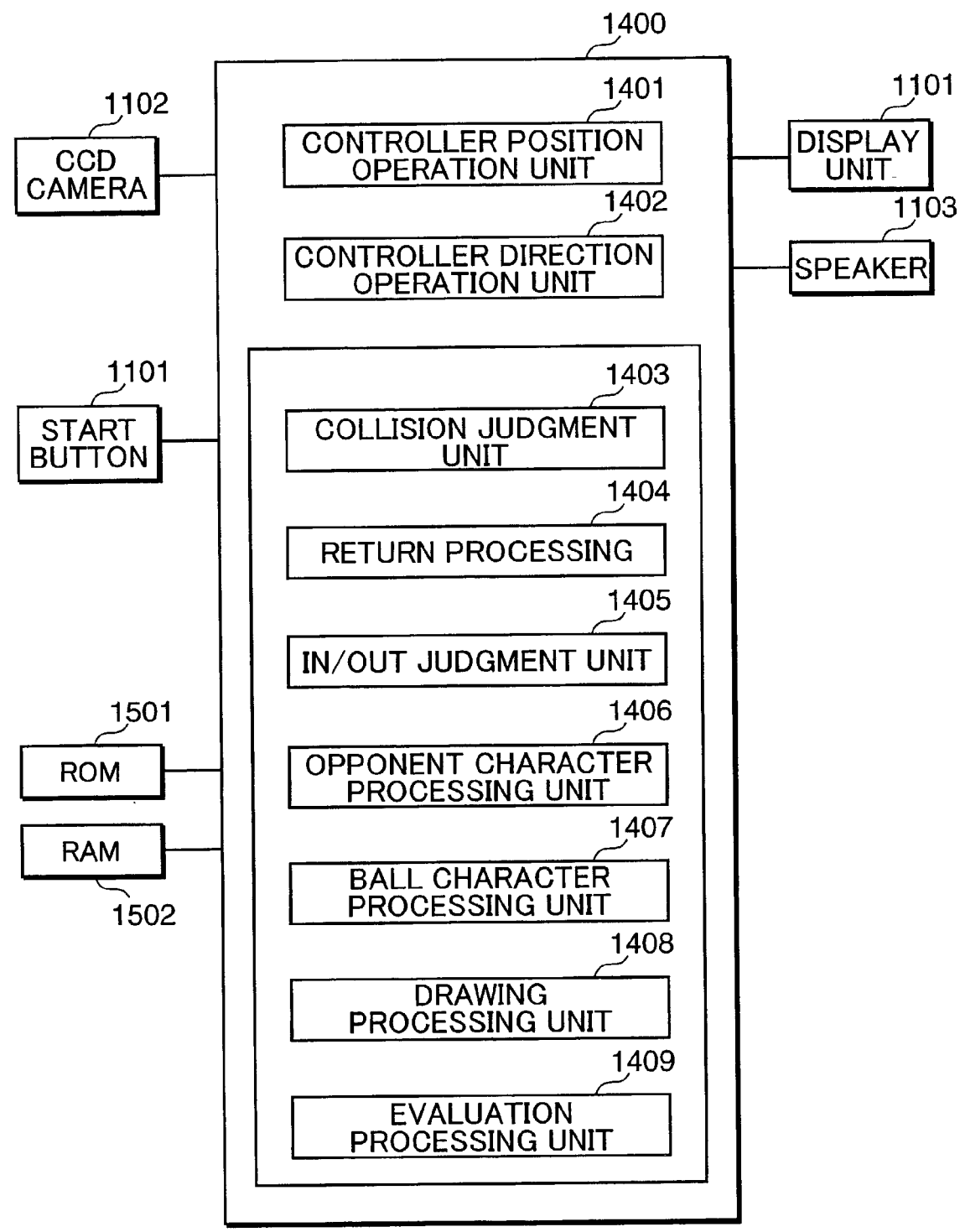
FIG. 27 is a block diagram of the video game device.

FIG. 26 shows the front view of the controller 1300 simulating a tennis racket, and dotted light sources 1301 to 1305 such as LEDs structuring the light source unit are mounted to the face of the net portion (marker mounting section). The power source of LEDs may be supplied with a cable, or batteries may be built therein (inside the grip for instance). The dotted light sources 1301 to 1303 are disposed in equal intervals in the longitudinal direction, and the dotted light sources 1304 and 1305 are disposed in equal intervals in the width direction together with the dotted light source 1301 to be shared. Imaging of the controller 1300 with the CCD camera 1102, the intersecting angle (direction) formed with the screen of the display unit 1101 of the net face of the controller 1300, and the height and left/right positions with respect to the screen of the display unit 1101 are obtained by executing operational processing similar to the operation method in the previous embodiments. The CCD camera 1102 performs imaging operations at a prescribed cycle, ⅟₆₀ seconds for example, and the operational processing for seeking the intersecting angle as well as the height and left/right positions is repeated.

FIG. 27 is a block diagram of the video game device. The present device comprises a CPU 1400 as the control unit, a ROM 1501 storing game program data, image data required in the game (each image data may be structured with objects as virtual three-dimensional objects structured from polygons), sound data and other fixed data (e.g., three-dimensional position information and the like of the display unit 1101 with the CCD camera 1102 as the origin), and a RAM 1502 for temporarily storing data under processing.

The CPU 1400 is for controlling the desired game progress by collectively or suitably reading necessary game program data or other data from the ROM 1501, and comprises a controller position operation unit 1401 for computing the position of the controller; a controller direction operation unit 1402 for computing the direction of the controller; a collision judgment unit 1403 for judging the virtual collision of the ball character as the game medium and the controller 1300; a return processing unit 1404 for computing the return direction and speed when the ball character is returned with the controller 1300; an in/out judgment unit 1405 for judging whether the returned ball character is in the in area or out area of the opponent's court; an opponent character processing unit 1406 for performing the movement processing of the opponent character; a ball character processing unit 1407 for performing the positional computation of the ball character; a drawing processing unit 1408 for performing drawing processing to the display unit 1101 of the tennis court 1201, opponent character 1202 and ball character; and an evaluation processing unit 1409 for managing the game score and victory/defeat.

The controller position operation unit 1401 is for computing the direction and position with respect to the screen of the display unit 1101 by executing an operational processing similar to the operation method in the previous embodiments from the position information of the dotted light sources 1301 to 1305 of the controller images with the CCD camera 1102. The controller direction operation unit 1402 is for computing the direction of the flat face of the net portion of the controller 1300 with respect to the screen of the display unit 1101 by performing processing similar to the previous embodiments.

The collision judgment unit 1403 is for judging whether the ball character virtually hit the controller 1300 from the flight direction (virtual flight from the screen) of the ball character described later, and the position and direction information of the controller 1300 at the point when the ball character within the game image flies from within the virtual three-dimensional space and computationally coincides with the position on the screen of the display unit 1101.

The return processing unit 1404 is for computing the flight path of the ball character returned by the player from the swing speed sought with the position and direction of the controller 1300 and two times worth of consecutive computed positional information of the controller 1300 computed successively when it is deemed by the collision judgment unit 1403 that the ball character virtually hit the net of the controller. The in/out judgment unit 1405 is for judging whether the ball character in which the flight path thereof is computed with the return processing unit 1404 landed on the inside or outside of the opponent's court.

The opponent character processing unit 1406 is for making the behavior of the opponent character existing within the game space and controlled with the CPU 1400 to follow the motion procedures by incorporating the ordinary motion in a tennis match into the game program, and produces the movement in the front/back/left/right directions within the opponent's court, serve motion, return motion and so on. The ball character processing unit 1407 is for performing the movement processing of the ball character moving to the screen side from the ball hitting motion of the opponent character, and to perform the movement control of the ball character virtually hit by the player, preferably in consideration of adding gravity, drive, cut, and other ball rotations.

The drawing processing unit 1408 is for displaying information annunciating the game progress such as the tennis court 1201, opponent character 1202, ball character, scores, acquired sets and so on upon employing the image data read from the ROM 1501 on the screen of the display unit 1101 in accordance with the game program and behavior of the controller 1300. The evaluation processing unit 1409 is for executing the processing for determining the score and victory/defeat in accordance with the rules of a tennis match.

When simply explaining the operational procedure of this tennis game, after the game is started upon the start button 1001 being pushed, the game begins with the score at 0-0, and the serve motion by the opponent character 1202 is displayed. The flight patch of the ball character is computed based on the position of this serve motion within the virtual three-dimensional space and the direction and speed of the smash motion, and the movement of the ball character along such direction is displayed. The controller position operation unit 1401 and the controller direction operation unit 1402 compute the position and direction of the controller 1300 in prescribed cycles after the game is started, and judges whether the controller 1300 hit the ball character from the position, direction and swing speed of the controller 1300 at the time the ball character arrives at the screen. If it is a miss, air shot processing (minus evaluation processing) is executed, and if it is a hit, the return direction and speed of the ball character is computed upon executing dynamic computation. The flight path of the ball character within the virtual three-dimensional space is sought based on the computation described above, and the ball character is displayed on the screen. Whether the returned ball character landed within the opponent's court is judged, and minus evaluation is made if outside the court, and, if inside the court, judgment is made on whether the opponent character is able to return the ball character from the landing position of the ball character (equivalent to the distance between the landing point and the position of the opponent player) and the speed (also upon reflecting the drive, cut or other ball rotations). If it is returnable as a result of such judgment, the opponent character is made to operate for returning the ball character, and the flight computation of such ball character is further conducted. By repeating the foregoing operation, the score is renewed when either player misses the ball character. When either player wins 6 set game a prescribed number of times in accordance with tennis rules, the victory/defeat is determined, and the game is over.

Further, since both faces of the racket may be used for hitting a ball in tennis and the like, it is preferable that the dotted light sources 1301 to 1305 are mounted so as to be exposed on both sides of the net portion, such that the illuminated light is emitted to both faces. Here, since three dotted light sources 1301 to 1303 and 1301, 1304, 1305 are provided respectively in each axis, the front/back judgment will become undefined in cases where the racket is turned in the normal line direction of the racket face.

Therefore, as the structure of the controller 1300, as shown in FIG. 26, although one prescribed color may be used (when using only one face), the net portion may be formed with plates having colors different from the dotted light sources on the front and back. Or, the illuminated color of the dotted light sources 1301, 1302, 1303 may be made the same (blue for example), and at least one among the dotted light sources 1304 or 1305 may be made a color (green for example) differing from the foregoing color. According to this structure, distinction of the front and back will be realized in addition to facilitating the specification processing of the dotted light sources within the picture image and the judgment of the axis side, and the processing speed will improve thereby. With the front and back distinction in this case, a green light source will rotate 90° from the blue color and imaged on the front face in the clockwise direction of the dotted light source 1301 for example, and this will be the reverse color relationship on the back face. Here, at least one on the specific same axis side other than the dotted light source 1301 may also be flash controlled. Or, the size and shape of the dotted light source may be made to differ from the others. As described above, the dotted light source for judging the front and back may be made to have a different light-emitting form than the other dotted light sources. Moreover, since the dotted light source for judging the front and back is shared with one of the dotted light sources 1301 to 1305, the number of dotted light sources may be reduced in comparison to cases of separately providing such dotted light source.

Figure 28:
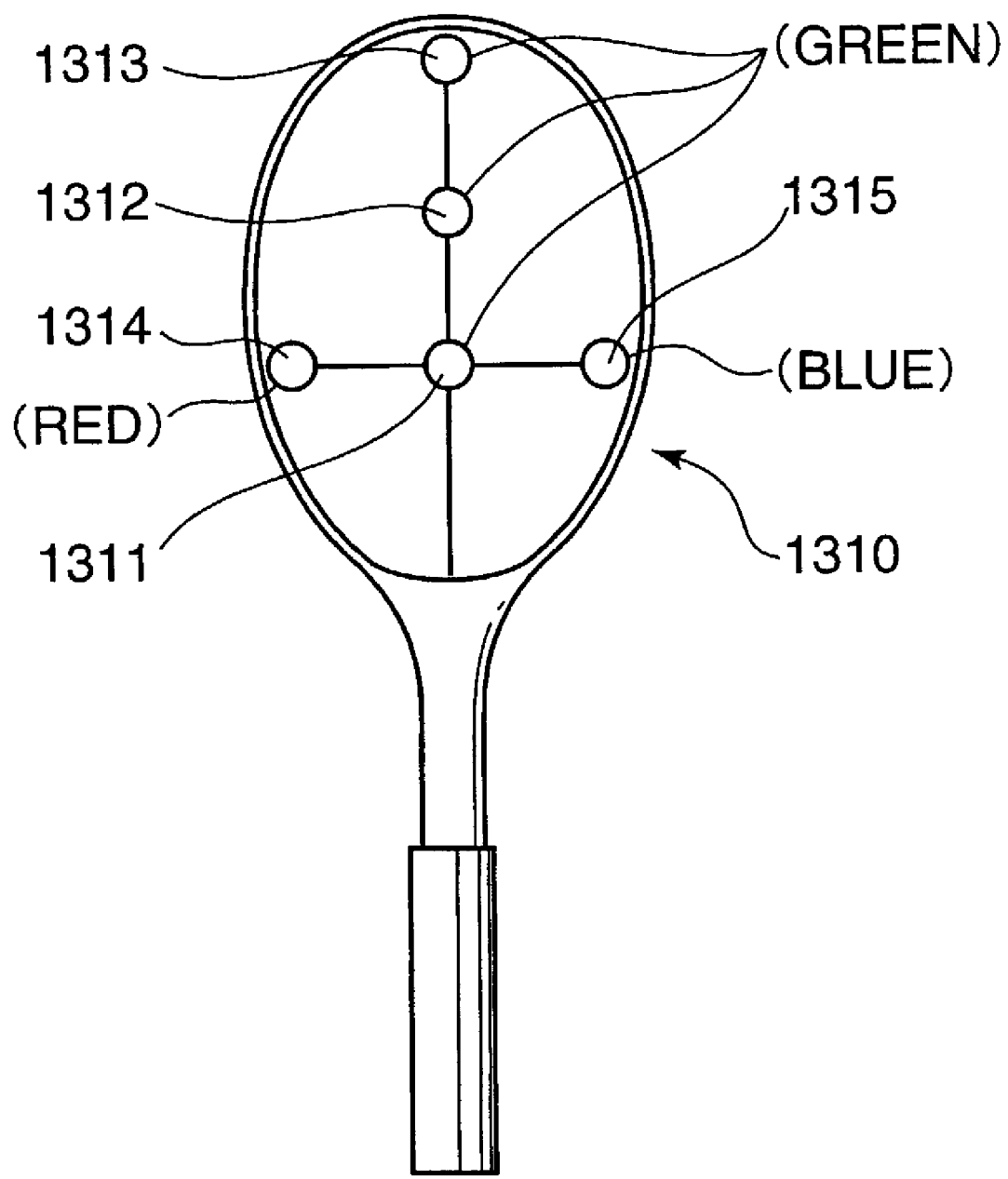
FIG. 28 is a structural diagram of the controller in which the shape of the marker is of a reverse T shape.

Further, as shown in FIG. 28, a reverse T shape may be employed as the shape of the biaxial direction marker. Here, the illuminant color of the dotted light sources 1311 to 1313 is made the same color (green for example) in order to distinguish the front and back, and the illuminant color of the dotted light source 1314 is made to be a different color (red for example), and/or the illuminant color of the dotted light source 1315 is made to be a different color (blue for example). Thus, the color of at least the dotted light source 1314 or the dotted light source 1315 needs to be a different color (green in this example). Since the controller 1310 is simulating a racket, the front and back thereof is switched by the racket being swung around the axis parallel to the axis of the dotted light sources 1311 to 1313, and it will suffice to change the color of the dotted light source on the side sandwiching the rotational axis.

Figure 29C:
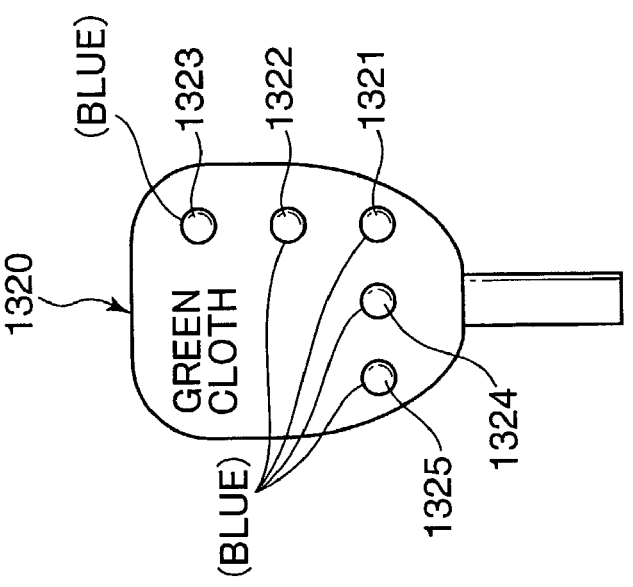
FIGS. 29A, 29B and 29C are structural diagrams of the controller in a case where the video game device is to be used for a table tennis game.
Figure 29B:
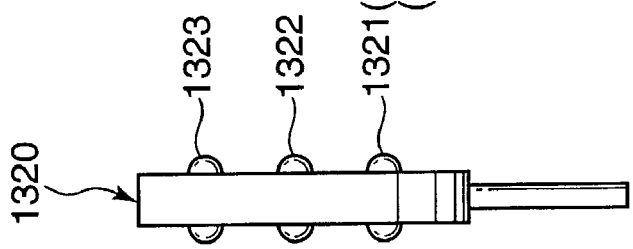
Figure 29A:
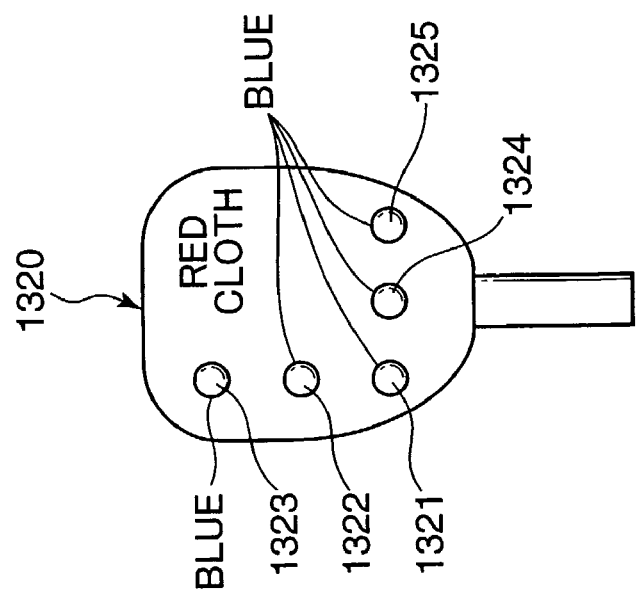

Similarly, FIGS. 29A, 29B and 29C are diagrams show a simulated table tennis racket used as the controller 1320 when the video game device it used for playing a table tennis game. Since both sides of the table tennis racket may be used to hit the ball, it is desirable that dotted light sources capable of recognizing the front and back be disposed. In other words, as shown in FIG. 29A, FIG. 29B and FIG. 29C, three dotted light sources 1321 to 1323 are disposed on the ball-hitting face of the racket on one side with respect to the grip axis and parallel to the axis, dotted light sources 1324 and 1325 are provided to the opposite side of the axis upon sharing the dotted light source 1321, and light may therefore be emitted from either face upon exposing both the front and back sides. Moreover, by differing the illuminant color of the dotted light source 1324 or 1325 from the other dotted light sources, the recognition processing of the front and back may be simplified, and the rotational angle with respect to the rotational axis of the grip from the luminescent spot images corresponding to the dotted light sources 1321 and 1324 within the picture image; that is, the direction with respect to the screen of the display unit may be operated. In addition, the front and back judgment will also become possible with the imaging means recognizing a different color if the color of the ball-hitting face of the racket (ground color) is made to differ for the front and back.

Second Embodiment

The shooting video game machine pertaining to the second embodiment of the present invention is explained below.

With the shooting video game machine pertaining to the second embodiment, the setup positions of the CCD camera 6 and the marker 13 are switched in the shooting video game machine pertaining to the first embodiment. In other words, the marker 13 is disposed on the shooting video game machine main body side (screen 121), and the CCD camera 6 is disposed on the gun unit 10. Thus, the description of FIGS. 1 to 5 in the first embodiment corresponds to the second embodiment. This shooting video game machine is now explained below.

Figure 30:
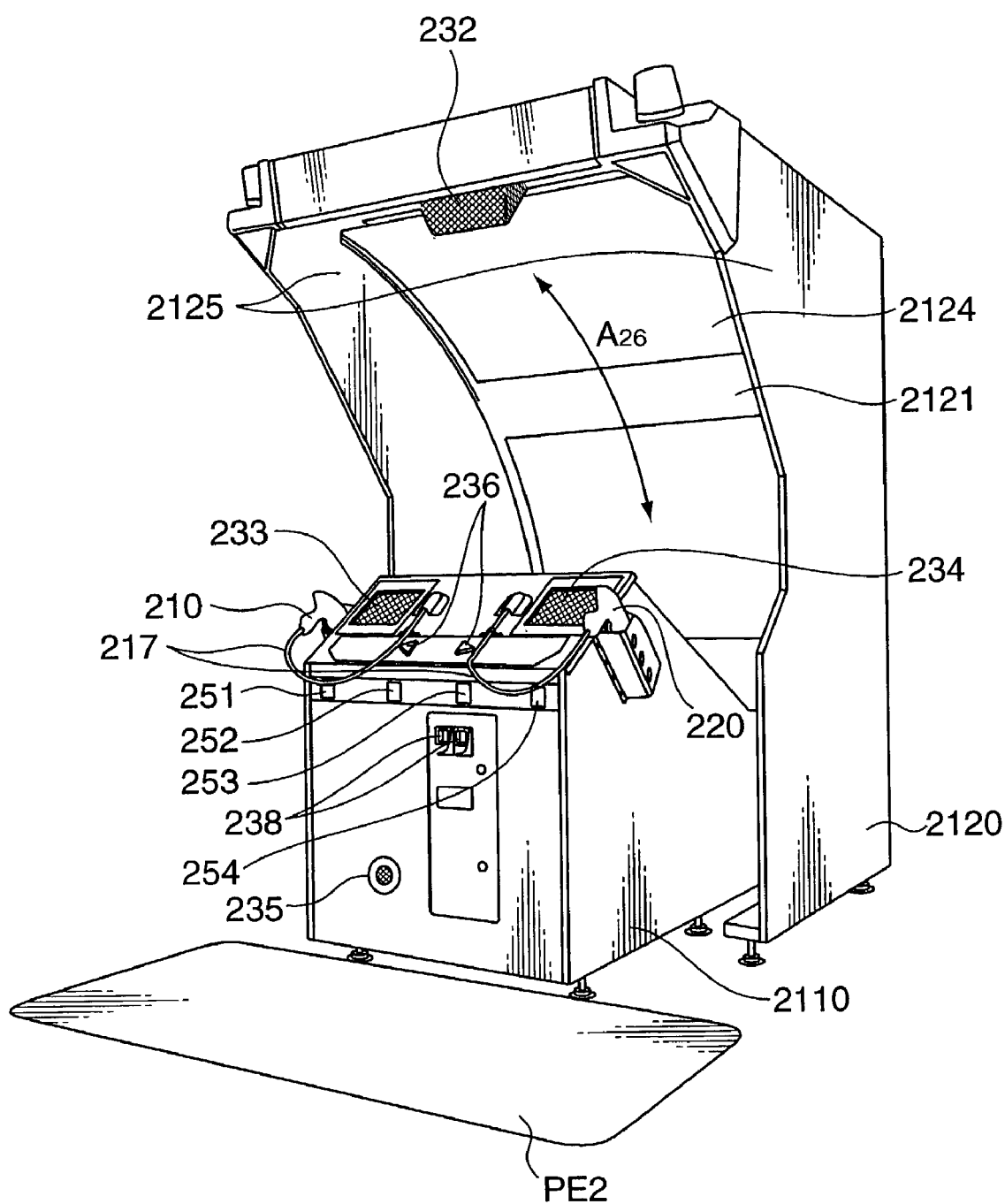
FIG. 30 is a diagram showing the appearance of the shooting video game machine pertaining to the second embodiment.
Figure 31:
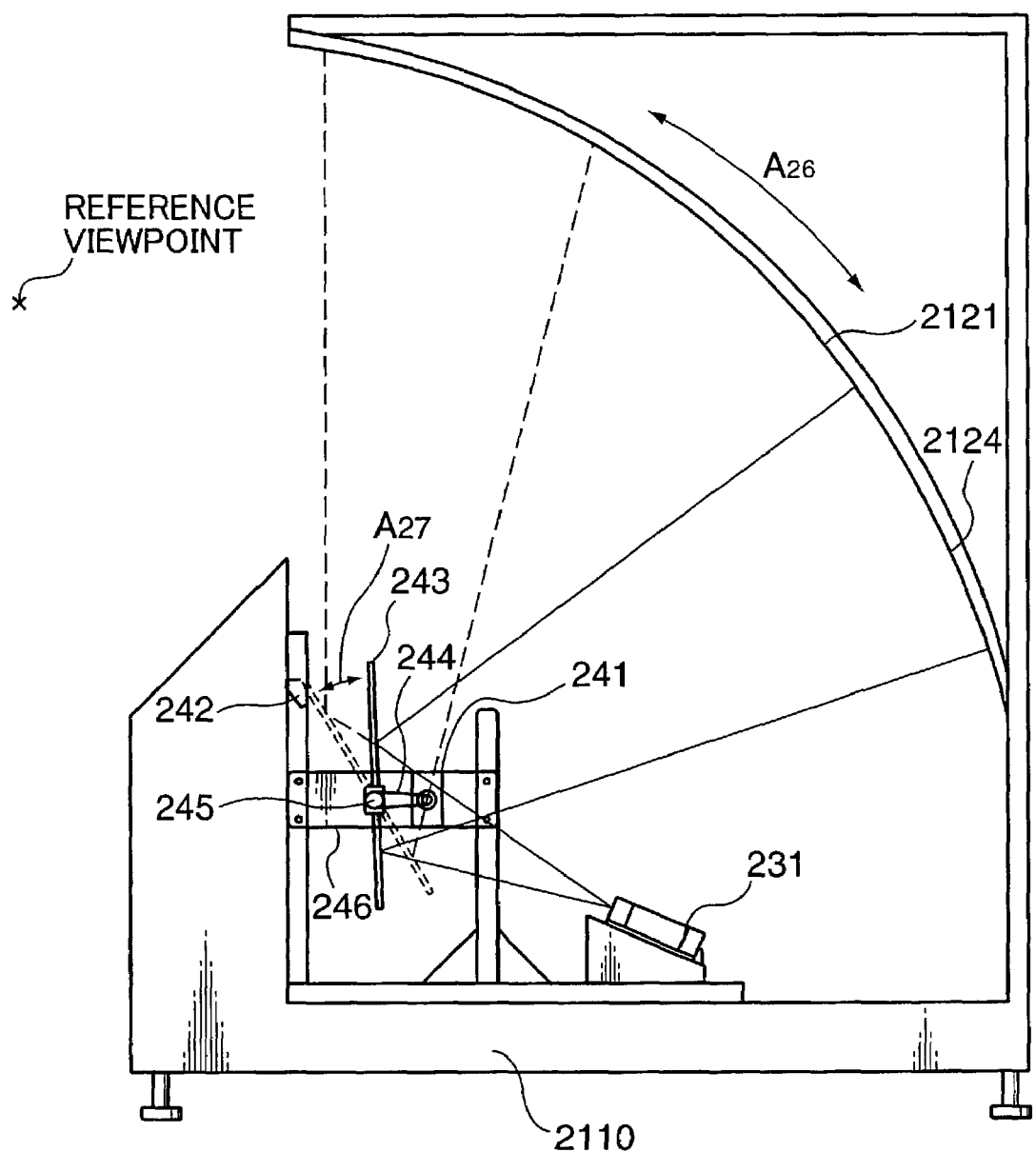
FIG. 31 is a typical cross section for explaining the shifting of the projected image on the screen.

FIG. 30 and FIG. 31 are diagrams relating to the structure for projecting images, FIG. 32 and FIG. 33 are diagrams relating to the structure for detecting the direction of the muzzle 216, and FIG. 34 is a diagram showing the mode of markers 26 to 29 and the structural diagram for mounting such markers to the screen.

The structure for projecting images is not explained. FIG. 30 is a diagram showing, the appearance of the present game machine, and FIG. 31 is a typical cross section for explaining the shifting of the projected image on the screen 2121.

With the present game machine, as shown in FIG. 30, the projected image 2124 projected from the projector 231 (FIG. 31) on the screen 2121 retained with the screen retention table 2120 shifts in the arrow $A_{26}$ direction, and the gun unit 210 and gun unit 220 are connected to the main body control unit 2100 (explained later at FIG. 35) via the gun cable 217. The projected image 2124 contains a shooting target such as a dinosaur as described above, and the 1P player standing on the play area PE operates the gun unit 210 (or the 2P player operates the gun unit 220) to virtually shoot the shooting target, and points are scored in accordance with the skill of shooting such as the shooting position and shooting timing.

The four player detection sensors 251 to 254 mounted on the front face of the base 2110 are for detecting the movement of the 1P player when it is a one player game (or 1P player and 2P player when it is a two player game) in the left and right directions, and side plates 2125 are provided for preventing the disturbance and the like upon detecting the muzzle direction (described later) with respect to the screen 2121 and displaying images on the screen 2121.

Further, with the present game machine, music and the like is played in order to yield vigor, and a speaker (top) 232, speaker (left) 233 and speaker (right) 234 for outputting sounds in the middle and high ranges, and a woofer speaker 235 for outputting sounds in the low ranges are provided in order to output such sounds during the game. The speaker (top) 232 and speaker (left) 233 form one pair and the speaker (top) 232 and speaker (right) 234 form one pair in order to playback in stereo sound.

A coin of a prescribed amount is inserted into the coin insertion slot 238, the start button 236 is suitably pressed in accordance with the display on the screen 2121, and a one player game with only the 1P player or a two player game with both the 1P player and 2P player is selectively started.

The rectangular flat mirror 243, as shown in FIG. 31, has a mirror axis 245 extending in the perpendicular direction in the diagram, and both ends of the mirror axis 245 are rotatably retained with the mirror retention member 246. The rotation of the stepping motor 241 connected to the control unit described later is transmitted to the mirror with the timing belt 244, and the projected image 2124 shifts in the arrow $A_{26}$ direction on the screen by the mirror 243 being rotated in the direction of arrow $A_{27}$.

The reference viewpoint set at a prescribed height and position at the front of the present game machine is associated with the virtual viewpoint within the game space, and it is envisioned that a player (of an average height) is able to view the screen 2121 from this reference viewpoint position.

Next, explained is the structure for detecting the direction of the muzzle 216. FIG. 32 is a diagram showing the structure of the gun unit 210 (similar with the gun unit 220) as an example of the controller for accepting input operations from the player, and FIG. 33 is a diagram showing an example of the arrangement of the markers 26 to 29 for detecting the direction of the muzzle 216 with respect to the screen 2121 together with the CCD camera 213 in the gun unit 210.

Figure 33A:
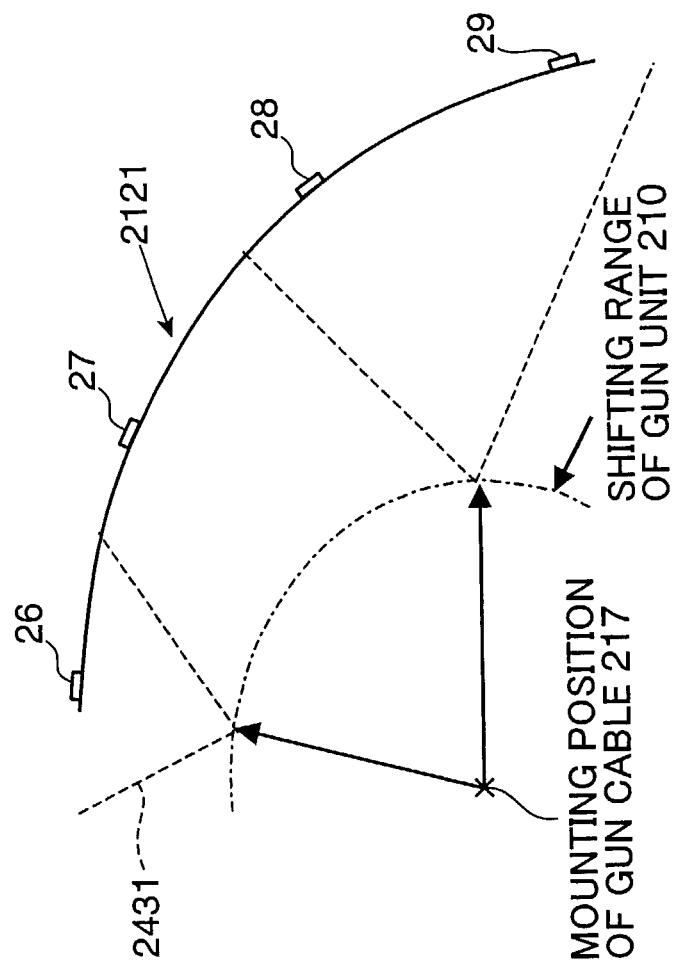
FIGS. 33A and 33B are diagrams showing the marker arrangement for detecting the muzzle direction with respect to the screen together with the CCD camera in the gun unit.
Figure 33B:
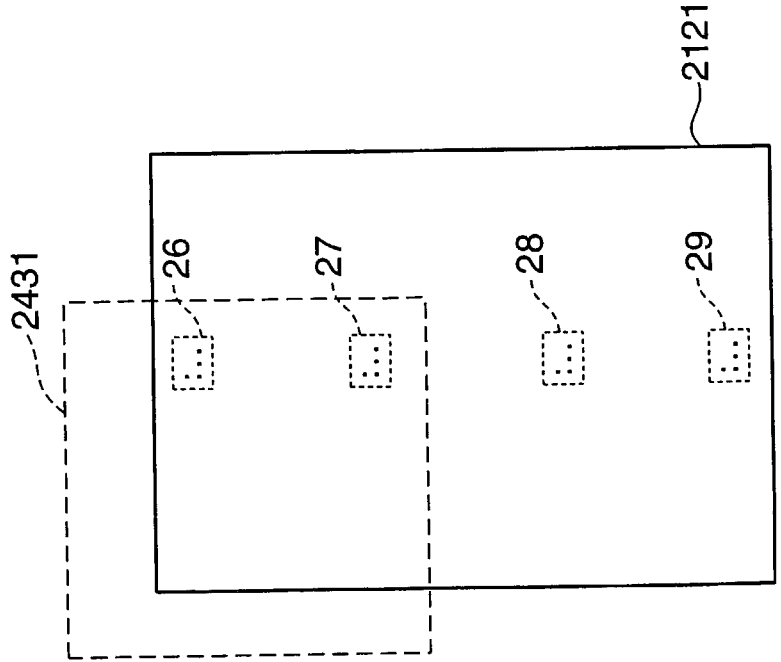

FIG. 33A is a diagram showing the front view of the screen 2121 extended on the level plane, and FIG. 33B is a diagram showing the side view of the screen 2121 provided in the present game machine. In FIG. 33, the markers 26 to 29 have the same shape, and a prescribed number (four in this embodiment) is disposed in the vertical direction, preferably in equal intervals, at the center position of the surface of the screen 2121. The mounting position information for each of the markers 26 to 29 with respect to the screen 2121 is stored in the likes of a ROM 2105 of the main body control unit 2100 shown in FIG. 35. The arrangement position of the markers may be set in accordance with the shape of the screen, and, in the present embodiment, markers are provided in the vicinity of the top or bottom of the screen 2121 and at two locations in which the space therebetween is divided in thirds. Moreover, the number of markers may be suitably set in accordance with the size of the screen and visual field angle of the CCD camera 213.

The gun unit 210, as shown in FIG. 32, simulates a pump action gun, and has a trigger switch 211 as the micro switch that is turned on when the player pulls the trigger 214 in the direction of arrow $A_{28}$, a pump trigger switch 212 as the micro switch that is turned on when the player slides the sliding unit 215 in the direction of arrow $A_{29}$, and a CCD camera 213 having a visual field angle capable of imaging at least one, up to two in this embodiment, among the markers 26 to 29 for detecting the point where the direction of the muzzle with respect to the screen 2121; that is, the direction of the muzzle 216 (visual line vector) intersects with the screen 2121.

Signals from the trigger switch 211, the pump trigger switch 212 and the CCD camera 213 are transmitted to the main body control unit 2100 via the gun cable 217, virtual shooting is designated by the trigger switch 211 being turned on, and the loading of a prescribed number of virtual bullets is designated to the gun unit 210 when the pump trigger switch 212 is turned on.

Depending on the visual field 2431 of the CCD camera 213, as shown in FIG. 33A, only a part of the screen 2121 may be imaged, and, as further shown in FIG. 33B, the distance between the CCD camera 213 (within the gun unit 210) and the screen 2121 is changed in accordance with the player's operation during the game progress, and the size of the portion of the screen 2121 to fit within the visual field 2431 of the CCD camera 213 will change.

With the present game machine, detected are the arrangement of the image and the rotational angle information of the one marker illuminating with the mounting position information of the markers 26 to 29 (as described later) within the CCD image corresponding to the visual field 2431, and detected is which part of the screen 2121 the player is facing the muzzle 216, and the intersecting point thereof.

Figure 34A:
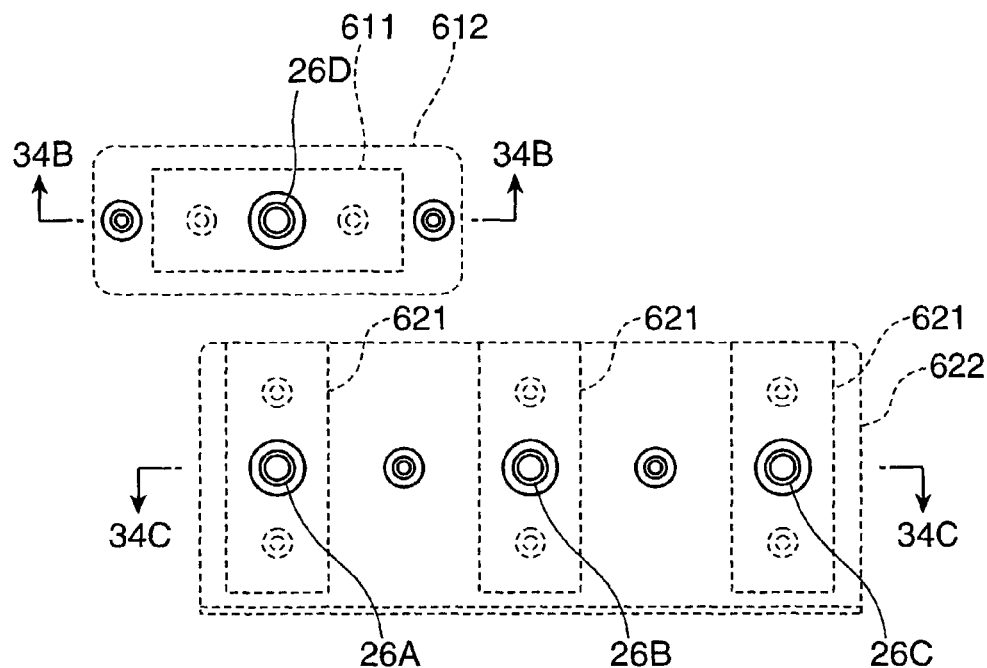
FIG. 34A is a diagram showing the form of markers.
Figure 34B:
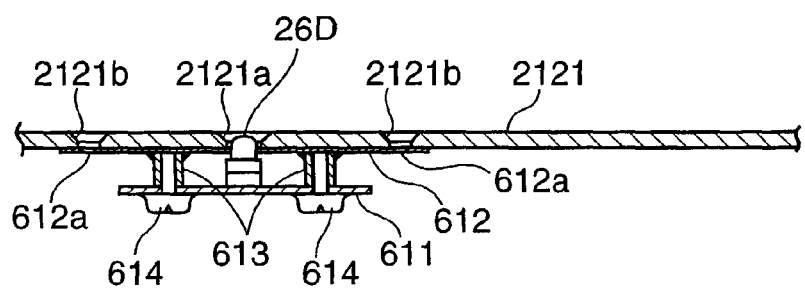
FIGS. 34B and 34C represent the mounting structure to the screen.
Figure 34C:
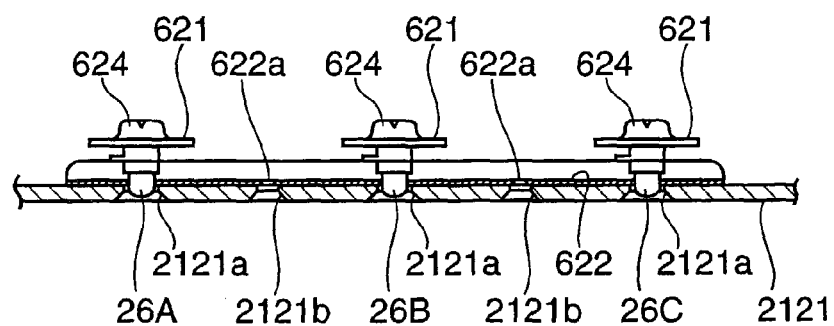

FIG. 34A shows the form of the markers, and FIG. 34B and FIG. 34C show the mounting structure to the screen 2121. Since the markers 26 to 29 have the same shape, marker 26 will be explained here. Four LEDs 26A to 26D are adopted in the marker 26 as the spot light source (illuminator) for illuminating infrared light for preventing erroneous detection by outside light. LED 26A to LED 26C are disposed on a straight line (main axis) in prescribed equal intervals, LED 26 has the same interval as the foregoing prescribed interval from LED 26A, and provided on the line (sub axis) intersecting with the main axis. Since the shape of the markers form an L shape, the expression "L shape" will be used in the second embodiment when referring to the marker shape. The mounting position information of the marker 26 is prescribed and stored for each LED, and the LED 26A is the reference position in the present embodiment.

The interval between LED 26A to LED 26D is preferably equal, and it not limited thereto. The disposition of LED 26D at a position of intersecting with the sequence of LED 26A to LED 26C is preferably form the computational processing perspective to be performed based on the marker position and rotation angle within the picture image described later.

FIG. 34B shows the mounting structure of the LED 26D. The LED 26D is mounted, for example, in an upright posture on the substrate 611 of a prescribed size to which is mounted an LED illuminating drive circuit or the like. Pores 2121a from which the illumination unit of the LED 26D is exposed are provided at prescribed positions on the substrate 611. The pore 2121a is formed in a conical shape (cone shape) broadening toward the front face of the screen 2121, and the light emitted from the LED 26D may be irradiated at a broad angle. A stud nut 613 having a prescribed height is welded at two places at the left and right sides of the thin metal plate 612, or established by pressurization (to the pore not shown formed on the thin metal plate 612), and the substrate 611 and the thin metal plate 612 are integrally formed by tightening a bolt 614 from the opposite face upon mounting the substrate 611 on this nut 613. A pore 612a is further formed at both end positions of the thin metal plate 612, and, although not shown, a triangular screw penetrates the cone shaped pore 2121b corresponding to the screen 2121 in order to integrally form the screen 2121 and the thin metal plate 612 by tightening the bolt.

FIG. 34C shows the mounting structure of LEDs 26A to 26C, and this is basically the same mounting structure as with LED 26D. In other words, the LEDs 26A to 26C are mounted, for example, in an upright posture on the substrate 621 of a prescribed size. Three pores 2121a from which the illumination unit of the LEDs 26A to 26C is exposed are provided at prescribed positions on the screen 2121. The pores 2121a are formed in a conical shape broadening toward the front face of the screen 2121, and the light emitted from the LEDs 26A to 26C may be irradiated at a broad angle. Moreover, the thin metal plate 622 is of a size capable of containing LEDs 26A to 26C (three LED worth), a stud nut 623 having a prescribed height is welded at three places, or established by pressurization (to the pore not shown formed on the thin metal plate 622), and the substrate 621 and the thin metal plate 622 are integrally formed by tightening a bolt from the opposite face upon mounting the substrate 621 on this nut 623. Pores 622*a* are further formed at suitable positions of the thin metal plate 622, and, although not shown, a triangular screw penetrates the cone shaped pore 2121*b* corresponding to the screen 2121 in order to integrally form the screen 2121 and the thin metal plate 622 by tightening the bolt.

Further, the structure for protecting the rotation and the like of the mirror 243 is the same as the first embodiment shown in FIG. 10 and FIG. 11, and the explanation thereof is omitted.

Figure 35:
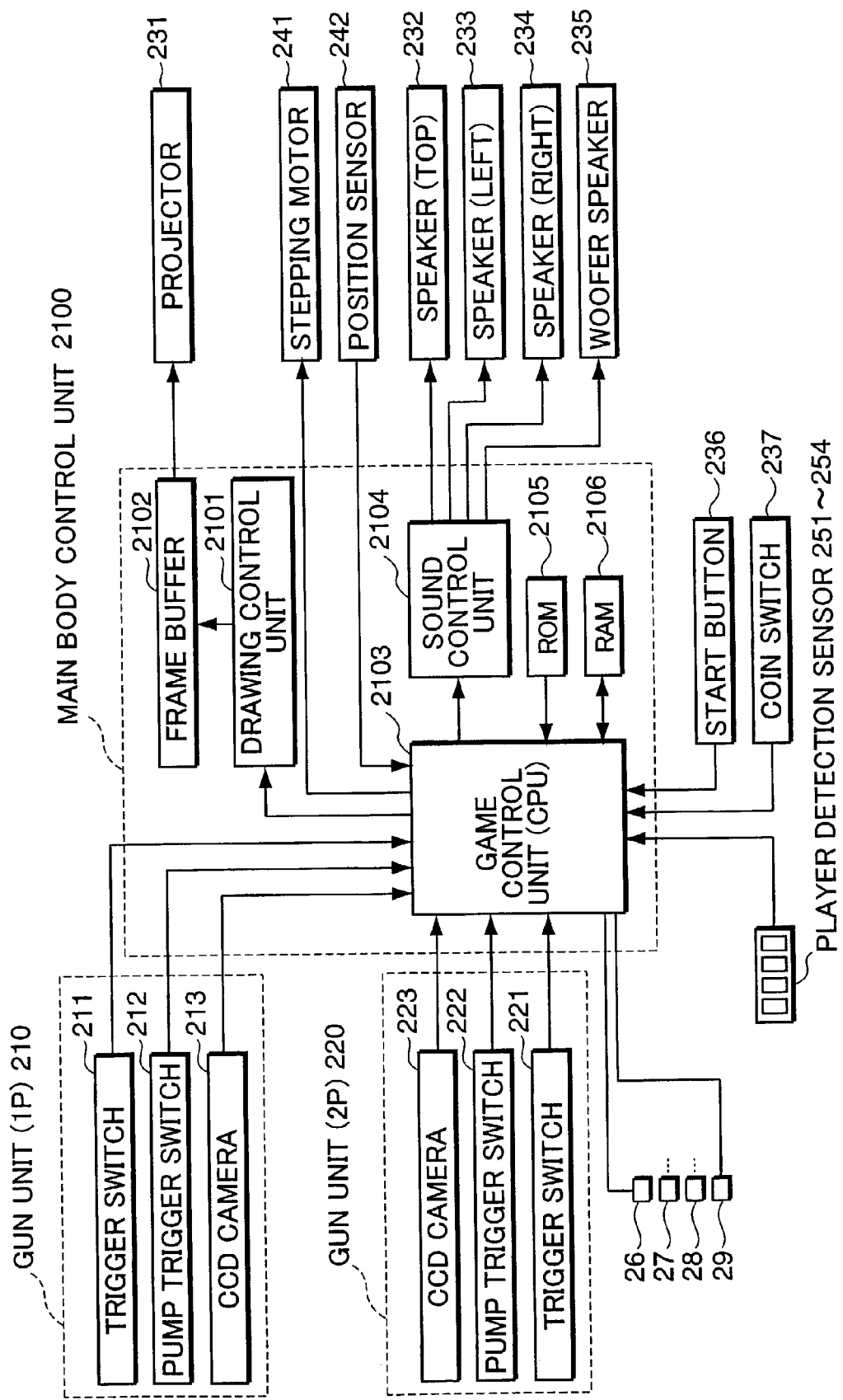
FIG. 35 is a block diagram showing the hardware structure of the control unit of the shooting video game machine pertaining to the second embodiment.

The control of the present game machine structured as above is now explained. FIG. 35 is a block diagram showing the hardware structure of the control unit of the present game machine, and FIG. 36 is a flowchart showing the procedure of the shooting game processing (shooting video game program) executed with the game control unit (CPU) 2103.

As shown in FIG. 35, connected to the (game control unit 2103 of the) main body control unit 2100 set within the base 2110 (FIG. 30) are the aforementioned trigger switches 211, 221; pump trigger switches 212, 222; CCD cameras 213, 223; markers 26 to 29; player detection sensors 251 to 254; start button 236; projector 231; stepping motor 241; speakers 232 to 235; coin switch 237 for detecting the insertion of the coin from the coin insertion slot 238; and position sensor 242 for determining the rotational reference position of the mirror 243 with the semicircular plate mounted on the mirror axis (upon turning on the power), and the display position of the projected image 2124 on the screen 2121 (FIG. 31) is continuously designated by the game control unit 2103 designating the rotation angle from the rotational reference position.

Provided to the main body control unit 2100 are a ROM 2105 storing the program, image data and sound data for the shooting video game processing described later; a RAM 2106 for temporarily storing the program read from the ROM 2105 and data used in the program; a game control unit 2103 for controlling the overall progress of the game based on the program loaded on the RAM 2106; a drawing control unit (image drawing processor) 2101 for writing image data corresponding to the projected image of the projector 231 in the frame buffer 2102 while performing processing unique to the image such as polygon drawing and texture mapping in accordance with the coordinates of the object having a 3D shape within the game space; and a sound control unit (sound control processor) 2104 comprising an ADPCM sound source for reproducing sounds from the sound data.

Figure 36:
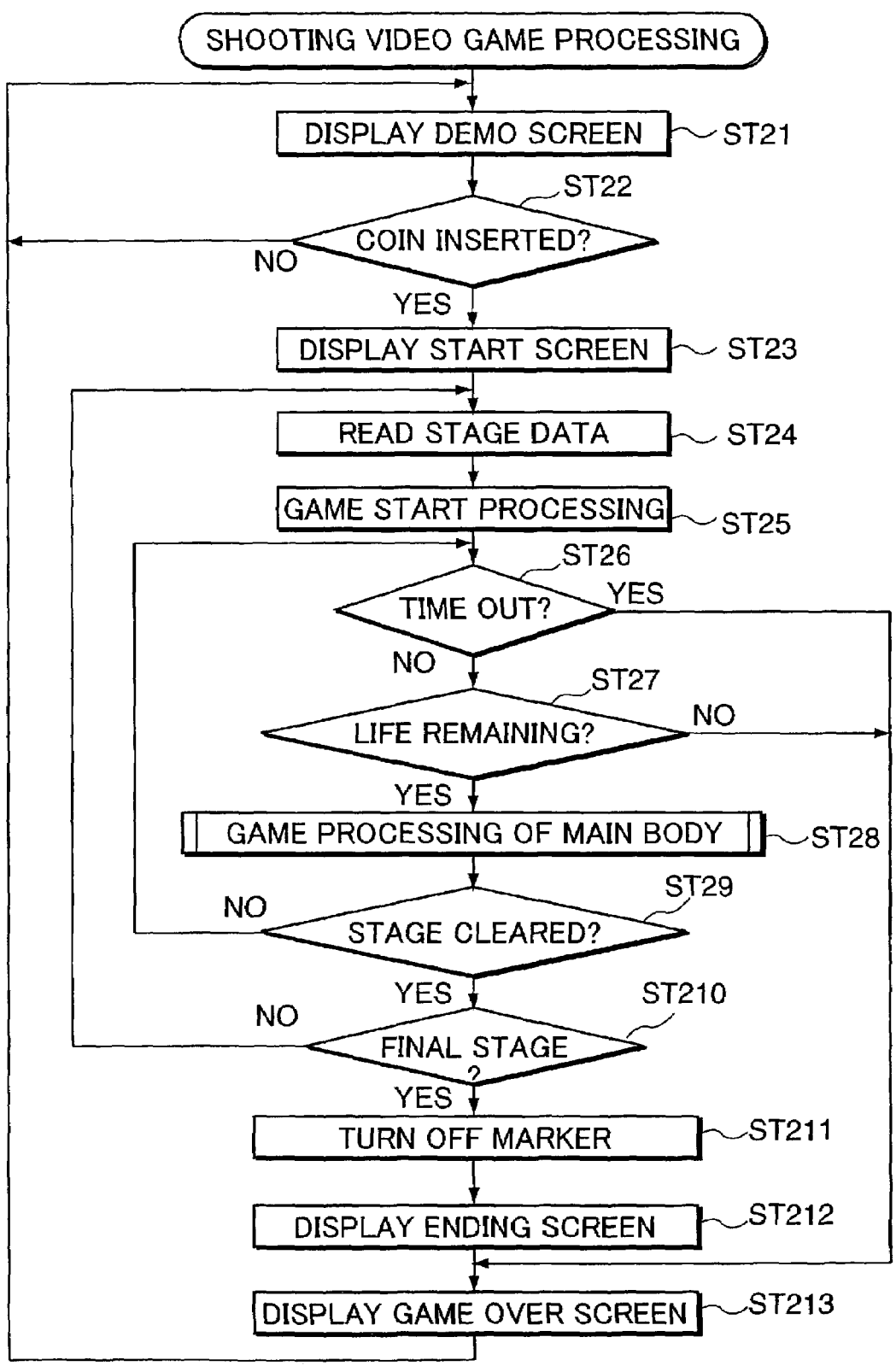
FIG. 36 is a flowchart showing the procedure for the shooting video game processing executed with the game control unit (CPU)

With the shooting video game processing to be executed at the game control unit 2103, as shown in FIG. 36, if the coin insertion is not detected with the coin switch 237 (NO at ST22), demo image data is read and a demo screen is displayed (ST1). When the insertion of the coin is detected (YES at ST22), the start screen is displayed (ST23), (and when the pressing of the start button 236 is further detected) the game start processing is executed (ST25) and the game is started after other game data is read (ST24) which characterizes the image data and sound data differing per stage, and the attack or movement of the enemy character (foregoing dinosaur or other shooting targets) and the movement of the player.

With the present game machine, similar to conventional hand-to-hand combat game machines, a virtual life of the player is set and reduced in accordance with the time limit of the game and the attack by the enemy character, and the game is ended when the time is up during the game progress (YES at ST26) or when the life runs out (NO at ST27), and a screen indicated game over is displayed ST213). If time still remains (NO at ST26) and the life still remains (YES at ST27), the game is continued at the game processing main body (ST28, to be described in detail later with reference to FIG. 38 and the like).

When a stage is cleared (YES at ST29) by defeating the enormous dinosaur shown in FIGS. 2 to 4 of the first embodiment, and the cleared stage is not the final stage (NO at ST210), processing from ST24 is repeated for the new stage. When the cleared stage is the final stage (YES at ST210), the markers 26 to 29 are turned off thereafter (ST211), the ending screen and game over screen are displayed (ST212, ST213), and the routine returns to the processing of ST21.

Figure 37:
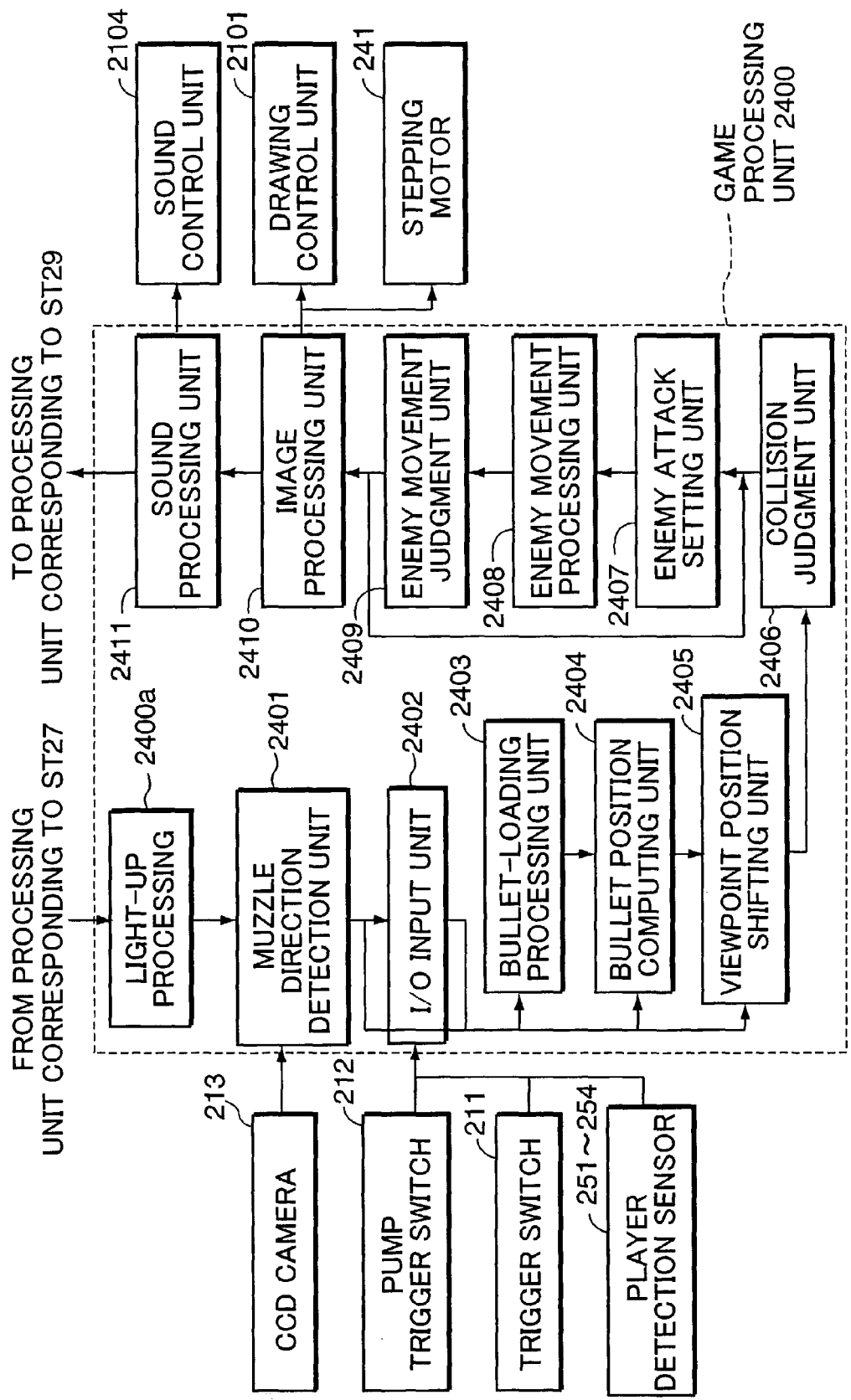
FIG. 37 is a block diagram showing the structure of the principal parts of the game processing unit for performing the processing with the game processing main body.
Figure 38:
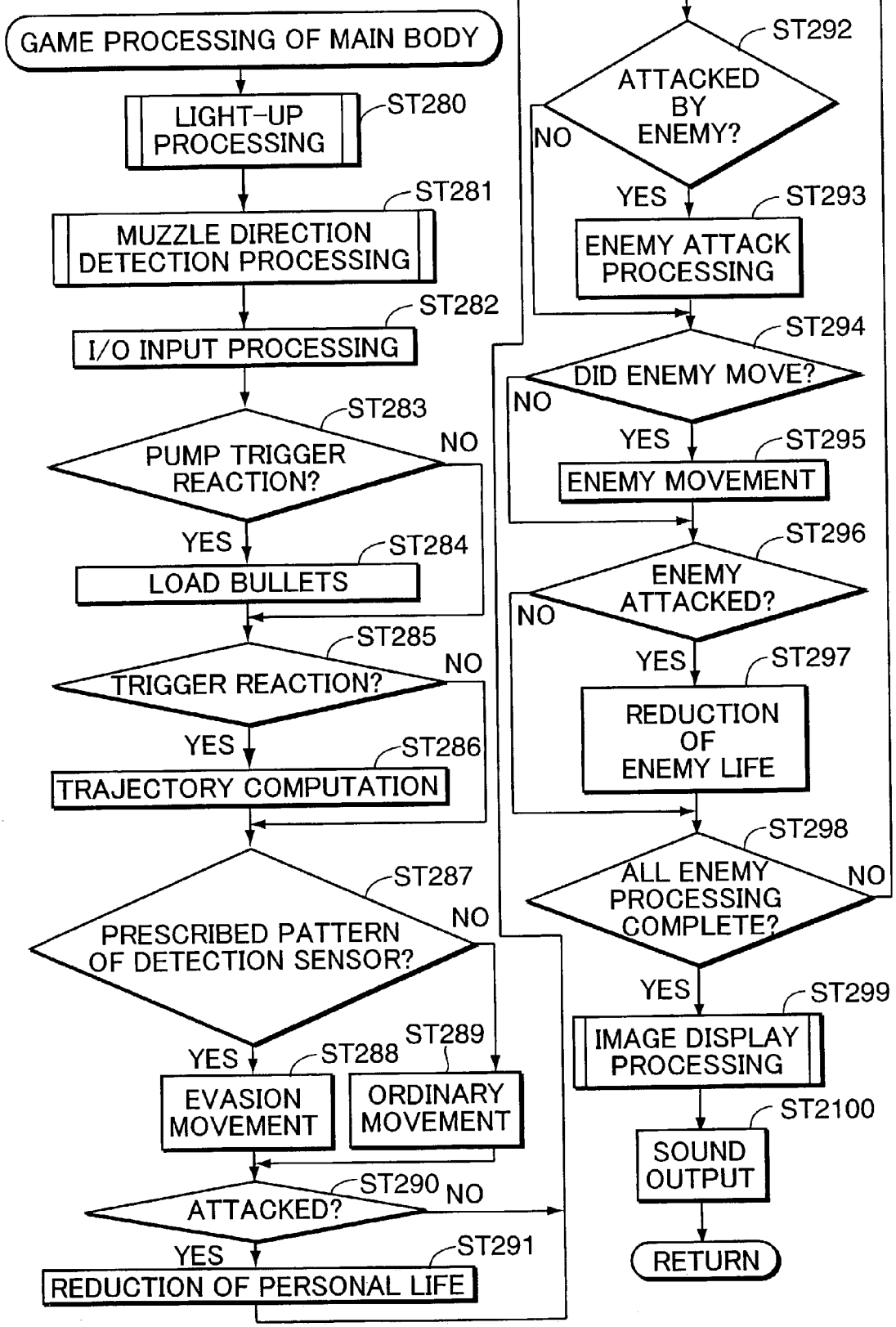
FIG. 38 is a flowchart showing the detailed procedure of the processing with the game processing main body.
Figure 39:
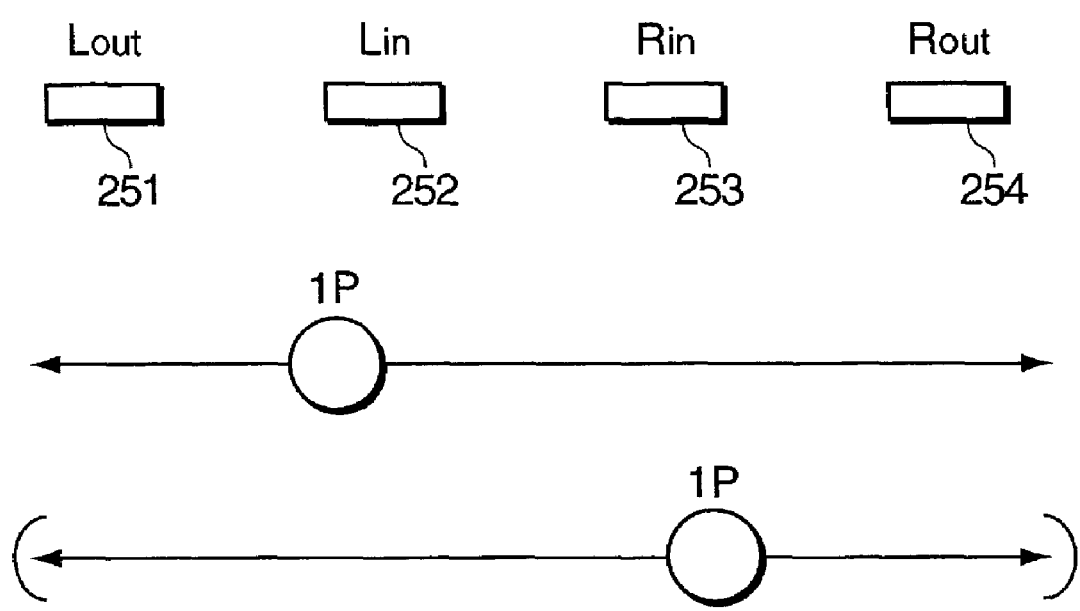
FIG. 39 is the first diagram for explaining the detection of the player's position on the play area with the player detection sensor.
Figures 40, 41:
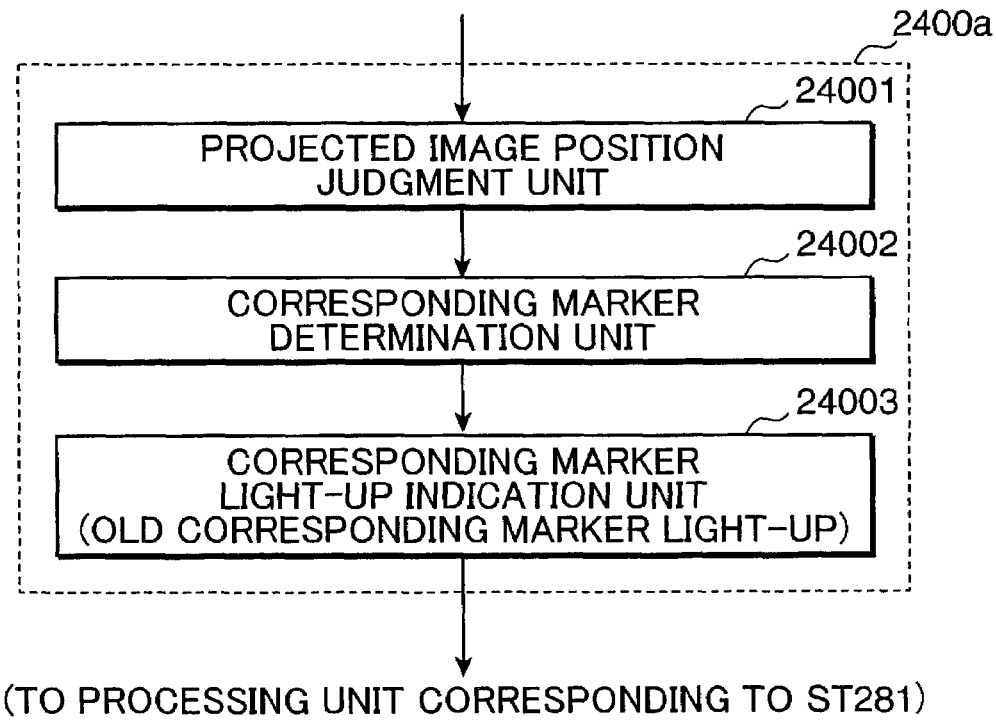
FIG. 40 is the second diagram for explaining the detection of the player's position on the play area with the player detection sensor.
FIG. 41 is a block diagram showing the structure of the principal parts of the marker light-up processing unit for performing the marker light-up processing at ST280.

FIG. 37 is a block diagram showing the structure of the principal parts of the game processing unit 2400 (part of the shooting video game program) for performing the processing with the game processing main body at ST28 of FIG. 36, and FIG. 38 is a flowchart showing the detailed procedure of the processing with the game processing main body at ST28. FIG. 39 and FIG. 40 are diagrams for explaining the detection of the position of the player on the play area PE2 (corresponds to player 300 of FIG. 1 and FIG. 5 in the first embodiment) with the player detection sensors 251 to 254 (in a one player game with only 1P player).

As shown in FIG. 37, as the processing unit for performing processing in relation to the player (virtual viewpoint, or virtual player within the game space), the game processing unit 2400 has a light-up processing unit 2400*a* for lighting one of the markers 26 to 29 corresponding to the screen 2121 position to which the projected image is displayed; a muzzle direction detection unit 2401 for detecting the position on the screen 2121 to which the muzzle is facing based on the image captured with the CCD camera 213; an I/O input unit 2402 for inputting the on-state of the pump trigger switch 212 and trigger switch 211 and the detection status of the player detection sensors 251 to 254; a bullet-loading processing unit 2403 for processing the loading of a prescribed number of virtual bullets when the pump trigger switch 212 is turned on; a bullet position computation unit 2404 for setting the coordinates so as to move the bullets in a direction according to the direction of the muzzle 216 from the vicinity of the virtual viewpoint within the game space when the trigger switch 211 is turned on; a viewpoint position shifting unit 2405 for ordinarily shifting the virtual viewpoint within the game space (at a shifting width designated in advance) and shifting the virtual viewpoint so as to avoid the dinosaur when the player detection sensors 251 to 254 detect the movement of the player on the player area PE2; and a collision judgment unit 2406 for judging whether the virtual attack from the enemy hit the player.

Further, as the processing unit for performing processing relating to the enemy character, the game processing unit 2400 has an enemy attack setting unit 2407 for generating the attack to the player when the enemy character is sufficiently close to the player (using random numbers, etc.); an enemy movement processing unit 2408 for moving the enemy character upon setting the enemy character coordinates so as to chase the player within the game space; and an enemy collision judgment unit 2409 for judging whether the virtual attack from the player hit the enemy. The game processing unit 400 further has an image processing unit 2410 for setting data which designates the drawing control unit 2101 so as to draw based on the setting of the enemy character coordinates and rotating the stepping motor 241 in accordance with where to display the projected image of the projector 231 on the screen 2121, for example, whether to display the projected image on the upper part or lower part; and a sound processing unit 2411 for setting data which designates the sound control unit 2104 to selectively reproduce sounds (including music) according to the game progress.

With the game processing main body executed at the game processing unit 2400 including each of the foregoing processing units, as shown in FIG. 38, light-up processing of one of the markers 26 to 29 corresponding to the position on the screen 2121 to which the projected image 2124 is displayed is foremost conducted (ST280), the muzzle direction detection processing is then conducted with the muzzle direction detection unit 2401 (ST281, described later in details with reference to FIG. 44 and the like), and the response status of the pump trigger switch 212, trigger switch 211 and player detection sensors 251 to 254 is obtained with the I/O input unit 2402 (ST282).

If the pump trigger switch 212 is responding (YES at ST283), the bullets are virtually loaded at the bullet-loading processing unit 2403 (ST284). If the trigger switch 211 is responding (YES at ST285), the coordinates representing the trajectory of the bullets within the game space are computed (ST286) in accordance with the direction of the muzzle 216 with respect to the screed detected with the muzzle direction detection unit 2401.

If the response state of the player detection sensors 251 to 254 is of a prescribed pattern showing the movement of the player on the play area PE2 (YES at ST287), the avoidance movement of the virtual viewpoint is set with the viewpoint position shifting unit 2405 (ST288), and, if the response status of the player detection sensors 251 to 254 is not of a prescribed pattern (NO at ST287), the normal movement of the virtual viewpoint is set (ST289).

In further detail, the player detection sensors 251 to 254 are range sensors for detecting the distance to the obstacle with supersonic waves or infrared rays, and turning on the signal when the distance to the obstacles is less than a prescribed distance (distance corresponding to the player on the play area PE2) (it is not necessary to measure the distance accurately). As shown in FIG. 39 and FIG. 40, when it is detected that 1P player shifted from the reference position in front of the player detection sensor 252 on the inner left side to the front of the player detection sensor 251 on the outer left side during an ordinary case, the virtual viewpoint coordinates are set within the game space deeming that the player has moved around to the left side of the dinosaur.

Particularly, here, since the movement to the left side is detected with a combination of two player detection sensors, as shown in FIG. 40, it is possible to detect "a state where nobody is playing" and "a state of erroneously recognizing the gallery other than the player" in addition to the movement itself, and it is possible to detect the movement of the player with further accuracy.

Further, regarding the 1P player's movement to the right side (FIG. 39), when it is detected that the player moved to the front of the player detection sensor 253 on the inner right side (or the player detection sensor 254 on the outer right side), the virtual viewpoint coordinates are set within the game space deeming that the player has moved around to the right side of the dinosaur.

Moreover, the reference position may be moved to the front of the player detection sensor 253 on the inner right side. Here, when it is detected that the player moved to the front of the player detection sensor 254 on the outer right side, the virtual viewpoint coordinates may be set within the game space deeming that the player has moved around to the right side of the dinosaur, and when it is detected that the player moved to the front of the player detection sensor 252 on the inner left side (or the player detection sensor 251 on the outer left side), the virtual viewpoint coordinates may be set within the game space deeming that the player has moved around to the left side of the dinosaur.

When the collision judgment unit 2406 judges that the attack from the enemy character hit the player (YES at ST290 of FIG. 38), the player's life is reduced, and the player's life gauge display (which represents the player's life value on the screen in a pole shape) is renewed (ST291).

When an attack from the enemy character to the player is generated in the enemy attack setting unit 2407 (YES at ST292), coordinates within the game space of the respective portions are set (ST293) such that the attack against the player is generated from the portions which the enemy character generates attacks such as the mouth, arms, legs and tail. When the enemy character movement is set in the enemy movement processing unit 2408 (YES at ST294), enemy character coordinates within the game space are moved (ST295). Next, when the enemy collision judgment unit 2409 judges that the attack from the player hit the enemy character (YES at ST296), the enemy's life is reduced, and the enemy life gauge display is renewed (ST297).

It is possible to assume that one or two or more enemy characters exist in the game space, and while the target enemy character is being renewed, processing of ST292 to ST297 for all enemy characters is repeated (NO at ST298). When all processing of ST292 to ST 297 for all enemy characters is completed (YES at ST298), image display processing with the image processing unit 2410 (ST299) and the sound output processing with the sound processing unit 2411 (ST2100) are conducted, and the processing of the game processing main body returns to the beginning.

FIG. 41 is a block diagram showing the principal parts of the marker light-up processing unit 2400a (part of the shooting video game program) for performing the marker light-up processing at ST 280 of FIG. 38. The marker light-up processing unit 2400a has a projected image position judgment unit 24001 for receiving the position information of the screen 2121 to which the projected image 2124 is displayed from the image processing unit for performing drawing processing and judging the current projected position; a corresponding marker determination unit 24002 for specifying (determining) a marker as described later among the markers contained in the projected range from this projected position information and the predetermined position information of the markers 26 to 29; and a corresponding marker light-up indication unit 24003 for performing the light-up indication to the four LEDs structuring the determined corresponding marker. Further, in a state where the display range of the projected image contains two markers, the marker closer to the center of the display range of the projected image will be selected, and when the two markers are roughly the same distance from the center, the marker corresponding to the shifting direction of the projected image on the screen is selected (that is, position information from the image processing unit 2410 is stored over several occasions, and comparison is made with the present position information so as to decide the marker facing the center).

Figure 42:
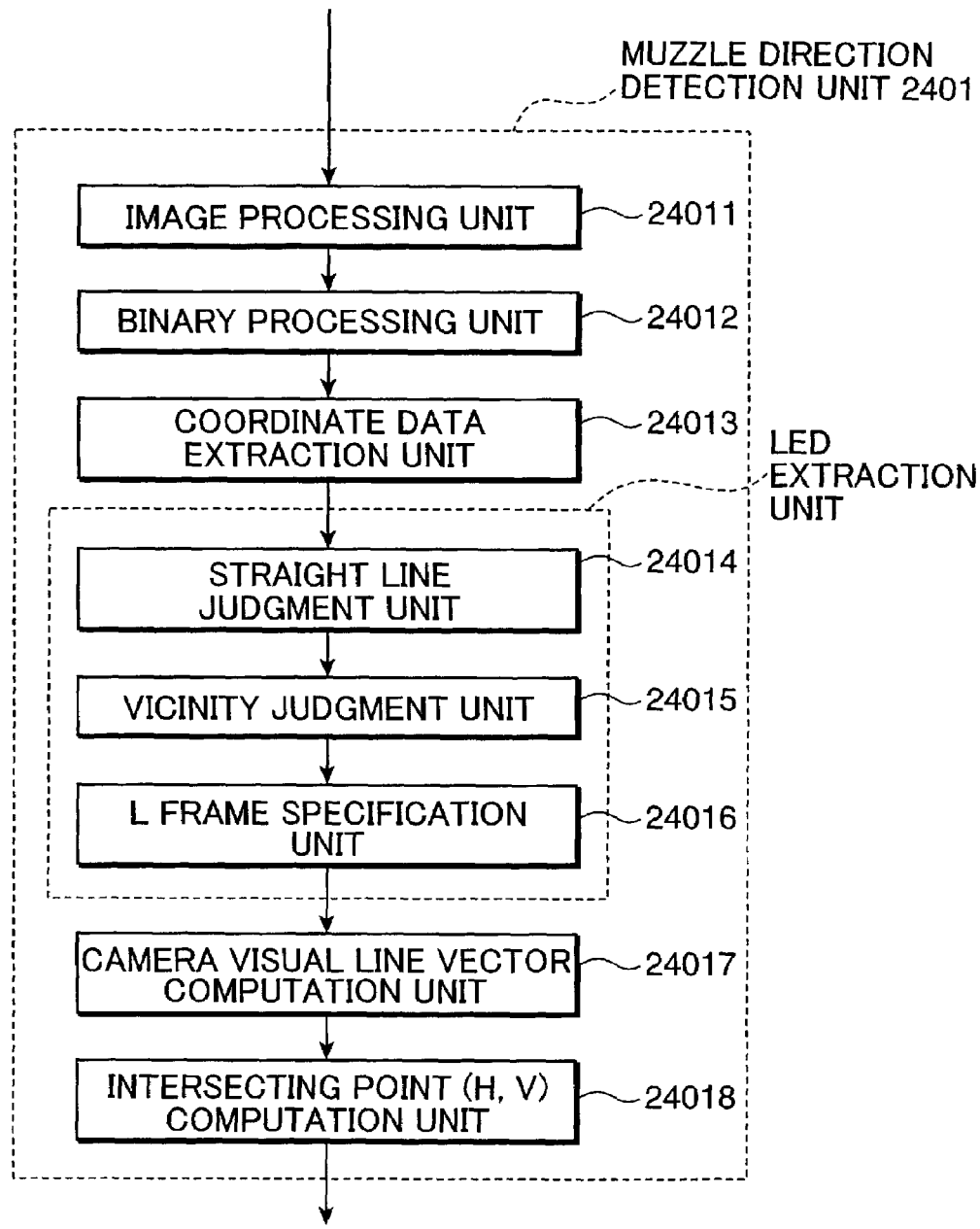
FIG. 42 is a block diagram showing the structure of the principal parts of the muzzle direction detection unit for performing the muzzle direction detection processing at ST281.
Figure 43:
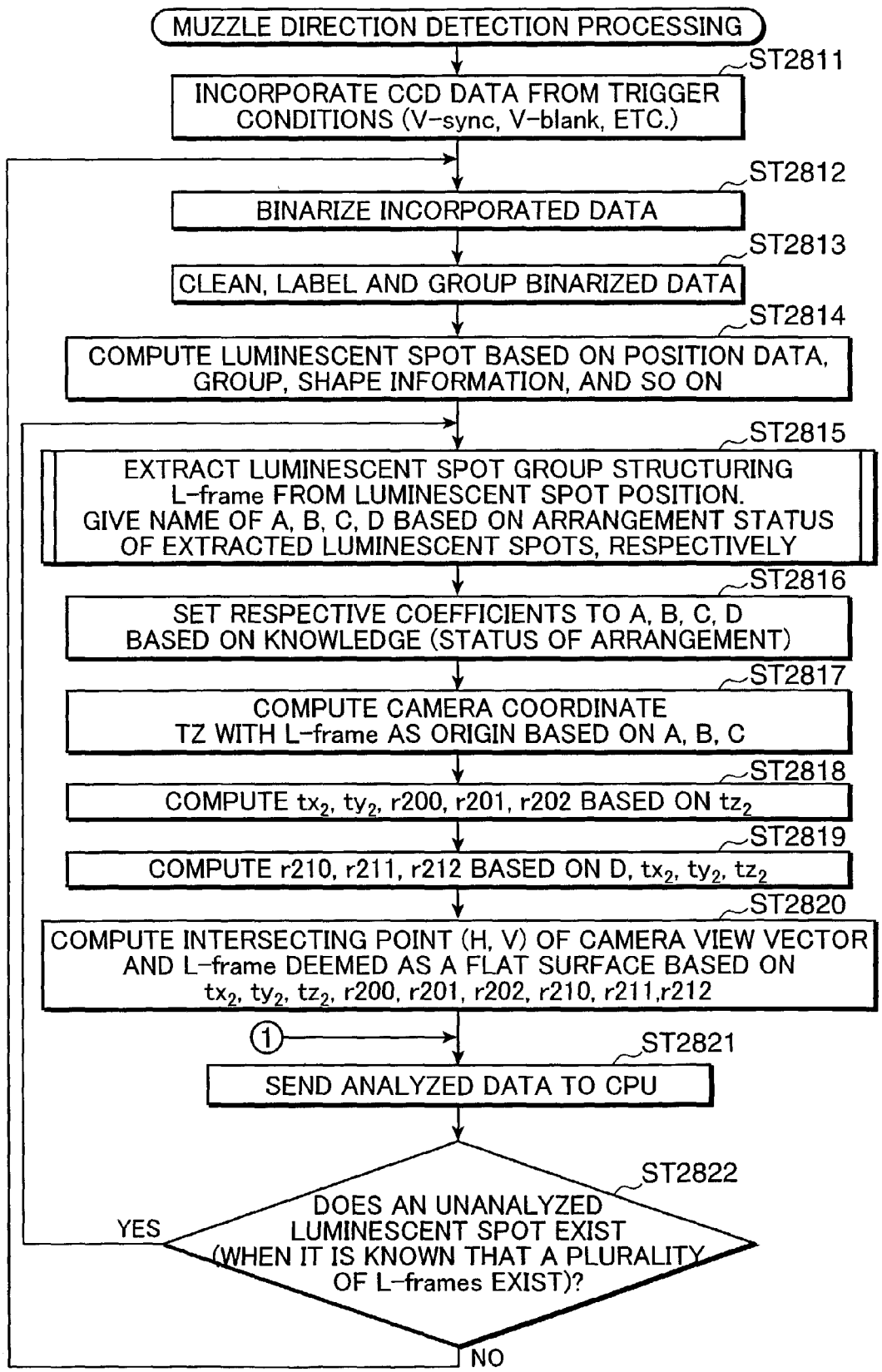
FIG. 43 is a flowchart showing the detailed procedure of the muzzle direction detection processing at ST281.
Figure 44:
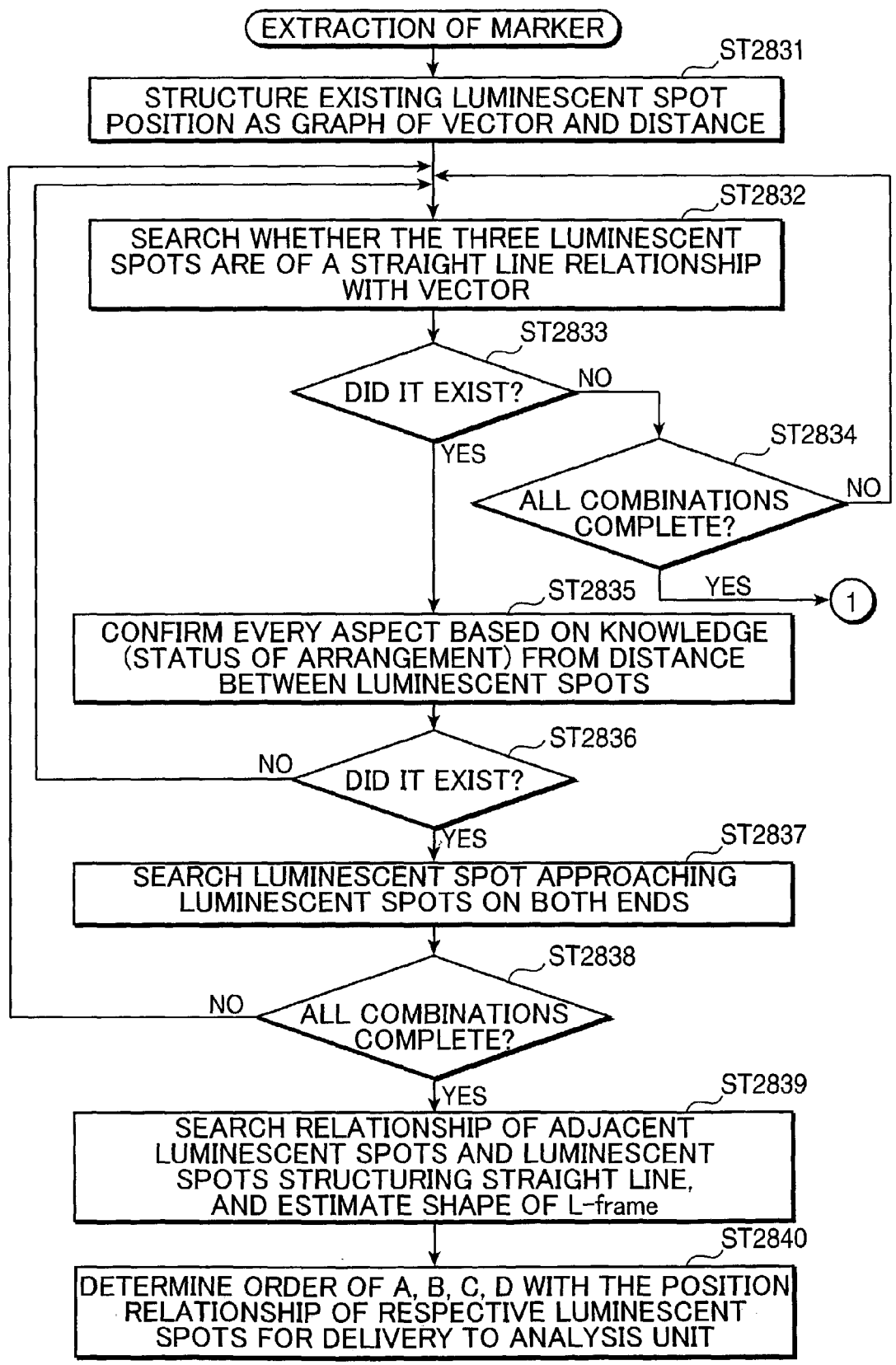
FIG. 44 is a diagram showing the detailed subroutine of ST2815.

FIG. 42 is a block diagram showing the structure of the principal parts of the muzzle direction detection unit 2401 for performing the muzzle direction detection processing at ST281 of FIG. 38; FIG. 43 is a flowchart showing the detailed procedure of the muzzle direction detection processing at ST281; and FIG. 44 is a diagram showing the detailed procedure of the extraction processing of the "L frame" at ST2815.

As shown in FIG. 42, the muzzle direction detection unit 2401 has an image processing unit 24011 for repeatedly incorporating in prescribed cycles the CCD image (data per pixel is stored in a prescribed area on the RAM 2106) which is the picture image of the CCD camera 213; a binary processing unit 24012 for binarizing data per imaged pixel as a prescribed threshold and storing this in a prescribed area on the RAM 2106 as luminescent spot data, or performing binary processing after temporarily storing the same; a coordinate data extraction unit 24013 for extracting coordinate data in which the binarized luminescent spot data exists and performing prescribed data arrangement; a straight line judgment unit 24014 for successively selecting the combination of the three spots from the extracted luminescent spot data and judging whether such three spots exist on the straight line and whether they are of equal intervals; a vicinity judgment unit 24015 for judging whether another luminescent spot exists in the vicinity of a luminescent spot on one end with respect to the three spots existing on the straight line (main axis); an L frame specification unit 24016 for specifying the "L frame" with the judgment of both judgment units; a normal line computation unit 24017 for computing the direction of the camera from the specified L frame; that is, the normal line vector; and an intersecting point (H, V) computation unit 24018 for computing the intersecting point (impact position) with the screen 2121 of the computed normal line direction of the substrate 2130. The CCD image includes luminescent spots other than the LED; that is, noise, caused by infrared rays contained in the natural light and infrared rays contained in the fluorescent lights and discharge lamps. Therefore, the straight line judgment unit 4014 and the vicinity judgment unit 24015 endeavor to eliminate the noise by performing judgment processing for all combinations.

Here, the normal line computation unit 24017 and intersecting point (H, V) computation unit 24018 will be explained in further detail. The positions of the LED.A to D of the marker when the screen 2121 is flat is $A_2$ (0, 0), $B_2$ (1, 0), $C_2$ (2, 0), $D_2$ (0, 1), and when these are defined upon expanding to the three-dimensional space, the positions will become 0a (0, 0, 0), 0b (1, 0, 0), 0c (2, 0, 0), 0d (0, 1, 0) or 0d (0, −1, 0). Meanwhile, when these defined coordinates of the respective points are viewed from the CCD camera 13, the coordinates will be represented as a value enjoining three-dimensional matrix such as Ca ($tx_2$, $ty_2$, $tz_2$), Cb ($tx_2$+r200, $ty_2$+r201, $tz_2$+r202), Cc ($tx_2$+2×r200, $ty_2$+2×r201, $tz_2$+2×r202), Cd ($tx_2$+r210, $ty_2$+r211, $tz_2$+r212). Meanwhile, the dimension ratio ph, pv in the vertical and horizontal directions of the visual field of the CCD camera 213 and the actual screen 2121 and the coordinates LED.$A_2$ ($A_2$h, $A_2$v), LED.$B_2$ ($B_2$h, $B_2$v), LED.$C_2$ ($C_2$h, $C_2$v), LED.$D_2$ ($D_2$h, $D_2$v) of the respective points in the CCD image are all publicly known. Thus, variables $tx_2$, $ty_2$, $tz_2$, r200 to r212 can be computed from these publicly known data and the coordinates of the respective points viewed from the CDD camera 213, and the elements of the normal line vector of the CCD camera 213 are thereby determined. Moreover, the reason why the value contained in the two items of coordinates Cc was made to be double value against r200, r201, r202; that is, to be in proportion is because the screen is represented as a plane (as a simulation). In reality, when considering that the screen 2121 is of a curved surface, a three-dimensional matrix should be defined in consideration of the curvature of such curved surface against the respective coordinates. Then, from the elements of the obtained visual line vector, for example, the visual line vector det and the intersecting point (H, V) may be sought with det=r200×r211−r201×r210, H=(r211×(−tx)−r201×(−ty))×det, V=(−r210×tx−r200×(−ty))×det.

Moreover, as described above, although LED 26A, LED 26B, LED 26C are not limited to being a fixed pitch, in this case also, they may be computed so as long as they have each pitch information. In addition, the game control unit 2103 further has a trajectory computation unit for computing the trajectory of bullets flying within the game space from impact position on the screen 2121 based on the information obtained with the intersecting point (H, V) computation unit 24018 and the information obtained with the normal line computation unit 24017 and the intersecting point (H, V) computation unit 24018.

In FIG. 43, image (CCD) data is foremost incorporated by activating the CCD camera 213 under trigger conditions such as vertical synchronization (V-sync, V-blank) at a prescribed cycle, 1/60 seconds for example (ST2811), and then the incorporated data is binarized with the binary processing unit 24012 in order to extract luminescent spots (ST2812). Here, coordinates of the binary data to be treated as luminescent spots are incorporated, an identification symbol is added thereto (labeling), and appropriate grouping processing is performed (ST2813) in a mode where the coordinate data exist dispersedly. Then, the rough specification of the luminescent spots is conducted (ST2814) based on the position data of luminescent spots, group information, and shape information (prepared as necessary). Next, the luminescent spot group structuring the "L frame" is extracted from the luminescent position, and is encoded as A, B, C, D based on the arrangement status of the extracted luminescent spots (e.g., corresponds to LED 26A, 26B, 26C, 26D with the marker 26) (ST2815).

Thereafter, the coefficient corresponding to the imaged range with respect to the screen 2121 of the CCD camera 213 is multiplied to LED. A to D with one of the markers 26 to 29 (ST2816). In the present embodiment, as described above, the distance from the CCD camera is successively differed (becoming farther) from the upper part to the lower part of the screen 21, and, by multiplying a coefficient in accordance with the ratio of such difference in distance, the distance and correspondence (ratio) of the CCD image and on the actual screen 2121 is unified. Next, coordinates $tz_2$ of the z component are computed with the "L frame" of the CCD camera 213 as the origin regarding the coordinate data of LED. A, B, C (ST2817), x component $tx_2$, y component $ty_2$, r200, r201, r202 are then computed from the camera coordinates $tz_2$ (ST2818), r210, 2r11, r212 are thereafter computed based on the LED. D coordinate data $tx_2$, $ty_2$, $tz_2$ (ST2819), and the intersecting point (H, V) of the cameral visual line vector when deeming the "L frame" to be flat is computed from $tx_2$, $ty_2$, $tz_2$, r200, r201, r202, r210, r211, r212 (ST2820). When the computation is complete, the intersecting point (H, V) which is the computation result is forwarded to the CPU 2103 side, and utilized in the collision judgment processing of the shooting against the enemy character (may also be considered for impact presentation) and the like. Moreover, in a case where a plurality of markers are lit up for a two player game, the intersecting point (H, V) of the remaining "L frames" is similarly computed, and the suitable intersecting point data may be utilized.

FIG. 44 is a detailed subroutine of ST2815, and the existing luminescent spot positions are foremost structured (formed) into a graph composed of the vector and distance (ST2831). The luminescent spot position data within the graph is organized in accordance with the foregoing grouping or in a somewhat sorted state, thereby facilitating the data analysis. Next, the vector is utilized to research whether the three luminescent spots are of a straight line relationship be operating the inner product of the adjacent two points for example (ST2832). When a straight line relationship does not exist (NO at ST2833), it is judged whether processing for all combinations has been completed (ST2834), and the routine returns to ST2832 when in the middle, and skips to ST2821 when it has been completed. Meanwhile, if a straight line relationship exists at ST2833, knowledge from the distance between the luminescent spots (arranged status) is confirmed; that is, whether the three spots on the main axis are aligned in approximately equal intervals is confirmed (ST2835). If a combination of a substantially equal interval does not exist, the routine returns to ST2832, and if it exists, the routine researches the luminescent spot in the vicinity of both ends of the three spots (distance in which the LED. D structuring the L frame is deemed to exist) (ST2837). Here, if a luminescent spot does not exist in the vicinity (NO at ST2838), the routine returns to ST2832, and if it exists, the routine researches the relationship of the luminescent spot in the vicinity and the luminescent structuring the main axis, and the shape of the "L frame" is estimated thereby (ST2839). The reason such luminescent spot is treated as LED. D depending on the conditions of the existence in the vicinity is because the relationship of the intersection and equal distance with the LED.A will not be established depending on the direction of the camera. Next, A, B, C, D are encoded from the positional relationship of the respective luminescent spots in order to determine the arrangement thereof (ST2840).

According to the muzzle direction detection processing as described above, to which part of the screen 2121 the muzzle 216 is facing; that is, the position on the screen corresponding to the center of the CCD image, and the virtual trajectory position of the bullets fired toward the target object from the muzzle 216 within the game space from a position on the screen may be computed with the characteristics of the positional relationship of the image of the marker within the CCD image.

Figure 45:
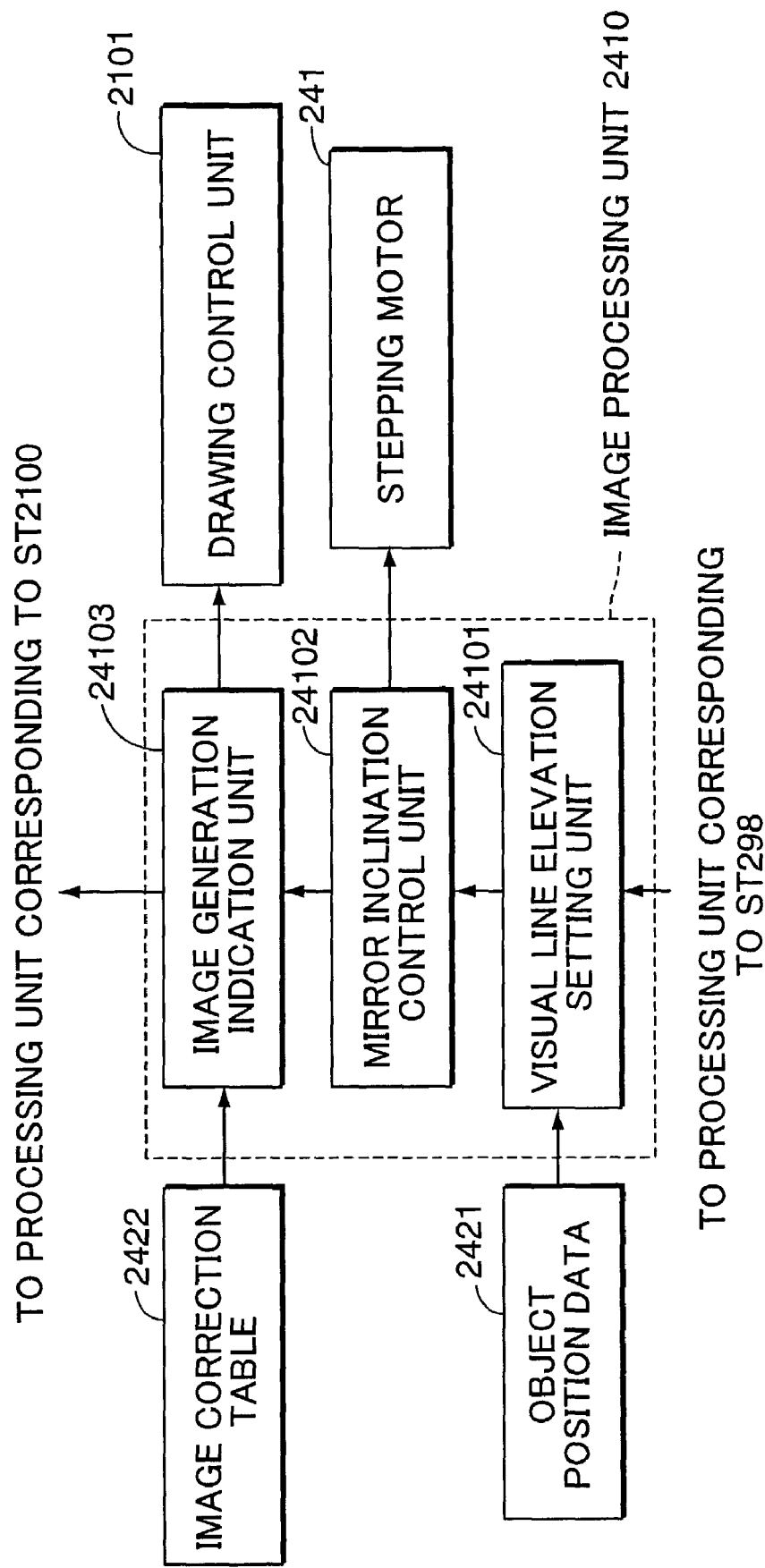
FIG. 45 is a block diagram showing the structure of the principal parts of the image processing unit for performing the image display processing at ST299.

FIG. 45 is a block diagram showing the structure of the principal parts of the image processing unit for performing the image display processing at ST299 of FIG. 40, and FIG. 46 is a flowchart showing the detailed procedure of the image display processing at ST299.

Figure 47A:
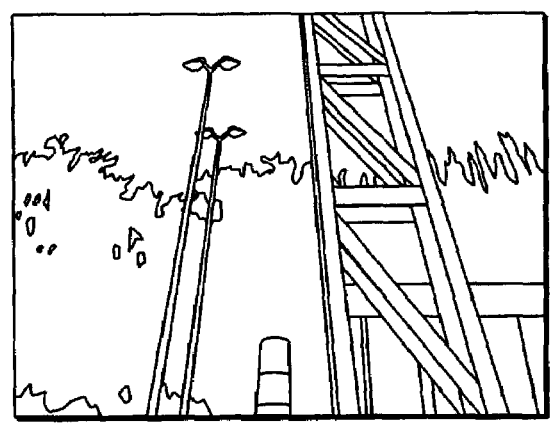
FIGS. 47A and 47B are diagrams showing the display of the image corrected with the shooting video game machine pertaining to the second embodiment.
Figure 47B:
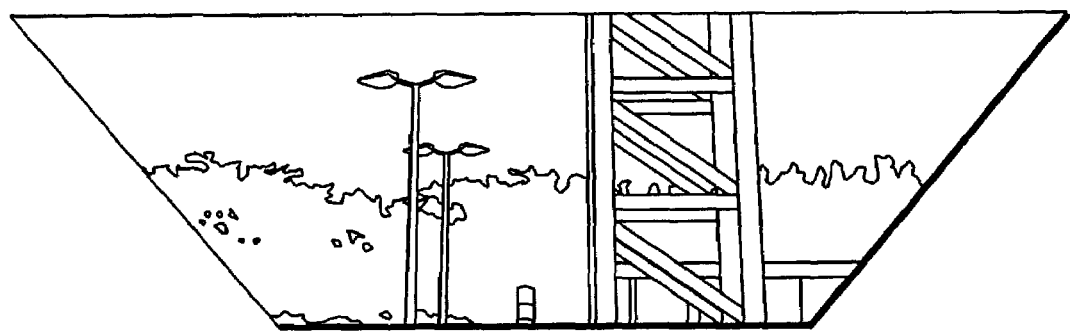
Figure 48A:
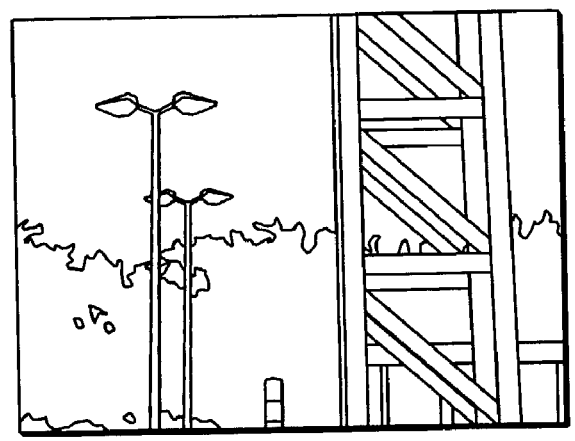
FIGS. 48A and 48B are diagrams showing the display of an ordinary image.
Figure 48B:
Figure 49A:
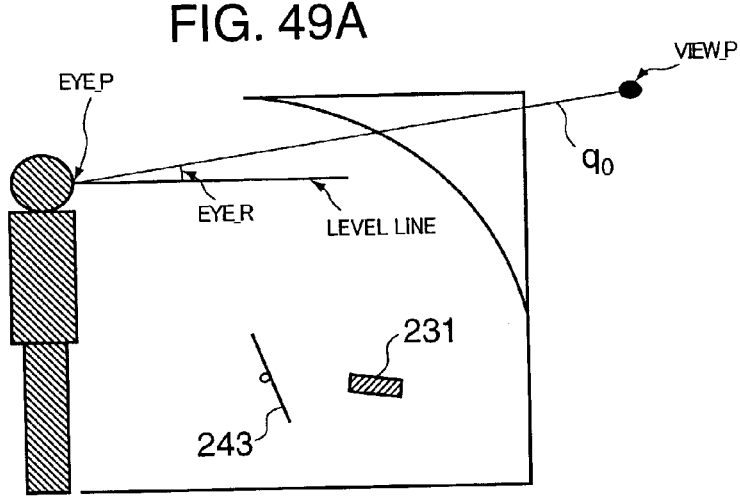
FIGS. 49A, 49B and 49C are diagrams for explaining the image correction parameter set in the shooting video game machine pertaining to the second embodiment.
Figure 49B:
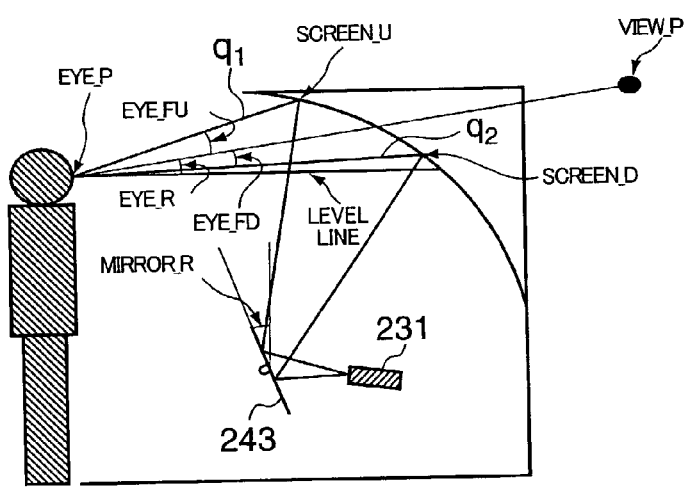
Figure 49C:
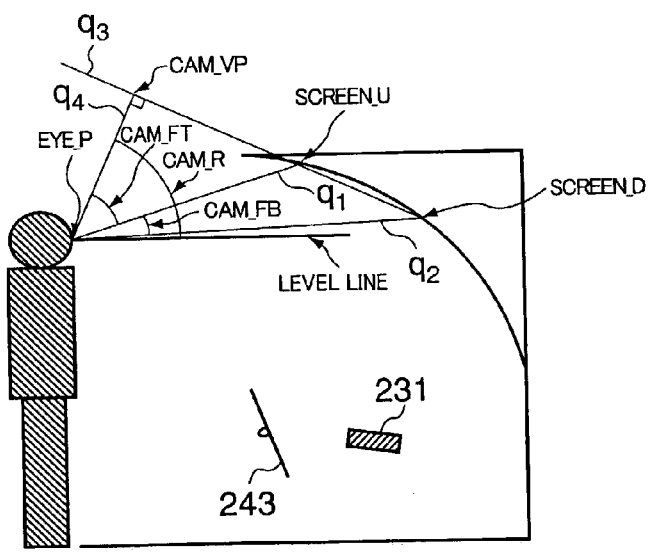

Moreover, FIGS. 47A and 47B are diagrams showing the display of an image corrected with the present game machine, FIGS. 48A and 48B are diagrams showing the display of an ordinary image, and FIGS. 49A, 49B and 49C are diagrams for explaining the image correction parameter set in the present game machine.

When an ordinary image is projected from the projector 231 (FIG. 31) as shown in FIG. 48A, the player will view the image as shown in FIG. 48B since the distance from the reference viewpoint of the player on the play area PE2 in front of the present game machine will differ between the upper part and lower part of the projected image 2124 due to the curvature of the screen 2121.

With the present game machine, the image projected from the projector 231 is corrected prior to the projection as shown in FIG. 47A, and the player will view an undistorted image as shown in FIG. 47B. Further, since there is a difference in the distance from the reference point to the upper part and lower part of the projected image 2124 when the projected image 2124 is to be displayed at the lower part of the screen 2121 (corresponds to the solid line in FIG. 31) and when it is to be displayed at the upper part of the screen 2121 (corresponds to the dotted line in FIG. 31), the degree of correction will vary in accordance with the rotation angle of the mirror.

In the present image display processing, the image containing the display target having a 3D shape within the game space captured with a virtual camera (virtual viewpoint) having a rectangular visual field is corrected such that the lower end of the image is inclined to approach the virtual camera in accordance with the rotation angle of the mirror, and the corrected image is projected on the projector 231.

The image processing unit 2410 for displaying images while performing such correction, as shown in FIG. 45, has a visual line elevation setting unit 24101 for setting the visual line elevation (angle inclining the visual line upward against the level surface, EYE_R of FIG. 49 described later) in accordance with the object position data 2421 (data representing the position of the shooting target object within the game space); a mirror inclination control unit 24102 for designating the rotation angle of the mirror in accordance with the visual line elevation and controlling the stepping motor 241; and an image generation indication unit 24103 for referring to the image correction table 2422 (table associating the inclination angle CAM_R of the virtual camera, angle CAM_FT for designating the upper end of the image, angle CAM_FB for designating the lower end of the image with the visual line elevation EYE_R), reading and setting the image correction parameter corresponding to the visual line elevation, and designating the generation of images to the drawing control unit 2101.

In reality, with the procedure shown in FIGS. 49A, 49B and 49C below, the inclination angle CAM_R of the virtual camera, angle CAM_FT for designating the upper end of the image, and angle CAM_FB for designating the lower end of the image may be designated from the visual line elevation EYE_R, and the association thereof is stored in the image correction table 2422.

With the present game machine, a gaze envisioned position VIEW_P is set in accordance with the distance between the player and dinosaur, and the portion of the dinosaur which will generate an attack against the player during approach. As shown in FIG. 49A, in accordance with this gaze envisioned position VIEW_P, visual line elevation EYE_R as the angle of the straight line $q_0$ and the level plane (reference line) is set forth from the virtual viewpoint position EYE_P.

Next, as shown in FIG. 49B, in consideration of the position, inclination angle and projection angle of the projector 231, and the position of the mirror 243, the mirror rotation angle MIRROR_R is set forth such that the field angle EYE_FU to the upper part and the field angle EYE_FD to the lower part of the virtual camera become equal centered around the visual line elevation EYE_R in order to seek the upper end SCREEN_U and the lower end SCREEN_D of the projected image. (The virtual camera has a rectangular imaging range, and the upper end SCREEN_U and lower end SCREEN_D correspond to the field angle of the vertical direction of the virtual camera. The field angle in the lateral direction may be suitably sought from the distance from the EYE_P to the SCREEN_D and the width of the projected image.)

As shown in FIG. 49C, the intersecting point of the straight line $q_3$ passing through the projected image upper end SCREEN_U and the projected image lower end SCREEN_D and the perpendicular line q4 from the virtual viewpoint position EYE_P to this straight line $q_3$ is sought as CAM_VP, and the angle (elevation) between the straight line $q_4$ and the level plane is set as the inclination angle CAM_R of the virtual camera. In addition, the angle between the straight line $q_4$ and the straight line $q_1$, for prescribing the upper end position of the projected image is set as CAM_FT, and the angle between the straight line $q_1$, and the straight line $q_2$ for prescribing (together with the CAM_FT) the lower end position of the projected image is set as CAM_FB.

According to the foregoing procedures, the virtual camera inclination angles CAM_R, CAM_FT, CAM_FB as image correction parameters are computed in accordance with the visual line elevation EYE_P (or the mirror rotation angle MIRROR_R set in accordance therewith) set during the progress of the game. Here, although the computed and partially adjusted CAM_R, CAM_FT, CAM_FB are associated in accordance with the visual line elevation EYE_R at the image correction table 2422, these correction parameters may also be associated with the mirror rotation angle MIRROR_R.

In the image display processing employing these image correction parameters, as shown in FIG. 46, the visual line elevation is set with the visual line elevation setting unit 24101 (in accordance with the dinosaur position with respect to the virtual viewpoint or the parts of the dinosaur which generate attacks during the approach) (ST2991), the mirror rotation angle according to this visual line elevation is designated with the mirror inclination control unit 24102 (ST2992), and the mirror 243 rotates as a result of the stepping motor 241 being controlled (ST2993).

Next, image correction parameters (CAM_R, CAM_FT, CAM_FB, etc.) are designated with respect to the set visual line elevation (ST2994), and drawing of the image captured from the prescribed virtual viewpoint is indicated with the drawing control unit 101 with respect to the set visual line elevation with the image generation indication unit 24104 (ST2995), and this processing is returned to the beginning. In accordance with the indication of drawing, with the drawing control unit 2101, image data corresponding to the 2D image inclined with respect to the visual line EYE_R is generated upon operating data relating to polygons within the (three-dimensional) game space, this image data is written in the frame buffer 2102, and images are projected on the screen 2121 in accordance with the image data on the frame buffer 2102.

According to the present image display processing, the image is suitable corrected in accordance with the position of the portion to be displayed on the screen having a curvature in the upward and downward directions, and the player is thereby able to enjoy a shooting video game while viewing an undistorted image.

The overall structure of the foregoing shooting video game machine and the advantages yielded from the structure thereof may be summarized as follows.

The present shooting video game machine enables the player to play the game while displaying images captured from a virtual viewpoint (virtual camera) in which the player's reference viewpoint position corresponds to the position in the game space. With the present game machine, a mirror is rotated so as to shift the image projected from the projector via the mirror at least in the upward and downward directions in correspondence with the direction of the virtual viewpoint at a portion within the screen continuously curved from the lower part of the approximate front of the reference viewpoint position to the upper part of the approximately top of the reference viewpoint position.

According to the present game machine, since the player's visual line will shift from top to bottom pursuant to the game progress, the player will be able to enjoy a novel game not available conventionally, and this can be realized with a simple structure. Further, since the screen is curved inward in a conical shape, the projection distance is maintained approximately constant, and the size and focus of the projected image can be maintained approximately constant.

Particularly, the screen may be made to curve such that the distance from the reference viewpoint position to the upper part becomes shorter than the distance from the reference viewpoint position to the lower part. According to this structured, the player will feel that the image on the upper part of the screen is approaching him/her, and a unique sense of tension may be yielded.

Further, the player virtually shoots with a gun unit the dinosaur displayed on the screen and corresponding to the size of the screen when it is nearby, and the parts such as the mouth, arms and legs of the dinosaur to virtually attack the player are displayed on the screen. Thus, the player is able to enjoy a shooting game which effectively yields a novel and unique sense of nervousness.

Moreover, since the mirror may be rotated such that a flying dinosaur (or a non-flying dinosaur) afar from the virtual viewpoint is displayed on the lower part of the screen and a flying dinosaur (or the upper part of the non-flying dinosaur) close to the virtual viewpoint is displayed on the upper part of the screen. Thereby, the flying dinosaur (or a non-flying dinosaur) approaching the player from afar may be represented with much vigor and perspective.

With the present game machine, since the acrylic plate for protecting the mirror rotation and the like is inclined and provided such that the virtual image is transmitted toward outside the screen when the real image is projected on the upper part of the screen, the player will not be distracted with the virtual image needlessly appearing on the screen.

In addition, when the player detection sensor becomes a prescribed detection state, the virtual viewpoints are moved so as to surround the periphery of the dinosaur within the game space, and the player's movement to the left and right may be conveyed within the game space naturally, and the amusement of the game will be enhanced thereby.

Further, particularly in relation to the detection of the muzzle direction, the structure and effect of the foregoing video game machine may be summarized as follows.

With the present shooting video game machine, the input corresponding to the shooting of the dinosaur displayed on the screen is conducted with the operation of the trigger in the gun unit, the CCD image of the imaged range corresponding to a part of the screen is generated with the CCD camera in the vicinity of the muzzle of the gun unit, and, in the least, when the trigger is pulled, the image of one marker among the plurality of markers disposed on the screen so as to hold a prescribed positional relationship is identified within the generated CCD image, and the shooting position on the screen corresponding to the approximate center of the imaged range is computed from the image position and rotation angle of the marker.

According to the present game machine, since the shooting position is computed upon identifying which part of the screen is being imaged from the image position and angle relationship of the marker in the CCD image, the direction of the gun unit can be detected smoothly with respect to the screen (which does not fit within the CCD image).

The detection of the gun unit direction is performed with respect to the screen curved inward and having a conical shape, an image to be the target of shooting is displayed at a portion of the top or bottom of the screen, and the image is shifted upward or downward in accordance with the direction of the virtual viewpoint. Thus, realized is a shooting game abundant in amusement and vigor.

Further, particularly in relation to the correction of images, the structure and effect of the foregoing shooting video game machine may be summarized as follows.

The present shooting video game machine enables the player to play the game while displaying images captured from a virtual viewpoint in which the player's reference viewpoint position corresponds to the position in the game space. With the present game machine, a mirror is rotated so as to shift the image projected from the projector via the mirror at least in the upward and downward directions in correspondence with the direction of the virtual viewpoint at a portion within the screen continuously curved from the lower part of the approximate front of the reference viewpoint position to the upper part of the approximately top of the reference viewpoint position. Further, the approximately vertical image that may be captured with the virtual viewpoint is corrected to become an image that may be obtain with a larger inclination the farther it is shifted upward on the screen when the lower side approaches the virtual viewpoint.

Particularly, this inclination angle may be made to be the same angle as the rotation angle of the projected image on the screen.

According to the present game machine, since appropriate correction is conducted in accordance with the mirror rotation, the image projected on the screen will not be distorted when viewed by the player.

Moreover, by setting an image correction parameter for designating the virtual camera rotation in accordance with the mirror rotation (or the visual line elevation set during the game progress) to the image drawing processor, the effective correction of images may be realized with a simple control.

A modified example of the shooting video game machine pertaining to the second embodiment is described below.

Figure 50:
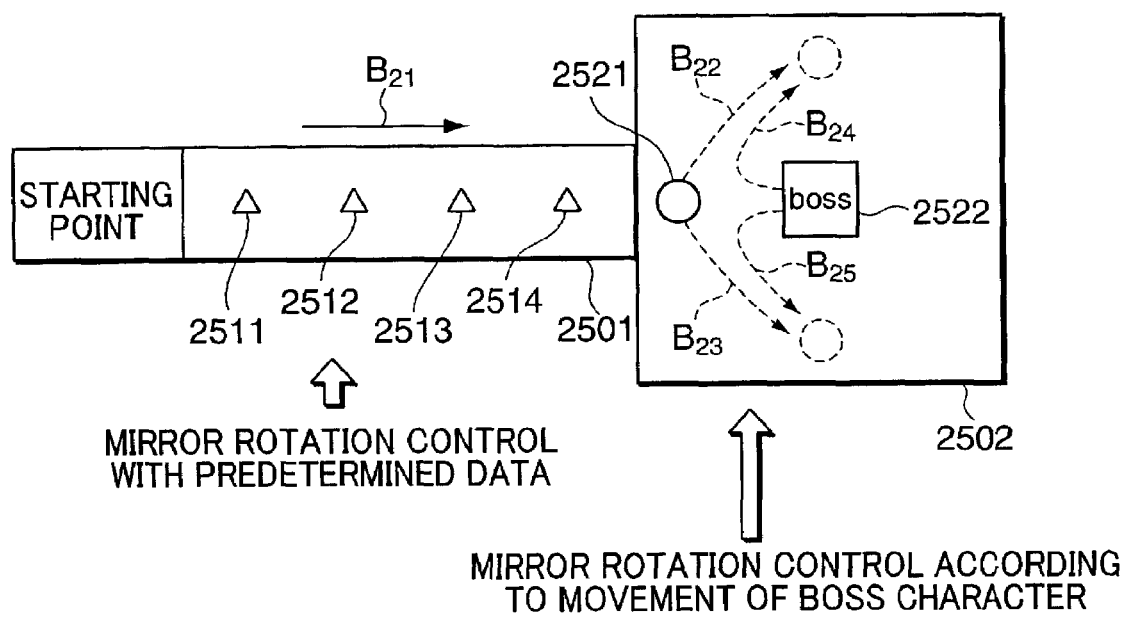
FIG. 50 is a diagram for explaining the rotation control of the mirrors corresponding respectively to the two areas in which one stage is divided with the first modified example of the shooting video game machine in the second embodiment.

FIG. 50 is a diagram for explaining the rotation control of the mirrors corresponding respectively to the two areas in which one stage is divided with the first modified example of the shooting video game machine.

In this game machine of the modified example, an area 2501 corresponding to the first half of the first stage and an area 2502 corresponding to the second half are assumed, and the player shoots small dinosaurs and flying dinosaurs (ordinary enemy characters) in the first half area 2501 and shoots the foregoing enormous dinosaurs (enemy character corresponding to the boss character) in the second half area 2502.

In the area 2501 within the game space, the virtual player (virtual viewpoint) will move in the direction of arrow $B_{21}$ at a speed designated in advance. An enemy character appears when the virtual player passes through prescribed positions 2511 to 2514, and the player virtually shoots at the display of such enemy character with the gun unit 210. When the player detection sensors 251 to 254 respond, the player is made to move a relatively small distance to the left or right within the game space just enough to avoid the attack from the enemy character, and the mirror for determining the position of the projected image on the screen is rotated based on the data designated in advance.

In the area 2502 within the game space, the player avoids the attack of the boss character 2522 approaching the virtual player 2521 within the game space by making the player detection sensors 251 to 254 respond and moving in the arrow $B_{22}$ or arrow $B_{23}$ direction, and the player shoots at the display of the boss character by operating the gun unit. The boss character 2522 will move in the arrow $B_{24}$ or arrow $B_{25}$ direction so as to follow the moving virtual player 2521.

Here, the player is made to move a relatively large distance upon the response of the player detection sensors 251 to 254 (movement so as to move around the left or right side of the dinosaur, and the a different distance range such as 5 meters, 20 meters, etc. is set in accordance with the stage), and the mirror is rotated in accordance with the distance between the boss character and the virtual viewpoint as described above, or in accordance with the portion in the boss character is to make the attack.

With the game machine of the present modified example, since the distance of movement upon the player detection sensors 251 to 254 responding and the method of mirror rotation control is differed, the player is able to enjoy a shooting game abundant in changes and unwearying.

Figure 51:
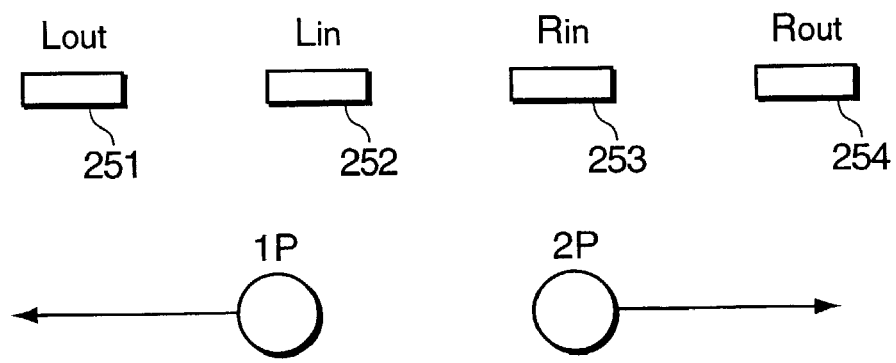
FIG. 51 is a diagram for explaining the detection of the player's position with the player detection sensor with the second modified example of the shooting video game machine in the second embodiment.

FIG. 51 is a diagram for explaining the detection of the position of player (during the two player game with 1P player and 2P player) with the player detection sensors 251 to 254 with the second modified example of the shooting video game machine.

With the game machine of the present modified example, during a two player game, the two virtual players within the game space share the same fate, and move in the same direction. When it is detected that 1P player (left side player) moved from the reference position in front of the player detection sensor 252 on the inner left side to the front of the player detection sensor 252 on the outer left side, this is deemed as the player moving around to the left side of the dinosaur, and the coordinates of the two virtual players are set within the game space. Moreover, when it is detected that 2P player (right side player) moved from the reference position in front of the player detection sensor 253 on the inner right side to the front of the player detection sensor 254 on the outer right side, this is deemed as the player moving around to the right side of the dinosaur, and the coordinates of the two virtual players are set within the game space.

With the shooting video game machine of the present modified example, since the coordinates of the virtual players are set in accordance with the movement of the two players, unique amusement in the game progress may be yielded upon the mutual cooperation of the players.

Figure 52:
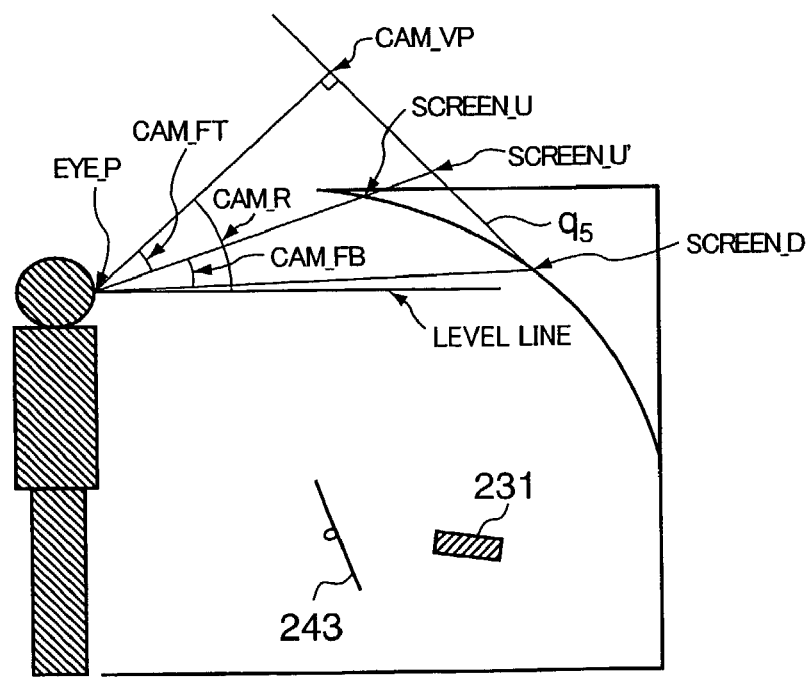
FIG. 52 is a diagram showing the image correction parameter set in the shooting video game machine of third modified example in the second embodiment.

FIG. 52 is a diagram shown the image correction parameter set in the shooting video game machine of the third modified example.

With the game machine of the present modification, SCREEN_U' is set on the extension of $q_1$, shown in FIG. 49C, and CAM_VP is set forth on the straight line $q_5$ passing through SCREEN_D and SCREEN_U', CAM_R will become even smaller. By suitably adjusting the size of CAM_R to make CAM_R smaller or larger as described above, a natural image matching the player's reference viewpoint position may be generated, and an image yielding further vigor may be generated.

In addition to each of the foregoing embodiments, the present invention may be adopted in the following modified examples.

(1) With the shooting video game machine in each of the foregoing embodiments, images from the projector are projected on the screen upon being reflected with a mirror. Nevertheless, without using a mirror, images from the projector may be directly displayed on the screen upon changing the inclination angle of the projector, and it could be said that this offers an even simpler structure.

(2) Although each of the foregoing embodiments showed examples employed in a shooting game machine, the present invention is not limited thereto, and, for example, may assist in the bi-directional information communication by designating the subject on the screen with images (including text images). Notwithstanding the image display surface, this may also be employed in a mode of designating the desired position of the face of the area to become the designation. Here, in addition to being employed as a simulated gun, the controller may be adopted in other modes in accordance with the purpose thereof.

(3) The screen of the display unit displaying images is not limited to a projection screen, and may be employed in various display faces; for instance, television monitors, liquid crystal monitors, monitor screens of personal computers and so on. Further, in addition to the designation of the screen position and the like, this may also be employed in the operational designation of other various devices and equipment. For example, when employed in an operation button of a device, remote operational designation becomes possible by orienting such direction as the drive designation of the operation member.

(4) The dimensions and size of the marker are irrelevant in the present invention. A marker of various sizes may be adopted in consideration of the size of the controller to be employed. Moreover, the shape and form of the marker are not limited to an aggregate of dotted bodies, and may be of a pole shape. In the case of such pole shape, a processing execution unit for specifying the position of both ends thereof will further become necessary. In other words, the pole shape (continuity) is recognized from the picture image, and the position data (address within image memory) may be specified by detecting both sides thereof.

In addition, particularly, the dimension data of the respective dotted light sources (LEDs) of the marker is not considered. In other words, if the luminescent spot distance data of the picture image (or the interval data of the LEDs when the CCD camera 213 is at a reference position) with the CCD camera 6 when the controller 10 is at a reference position is previously stored as reference data, computation processing will be enabled in the subsequent measurements with the comparison with the reference data. Minute fluorescent tubes may be employed as the pole shaped body, and various objects may be adopted in the case of a reflector. Further, the mode may use both a dotted body and a pole shaped body. With respect to the marker (or an L frame), a marker (or L frame) may be formed by taking two pole shaped bodies each with a prescribed dimension, preferably the same dimension, and making the mutual ends thereof coincide or adjacent and disposing them to be in an intersecting direction, and disposing at least one dotted body as an extension of the other end of such one pole shaped body a prescribed distance apart. With the foregoing case, in a mode where two pole shaped bodies are disposed such that the mutual one ends are made to be adjacent; that is, apart from each other in a prescribed distance, the dotted body is not necessarily required. The recognizable position of the pole shaped body is the end and flection thereof, and is extracted from the picture image imaged with the CCD camera 6 (or CCD camera 213). Moreover, when a color CCD is used as the CCD camera 6 (or CCD camera 213) in a case where two pole shaped bodies are disposed such that the mutual one ends thereof are made to coincide, if a pole shaped body which emits a different color in the middle as the pole shaped body of one of the axes is connected and adopted, the four points of the two ends, the flection and the portion having differing luminescent colors may be recognized, which is effective as the marker (L frame).

(5) The marker (or L frame) shown in the foregoing embodiments is not influenced by the shape or size of the game screen or display screen, and versatility is high since there is only one analyzing method.

(6) In each of the foregoing embodiments, although an LED was employed as the illuminator as the light source, a reflector capable of reflecting the incident light from the front may be adopted instead. This structure offers a mode in which the likes of an illuminator (mounted at a prescribed position or on the controller 10 and screen 212, respectively) reflects the light from the front of the controller 10 (or the screen 2121) to which a reflector is provided, and the light reflected (emitted) from the reflector is received with the imaging means. Thereby, since it is no longer necessary to directly mount an illuminator to the controller 10 (or the screen 2121), the structure becomes simple and the versatility high. Preferably, the shape of the reflector is of a semicircle or the like capable of generating reflected light at a desired width. When employing this in a controller, the movable range of the controller is not restricted needlessly, and the operability of the controller may be improved thereby. The structure may also extend the reflection range by generating a diffused reflection with the surface processing with respect to the reflective surface.

(7) The light source (illuminator, reflector) is not limited to an infrared light, and light of a desired color may be employed. For example, the color may be R (red), G (green) or B (blue), and may also be of another color. When using three markers, in addition to using markers with different colors, when a color CCD capable of receiving light of the respective colors is used as the CCD camera, the disposition of the respective markers may be recognized. As a result, individual light-up control as described in the present embodiment will no longer be necessary, and there is an advantage in that the light may always be turned on. Needless to say, it is not necessary to simultaneously use three colors worth, and markers of desired colors may be adopted in accordance with the use thereof.

(8) Further, although various shapes for markers may be considered, those basically containing the element of dotted light source is included in the concept of dotted light source.

(9) Moreover, in each of the foregoing embodiments, although the facilitation of computation was sought by intersecting the vertical and horizontal axes (one axis and other axis), this is not limited such intersection, and a desired intersecting angle may be set in accordance with the type of controller 10 (or screen 2121).

(10) With the shooting video game machine pertaining to each of the foregoing embodiments, although two player detection sensors were provided to the left and right, one each or three or more may also be provided. Upon advancing to the next stage after clearing the respective stages, when a player is to select one route among a plurality of routes (having different settings of the dinosaur or background) set in advance, the selection may be input with these player detection sensors.

(11) Further, regarding the avoidance movement with the player detection sensor, in addition to the movement to the left and right, the movement may be to duck below, or the lower right oblique direction or lower left oblique direction. This is because the player will not be able to avoid the attack by moving left and right when the attack of the enemy character is of a movement where the arm or tail is whipped in the lateral direction. For example, if the player detection sensor on the left outer side is turned on, the movement may be automatically switched in accordance with the scene such that the attack is avoided by ducking below.

(12) When the screen of the shooting video game machine of each of the foregoing embodiments is extended to the upper part of the player on the play area and disposed so as to cover the player, the player will be of a posture of looking up at the image when viewing the image on the upper part, and this will yield a further feeling of tension. In addition to the curvature portion, a straight line portion may be included in the screen.

(13) Moreover, although the inclination angle of the acrylic plate of the shooting video game machine of each of the foregoing embodiments was set to roughly 10°, this may be suitably adjusted such that the virtual image is projected outside the screen in accordance with the position of the mirror, projector and screen.

(14) With the shooting video game machine of the second embodiment, although the mirror rotation angle with respect to the visual line elevation was associated in advance upon displaying images and the image correction parameter was stored in advance, the parameters may be successively operated according to the procedure shown in FIG. 46. In addition, the whole or a part of the screen to which the image subject to correction is to be projected may incline upward or downward or curve or incline left and right or obliquely, or be made of a semicircle shape. Additionally, upon projecting to the overall screen curving (up/down, left/right, or in a semicircle), the overall screen may be divided in several areas and correction may be conducted as described above in accordance with the position of the respective areas. Further, a front screen and at least two screens inclining obliquely (when viewed from the player) may be disposed left/right or up/down so as to surround the player, and correction as described above may be conducted to the display of the two screens inclining obliquely upon continuously displaying on these three screens.

(15) Further, with the shooting video game machine of each of the foregoing embodiments, although only a portion of the dinosaur to make the attack was partially displayed upon approaching the virtual viewpoint, a location to which the player should pay attention during the game progress may be displayed while facing the direction of the virtual viewpoint within the game space.

(16) Moreover, with the shooting video game machine of each of the foregoing embodiments, although the mirror axis for rotating the mirror was set to be a single axis in order to shift the projected image in the upward and downward directions on the screen, for example, two mirror axes may be provided in order to shift the projected image in the upward/downward as well as the leftward/rightward directions on the screen.

(17) As shown in each of the foregoing embodiments, provided is a highly versatile orientation detection device enabling two-player games and the simultaneous computation of directions even in cases where there are a plurality of controllers.

(18) Since the structure is such that analysis is conducted with a three-dimensional matrix, this may be sufficiently employed in a mode of the controller shifting in a three-dimensional space. Thus, the applicable range may be broadened.

(19) With the second embodiment, although four markers 26 to 29 were disposed on the screen 2121, the disposition of one or two markers will suffice depending on the screen size and visual field of the CCD camera 213, and it is not necessary to dispose them in equal spacing.

(20) Two types of L-shaped markers having a mirror surface relationship (vertical axis or horizontal axis) may be adopted as the marker capable of being employed in the second embodiment. Here, since these are individually distinguishable; that is, since it is possible to distinguish the arrangement position, individual light-up control as in the present embodiment is no longer required. In addition, in a mode where the rotational range of the controller is 180° or less, four-types of L frames having a mirror surface relationship with respect to the vertical axis and a mirror surface relationship with respect to the horizontal axis may be employed, and, since these are individually distinguishable; that is, since it is possible to distinguish the arrangement position, individual light-up control as in the present embodiment is no longer required at all. In other words, enabled is a mode where the disposition of orientation detection markers of different types (2 types or 4 types) having a mode in which the other axis with respect to the one axis of the biaxial direction includes mutually reverse axis information on the target area surface (screen, etc.) with a prescribed positional relationship. According to this, by employing differing orientation detection markers having a common basic form (in which the main axis and sub axis intersect), processing for individually identifying the same type of markers upon using the same will no longer be necessary.

Further, as another arrangement mode of markers, when providing an example with the arrangement of the present embodiment (four locations in the vertical direction of the left, right and center of the screen), two types of L frames or markers (among the foregoing four types) having a mirror surface relationship with respect to the vertical axis may also be disposed at a symmetrical position on the left and right side of the screen. In addition, since the two rows worth of markers adjacent in the upward and downward direction are mutually different types of markers, light-up control may be performed with three combination units; namely, the combination of the first row and second row, the combination of the second row and third row, and the combination of the third row and fourth row. Similarly, this may be employed in cases when the three types of L frames or the four types of L frames of mutually different types are disposed adjacently in unit of the number of types of L frames.

(21) The markers are not limited to fixed types. For example, in the present embodiment, one slit is provided in the vertical direction of the screen 2121, markers are disposed so as to sandwich this slit, guide rails for sliding the markers along the slit are provided, and the markers are structured to be shiftable in the vertical direction while managing the position vertically with a drive means such as a motor. Thus, if the motor is driven so as to follow the position of the projected image, a single marker will realize the four markers in the present embodiment, and this may be treated as though existing in more numerous positions. Thus, the number of markers used may be reduced.

(22) In the second embodiment, although the projected image was drawn on the front face of the screen 2121, a mode is also possible to draw the game image in which the image from the projector is projected on both the front and back faces depending on the shape of the screen. Here, in order to concurrently use the markers on both the front and back faces of the screen and enable the imaging with the CCD camera, for example, markers comprising the respective LEDs may be integrally mounted, or individual LEDs may be preferably mounted on the entire face through the pores penetrating the radial thickness of the screen, and light from the light-emitting unit of the LED may be structured so as to be capable of emitting to both the front and back faces of the screen (this is the same in the case of a reflector, and, for example, this may be mounted within the radial thickness such that the reflective surface exposes half of the spherical member on both sides. According to this structure, a game may be played upon using both the front and back faces of the screen, and, for instance, the image from the front of the dinosaur will be displayed on the front face and the image from the rear of the dinosaur will be displayed when moving toward the back face of the screen. Thus, provided is a highly amusing game with realism. In addition, since the markers will be of the three shapes having a mirror surface relationship with respect to the vertical axis with the front face and back face of the screen, the front or back of the screen may be automatically detected merely be recognizing the image from the CCD camera, and it is not necessary to additionally provide a human body sensor for detecting the circular movement of the player.

(23) Moreover, although various shapes for markers may be considered, those basically containing the element of dotted light source is included in the concept of dotted light source.

In summary, the present invention was devised in view of the foregoing problems, and the object thereof is to provide an orientation marker capable of remotely measuring the movement, particularly the orientation, of a controller having a simple structure, which may be employed in a more sophisticated game, and which is highly versatile; an orientation detection device for remotely measuring the orientation (posture) of the controller with such orientation detection marker; and a video game device employing the above.

In order to achieve the foregoing object, the orientation detection marker according to the present invention is provided in either one of the device main body and a controller for performing input operations as being pointed to a screen of a display unit provided to the device main body for displaying images, for detecting the orientation of the controller with respect to the screen, and which supplies information for computing said orientation to a picture image generated by imaging means provided in the other of the device main body and the controller, wherein said orientation detection marker comprises a light source having a mode including biaxial direction information.

According to the foregoing structure, a picture image is generated with the imaging means provided to the device main body side and one of the controllers. An image of the orientation detection markers is contained in the picture image. Since the orientation detection marker includes biaxial direction information, in addition to the position information of the controller, and (rotation) inclination centered around the axis of orientation of the controller; that is, rotation angle information is also included in the picture image. Thus, the orientation of the controller with respect to the screen may be computed from this position information and rotation angle information.

Further, it is preferable that the two axes are orthogonal to each other. According to this, the computation will become simplified since it is no longer necessary to employ a trigonometric function for positional computation. According to the invention with the above features, the computation will become simplified since it is no longer necessary to employ a trigonometric function for positional computation and a positional information can be directly obtained thus the calculation can be simplified.

Moreover, it is preferable that the light source is formed of a plurality of dotted light sources. According to this, the orientation detection marker may be made simply and inexpensively by structuring it from a dotted light source capable of identifying biaxial direction information.

According to the invention with the above feature, the orientation detection marker may be made simply and inexpensively by structuring it from a dotted light source capable of identifying biaxial direction information and the positional information can be directly obtained, thus the calculation is made easy.

In addition, the light source may emit light of a specific color. According to this, employed may be a marker capable of emitting light of a desired color in accordance with the purpose of use. According to the invention with the above features, employed may be a marker capable of emitting light of a desired color in accordance with the purpose of use.

Further, the plurality of dotted light sources may be formed by first and second light source units for specifying the first two points and second two points separated by a prescribed dimension on one axis and a third light source unit for specifying the third two points separated by a prescribed dimension on another axis being disposed on the orientation detection marker mounting section for mounting the orientation detection marker.

According to this, regarding the first to third light source units, since two will be in one axis direction and one will be in the other axis direction, specified are the respective positions of the first two points and the second two points of the first and second light source units from the image corresponding within the picture image as the mapping images with the imaging means and the position of the third two points of the third light source. Thus, detected will be the inclination of one axis in the axis periphery parallel at least to the other axis and the rotation angle against the reference angle position on the surface formed from the one axis and the other axis. If the arrangement position of the imaging means and the position of the device main body with respect to the imaging means is associated in advance, in the least, the orientation of the controller may be computed from the picture image. According to the invention claimed in claim 5, specified are the respective positions of the first two points and the second two points of the first and second light source units and the position of the third two points of the third light source from the image corresponding within the picture image. Thus, detected will be the inclination of one axis in the axis periphery parallel at least to the other axis and the rotation angle with respect to the reference angle position on the surface formed from the one axis and the other axis, and the orientation of the controller will be computed thereby.

Moreover, the dimension between the first two points and the dimension between the second two points may be set to be equal. According to this, the computation for detecting the orientation of the controller may be simplified. According to the invention with the above features, the computation for detecting the orientation of the controller may be simplified.

In addition, the first and second light source units may share the inner two dotted light sources on the axis. According to this, since the dotted light sources are shared, the number of dotted light sources may be reduced by one. According to the invention with the above features, since the dotted light sources are shared, the number of dotted light sources may be reduced by one.

Further, one of the dotted light sources may be provided for common use at the intersecting point of the two axes. According to this, since the dotted light source of the intersecting point of the two axes is shared, the number of dotted light sources may be reduced by one. According to the invention with the above features, since the dotted light source of the intersecting point of the two axes is shared, the number of dotted light sources may be reduced by one.

Moreover, disposed may be a fourth light source unit for specifying the fourth two points separated by a prescribed dimension on the other axis. According to this, by adding the fourth two points, the inclination of the axis periphery parallel to one axis of the controller may also be detected. As a result, even when the controller is of a structure capable of being rotationally operated with respect to both the one axis and other axis; that is, in a synthesized direction, the foregoing orientation may be computed with respect to every orientation. According to the invention with the above features, by adding the fourth two points, the inclination of the axis periphery parallel to one axis of the controller may also be detected. As a result, even when the controller is of a structure capable of being rotationally operated with respect to both the one axis and other axis; that is, in a synthesized direction, the foregoing orientation may be computed with respect to every orientation.

In addition, the dimension between the third two points and the dimension between the fourth two points may be set to be equal. According to this, the computation is simplified since position information can be directly obtained. According to the invention with the above features, the computation is simplified since position information can be directly obtained.

Further, the third and fourth light source units may share the inner two dotted light sources on the axis. According to this, since the dotted light source is shared, the number of dotted light sources may be reduced by one.

According to the invention with the above features, since the dotted light source is shared, the number of dotted light sources may be reduced by one.

Furthermore, the fourth light source unit may include a dotted light source at the fourth two points. With this feature, the orientation detection marker can be easily and inexpensively made and the positional information can be directly obtained thus the calculation can be made easy.

Moreover, the dotted light source may be an illuminator. According to this, regardless of the peripheral brightness, the dotted light source may be accurately imaged with the imaging means. According to the invention with the above features, regardless of the peripheral brightness, the dotted light source may be accurately imaged with the imaging means.

In addition, the dotted light source may be a reflector capable of reflecting the incident light from the front. According to this, light is emitted with the likes of an illuminator from a prescribed position, and the light reflected (emitted) from the reflector may be received with the imaging means. It is therefore not necessary to wear the dotted light source, and it is no longer necessary to prepare wiring such as the power source line for the light source upon establishing the dotted light source. As a result, the structure of the device will become simplified, light, and the versatility will improve. Preferably, the shape of the reflector is of a semicircle or the like capable of generating reflected light at a desired width. When employing this in a controller, the movable range of the controller is not restricted needlessly, and the operability of the controller may be improved thereby.

According to the invention with the above features, light is emitted with the likes of an illuminator from a prescribed position, and the light reflected (emitted) from the reflector may be received with the imaging means. It is therefore not necessary to wear the dotted light source, and it is no longer necessary to prepare wiring such as the power source line for the light source upon establishing the dotted light source. As a result, the structure of the device will become simplified, light, and the versatility will improve.

Further, the dotted light source may emit infrared light. According to this, erroneous detection or erroneous computation may be prevented since influence by disturbance light will become difficult. According to the invention with the above features, erroneous detection or erroneous computation may be prevented since influence by disturbance light will become difficult.

Moreover, the orientation detection marker mounting section is formed with the dotted light source being exposed on both the front and back sides. According to this, also applied may be a mode of making the controller function upon employing both the front and back sides.

According to the invention with the above features, also applied may be a mode of making the controller function upon employing both the front and back sides.

In addition, provided may be a fifth light source for representing the front and back of the orientation detection marker. According to this, although the relationship of the respective light source units will become the mirror face position relationship at the front and back sides of the orientation detection marker, the addition of the fifth light source unit will enable the distinction even when there is a possibility of the front and back become uncertain due to the rotation angle or the like of the orientation detection marker. According to the invention with the above features, although the relationship of the respective light source units will become the mirror face position relationship at the front and back sides of the orientation detection marker, the addition of the fifth light source unit will enable the distinction even when there is a possibility of the front and back become uncertain due to the rotation angle or the like of the orientation detection marker.

Further, the fifth light source unit may be formed of one dotted light source. According to this, the mere addition of one dotted light source as the fifth light source unit will enable the judgment of front and back. According to the invention with the above features, the mere addition of one dotted light source as the fifth light source unit will enable the judgment of front and back.

Moreover, the dotted light source of the fifth light source unit is formed from one of the dotted light sources structuring the first through fourth light source units and has a light-emitting mode different from the other dotted light sources. According to this, one of the dotted light sources previously disposed may be shared as the fifth light source unit with its light-emitting mode being different from the others, and this will prevent the increase in the number of dotted light sources. In a mode where the dotted light source is disposed at the intersecting point of the one axis and other axis, this dotted light source of the intersecting point will not be the fifth light source unit. According to the invention with the above features, one of the dotted light sources previously disposed may be shared as the fifth light source unit with its light-emitting mode being different from the others, and this will prevent the increase in the number of dotted light sources.

In addition, the different light-emitting mode may be a color difference. According to this, the display will be distinguishable from the existing position of the dotted light source of a different color. According to the invention with the above features, the display will be distinguishable from the existing position of the dotted light source of a different color.

Further, the different light-emitting mode may flash (blink). According to this, the display will be distinguishable from the existing position of the flashing dotted light source. According to the invention with the above features, the display will be distinguishable from the existing position of the flashing dotted light source.

21 Moreover, the orientation detection device according to the present invention comprises: imaging means that is provided in either one of a controller and the device main body comprising a display unit having a screen for displaying images and images an orientation detection marker; identification means for identifying an image of a mode containing the biaxial direction information included in the picture image imaged by the imaging means; and computing means for computing the orientation of the controller with respect to the screen of the display unit from the state of the image of the identified mode.

According to the invention claimed in claim 21, the orientation with respect to the screen of the display unit of the controller may be sought though operation.

22 In addition, the orientation of the controller is preferably computed based on the image position of the mode identified with the identification means and the rotation angle information of the axis. According to this, the position on the screen to which the controller is facing; that is, the intersecting point may be computed from the position information and rotation angle information.

According to the invention claimed in claim 22, the position on the screen to which the controller is facing; that is, the intersecting point may be computed from the position information and rotation angle information.

Further, an orientation detection marker may be disposed on the controller, and imaging means may be disposed on the display unit. According to this, the picture image of the orientation detection marker may be obtained with the imaging means pursuant to the orientation movement of the screen by the controller. According to the invention with the above features, the picture image of the orientation detection marker may be obtained with the imaging means pursuant to the orientation movement of the screen by the controller.

Moreover, the computing means may continuously seek the orientation. According to this, the movement (distance and speed of movement) of the controller may be computed from a plurality of times worth of direction information and position information. According to the invention with the above features, the movement (distance and speed of movement) of the controller may be computed from a plurality of times worth of direction information and position information.

In addition, the screen may be a screen to which is displayed images projected from a projector. According to this, a desired position on the screen may be designated.

According to the invention with the above features, a desired position on the screen may be designated.

Further, an orientation detection marker may be disposed on the display unit and imaging means is disposed on the controller. According to this, the picture image of the orientation detection marker may be obtained with the imaging means pursuant to the orientation movement of the screen by the controller. According to the invention with the above features, the picture image of the orientation detection marker may be obtained with the imaging means pursuant to the orientation movement of the screen by the controller.

Moreover, the orientation detection marker may be capable of being disposed on the screen of the display unit. According to this, there is an advantage in that the operational expression will be simplified since this will be the same surface as the screen. According to the invention with the above features, there is an advantage in that the operational expression will be simplified since this will be the same surface as the screen.

In addition, the orientation detection marker contains a different type of orientation detection marker having a mode including axis information in which the other axes are mutually reverse with respect to one of the two biaxial directions, and these different types of orientation detection markers are respectively disposed in a prescribed position relationship with respect to the display unit. According to this, by employing the different types of orientation detection markers sharing the basic mode, processing for individually identifying the same types of markers to be used will no longer be necessary.

According to the invention with the above features, by employing the different types of orientation detection markers sharing the basic mode, processing for individually identifying the same types of markers to be used will no longer be necessary.

Further, the orientation of the controller is computed based on the position information within the screen with respect to the center of the picture image based on the image of the light source unit and the rotation angle information of the axis. According to this, the center of the picture image; that is, the intersecting point on the screen to which the controller is facing, may be computed from the position information and rotation angle information. According to the invention with the above features, the center of the picture image; that is, the intersecting point on the screen to which the controller is facing, may be computed from the position information and rotation angle information.

Moreover, the computing means computes the visual line vector representing the direction of the screen of the imaging means based on the position information of the dotted light source, image of the light source unit within the picture image, and rotational angle information of the axis, and further computes the intersecting point of the visual line vector and the screen. According to this, the center of the picture image; that is, the intersecting point on the screen to which the controller is facing, may be computed from the position information and rotation angle information even with a simple structure.

According to the invention with the above features, the center of the picture image; that is, the intersecting point on the screen to which the controller is facing, may be computed from the position information and rotation angle information even with a simple structure.

The video game device according to the present invention comprises: the orientation detection device; image generation control means for generating game images containing at least a game character; image display means for displaying the generated game images on the screen of the display unit; and game progress control means for progressing the game by providing movement in accordance with prescribed game rules to the game character within the game space; wherein the game progress control means provides movement regarding the orientation of the controller to the game character based on the relationship between the orientation of the controller sough with the computing means and the display position on the screen of the display unit of the game character. According to this, it is possible to remotely provide a movement regarding the orientation of the controller to the game character based on the relationship between the direction of the controller and the display position of the game character on the screen of the display unit.

According to the invention with the above features, it is possible to remotely provide a movement regarding the orientation of the controller to the game character based on the relationship between the direction of the controller and the display position of the game character on the screen of the display unit.

This application is based on Japanese patent applications serial Nos. 2001-242819 and 2002-036791, filed in Japan Patent Office on Aug. 9, 2001 and Feb. 14, 2002, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An orientation indicating marker provided in a device; the device including a main body, a screen provided on the main body of the device for displaying images, a controller responsive to an input operation for aiming a target on an image displayed on the screen, the orientation indicating marker provided on either one of the main body of the device and the controller, and an imaging means provided on the other of the main body of the device and the controller for picking-up an image of the orientation indicating marker; and said orientation indicating marker comprising a plurality of light sources arranged along biaxial directions such that the imaging means pick-ups the images of the light sources to determine the target aimed by the controller.

2. An orientation indicating marker according to claim 1, wherein two axes of said biaxial directions are orthogonal to each other.

3. An orientation indicating marker according to claim 1, wherein said light sources are formed of a plurality of point light sources.

4. An orientation indicating marker according to claim 1, wherein said light sources emit light of a specific color.

5. An orientation indicating marker according to claim 1, wherein said hi-axial direction are defined by a first axis and a second axis which is orthogonal to the first axis, said plurality of light sources include a first unit of point light sources arranged on the first axis with a predetermined space between adjacent point light sources, a second unit of point light sources arranged on the first axis with a predetermined space between adjacent point light sources, and third unit of point light sources arranged on the second axis with a predetermined space between adjacent point light sources.

6. An orientation indicating marker according to claim 5, wherein the space between said adjacent point light sources of the first unit is equal to the space between said adjacent point light sources of the second unit.

7. An orientation detection marker according to claim 5, wherein said first and second light source units comprise a common point light source.

8. An orientation indicating marker according to claim 5, wherein the first and second axes intersect with each other; and an element of the first and second units is a common point light source is disposed at the intersecting point of the two axes.

9. An orientation detection marker according to claim 5, further comprising a fourth light source unit of point light sources arranged on the second axis with a predetermined space between adjacent point light sources.

10. An orientation indicating marker according to claim 9, wherein the space between said adjacent point light sources of the third unit is equal to the space between said adjacent point light sources of the fourth unit.

11. An orientation indicating marker according to claim 10, wherein said third and fourth light source units comprise a common point light source.

12. An orientation indicating marker according to claim 9, further comprising a fifth light source unit for representing the front and back side of the orientation detection marker.

13. An orientation indicating marker according to claim 12, wherein said fifth light source unit includes a single point light source.

14. An orientation indicating marker according to claim 13, wherein said fifth light source unit comprises one of the point light sources of the first through fourth light source units and has a light-emitting mode that is different from that of the other point light sources.

15. An orientation indicating marker according to claim 14, wherein said point light source of the fifth light source unit emits light that is different in color from the other point light sources.

16. An orientation indicating marker according to claim 14, wherein said point light source of the fifth light source unit blinks while the other point light sources emit light continuously.

17. An orientation indicating marker according to claim 5, further comprising a mounting section in which said point light sources are mounted to be exposed on both the front and back sides of the mounting section.

18. An orientation indicating marker according to claim 1, wherein said point light sources includes a light emitting member.

19. An orientation indicating marker according to claim 1, wherein each of said light sources includes a reflector capable of reflecting light which is incident thereon from a front thereof.

20. An orientation indicating marker according to claim 1, wherein each of said light sources includes an infrared light emitting member.

21. An orientation detection device provided in a device; the device including a main body, a screen provided on the main body of the device for displaying images, and a controller responsive to an input operation for aiming a target on an image displayed on the screen;

the orientation detection device comprising:

an orientation indicating marker provided on either one of the main body of the device and the controller, and an imaging means provided on the other of the main body of the device and the controller for picking-up an image of the orientation indicating marker, said orientation indicating marker comprising a plurality of light sources arranged along biaxial directions such that the imaging means pick-ups the images of the light sources to determine the target aimed by the controller.

22. An orientation detection device according to claim 21, further comprising a computing means for computing the target aimed by said controller based on the positions of the images of light sources picked up by said imaging means and an angle of rotation of axes for the bi-axial directions.

23. An orientation detection device according to claim 22, wherein said computing means continuously seeks said orientation.

24. An orientation detection device according to claim 22, wherein said computing means computes a vector of a line of sight representing a direction of said imaging means relative to said screen, based on the positions of said point light sources, positions of the images of the light source units within said picture image, and rotational angle of the axes, and further computes a point where said vector of the line of sight intersects said screen.

25. An orientation detection device according to claim 21, wherein an orientation indicating marker is disposed on said controller, and said imaging means is disposed on said main body of the device.

26. An orientation detection device according to claim 21, wherein said screen is a screen on which is displayed images projected from a projector.

27. An orientation detection device according to claim 21, wherein an orientation indicating marker is disposed on said main body of the device and imaging means is disposed on said controller.

28. An orientation detection device according to claim 27, wherein said orientation indicating marker is disposed on the screen of said display unit.

29. An orientation detection device according to claim 27, wherein said orientation indicating marker includes different types of orientation indicating markers having different modes including axis information in which one of the two axes of said biaxial directions intersects the other axis in mutually reverse directions, and these different types of orientation detection markers are respectively disposed in a prescribed position relationship with respect to said display unit.

30. An orientation detection device according to claim 27, wherein the orientation of said controller is computed based on the positions of the images of the light sources within said screen, with respect to the center of a picture image displayed on the screen and the angle of rotation of the axes.

31. An orientation detection device comprising:
  a body including a screen and a display unit for displaying images on said screen;
  a controller;
  a detection marker disposed on one of said body and said controller;
  said detection marker including a biaxial light source and providing images relating to directional information, said light source including illuminating elements, said elements being disposed in a mutually fixed configuration;
  said directional information defining a mode of said light source;
  imaging means for receiving said images, said imaging means being disposed in the other of said device body and said controller; and
  said detection marker being directed at said imaging means so that the device detects the orientation of the controller with respect to the screen and said imaging means generates an image of said detection marker.

32. An orientation detection device comprising:
  a body including a screen and a display unit for displaying images on said screen;
  a controller;
  a detection marker disposed on one of said body and said controller;
  said detection marker including a biaxial light source and providing images relating to directional information, said light source including illuminating elements, said elements being disposed in a mutually fixed configuration;
  imaging means for receiving said images, said imaging means being disposed in the other of said device body and said controller;
  said detection marker being directed at said imaging means so that said imaging means generates an image of said detection marker;
  identification means for identifying said image received by said imaging means, said identified image defining a mode of said detection marker; and
  computing means for computing from said identified image the orientation of said controller with respect to the screen.

* * * * *